United States Patent [19]
Wacholder

[11] Patent Number: 6,167,368
[45] Date of Patent: Dec. 26, 2000

[54] METHOD AND SYSTEM FOR INDENTIFYING SIGNIFICANT TOPICS OF A DOCUMENT

[75] Inventor: Faye (Nina) P. Wacholder, Roslyn Heights, N.Y.

[73] Assignee: The Trustees of Columbia University in the City of New York, New York, N.Y.

[21] Appl. No.: 09/134,193

[22] Filed: Aug. 14, 1998

[51] Int. Cl.[7] .............................. G06F 17/27; G06F 15/00
[52] U.S. Cl. ................................. 704/9; 707/530
[58] Field of Search ..................... 704/1, 8–10; 707/530, 707/531, 532

[56] References Cited

U.S. PATENT DOCUMENTS

| | | | |
|---|---|---|---|
| 5,519,608 | 5/1996 | Kupiec ........................................ | 704/9 |
| 5,521,816 | 5/1996 | Roche et al. ................................ | 704/9 |
| 5,580,561 | 12/1996 | Church et al. .............................. | 704/1 |
| 5,689,716 | 11/1997 | Chen ........................................... | 704/1 |
| 5,708,825 | 1/1998 | Sotomayor .................................. | 704/1 |
| 5,715,468 | 2/1998 | Lucius ........................................ | 704/9 |
| 5,799,269 | 8/1998 | Scabes et al. ............................... | 704/9 |
| 5,960,383 | 9/1999 | Fleischer ..................................... | 704/530 |
| 6,026,388 | 2/2000 | Liddy et al. ................................ | 707/1 |
| 6,061,675 | 5/2000 | Wical .......................................... | 704/9 |

OTHER PUBLICATIONS

H.P. Luhn, "The Automatic Creation of Literature Abstracts", IBM Journal of Research and Development, vol. 2(2), pp. 159–165 (1958).

G. Salton, "Automatic Text Processing: The Transformation, Analysis and Retrieval of Information by Computer", (Addison–Wesley, Reading, MA, 1989).

C.D. Paice, "Constructing Literature Abstracts by Computer: Techniques and Prospects", Information Processing & Management, vol. 26(1), pp. 171–186 (1990).

N. Wacholder, Y.Ravin and M. Choi, "Disambiguation of Proper Names in Text", Proceedings of the Applied Natural Language Processing Conference, pp. 202–208 (Washington, DC, Mar. 1997).

M. Kameyama, "Recognizing Referential Links: An Information Extraction Perspective", Computation Linguistics (Jul. 7, 1997).

B. Boguraev and C. Kennedy, "Technical Terminology for Domain Specification and Document Characterization", Information Extraction: A Multi–Disciplinary Approach to an Emerging Information Technology, pp. 73–96 (Lecture Notes in Computer Science Series, Springer–Verlag, Berlin, 1997).

J.S. Justeson and S.M. Katz, "Technical Terminology: Some Linguistic Properties and an Algorithm for Identification in Text", Natural Language Engineering, vol. 1(1), pp. 9–27 (1995).

T. Strzalkowski, "Building Effective Queries in Natural Language Information Retrieval", Proceedings of the Applied Natural Language Processing Conference, pp. 299–306 (Washington, DC, Mar. 1997).

Lin, Chin–Yew and Eduard Hovy (1997) "Identifying Topics by Position", Proceedings of Fifth Conference on Applied Natural Language Processing, Association of Computational Linguistics, Mar. 21–Apr. 3, 1997.

Boguraev, B. and C. Kennedy (1997), "Salience–Based Content Characterization of Text Documents", In I. Mani and M. Maybury (eds) Intelligent Scalable Text Summarization, Proceedings of Workshop Sponsored by the Association for Computational Linguistics, Madrid, Spain.

Primary Examiner—Patrick N. Edouard
Attorney, Agent, or Firm—Baker Botts LLP

[57] ABSTRACT

A "domain-general" method for representing the "sense" of a document includes the steps of extracting a list of simplex noun phrases representing candidate significant topics in the document, clustering the simplex noun phrases by head, and ranking the simplex noun phrases according to a significance measure to indicate the relative importance of the simplex noun phrases as significant topics of the document. Furthermore, the output can be filtered in a variety of ways, both for automatic processing and for presentation to users.

22 Claims, 8 Drawing Sheets

110

A form of asbestos once used to make Kent cigarette filters has caused a high percentage of cancer deaths among a group of workers exposed to it more than 30 years ago, researchers reported.

The asbestos fiber, crocidolite, is unusually resilient once it enters the lung, with even brief exposures to it causing symptoms that show up decades later, researchers said. Lorillard Inc., the unit of New York-based Loews Corp. that makes Kent cigarettes, stopped using crocidolite in its Micronite cigarette filters in 1956.

Although preliminary findings were reported more than a year ago, the latest results appear in today's New England Journal of Medicine, a forum likely to bring new attention to the problem.

A Lorillard spokeswoman said, "This is an old story. We're talking about years ago before anyone heard of asbestos having any questionable properties. There is no asbestos in our products now."

Neither Lorillard nor the researchers who studied the workers were aware of any research on smokers of the Kent cigarettes. "We have no useful information on whether users are at risk," said James A. Talcott of Boston's Dana-Farber Cancer Institute. Dr. Talcott led a team of researchers from the National Cancer Institute and the medical schools of Harvard University and Boston University.

The Lorillard spokeswoman said asbestos was used in "very modest amounts" in making paper for the filters in the early 1950s and replaced with a different type of filter in 1956. From 1953 to 1955, 9.8 billion Kent cigarettes with the filters were sold, the company said.

Among 33 men who worked closely with the substance, 28 have died - more than three times the expected number. Four of the five surviving workers have asbestos-related diseases, including three with recently diagnosed cancer. The total of 18 deaths from malignant mesothelioma, lung cancer and asbestosis was far higher than expected, the researchers said.

"The morbidity rate is a striking finding among those of us who study asbestos-related diseases," said Dr. Talcott. The percentage of lung cancer deaths among the workers at the West Groton ,Mass., paper factory appears to be the highest for any asbestos workers studied in Western industrialized countries, he said.

The finding probably will support those who argue that the U.S. should regulate the class of asbestos including crocidolite more stringently than the common kind of asbestos, chrysotile, found in most schools and other buildings, Dr. Talcott said.

The U.S. is one of the few industrialized nations that doesn't have a higher standard of regulation for the smooth, needle-like fibers such as crocidolite that are classified as amphobiles, according to Brooke T. Mossman, a professor of pathology at the University of Vermont College of Medicine. More common chrysotile fibers are curly and are more easily rejected by the body, Dr. Mossman explained.

In July, the Environmental Protection Agency imposed a gradual ban on virtually all uses of asbestos. By 1997, almost all remaining uses of cancer-causing asbestos will be outlawed.

About 160 workers at a factory that made paper for the Kent filters were exposed to asbestos inthe 1950s. Areas of the factory were particularly dusty where the crocidolite was used.

Workers dumped large burlap sacks of the imported material into a huge bin, poured in cotton and acetate fibers and mechanically mixed the dry fibers in a process used to make filters. Workers described"clouds of blue dust" that hung over parts of the factory, even though exhaust fans ventilated the area.

"There's no question that some of those workers and managers contracted asbestos-related diseases," said Darrell Phillips, vice president of human resources for Hollingsworth & Vose. "But you have to recognize that these events took place 35 years ago. It has no bearing on our work force today."

PRE-PROCESSOR

| | | |
|---|---|---|
| workers (9) | asbestos (8) | filter(s) (8) |
| researchers (8) | fiber (5) | factory (4) |
| years (4) | deaths (3) | diseases (3) |
| crocidolite (5) | Talcott (4) | cigarettes (3) |

FIG. 8

METHOD AND SYSTEM FOR INDENTIFYING SIGNIFICANT TOPICS OF A DOCUMENT

STATEMENT REGARDING FEDERALLY SPONSORED RESEARCH

The invention described herein was funded in part by a grant from the National Science Foundation, namely, NSF grant IRI-9712069. The United States Government may have certain rights under the invention.

FIELD OF THE INVENTION

The present invention relates in general to the field of natural language processing. More particularly, the present invention relates to a method and system for text data management, information retrieval, summarization and indexing using natural language processing.

BACKGROUND OF THE INVENTION

A "topic" in a document is any entity, concept or event explicitly referred to therein, and a "significant topic" is a topic central to what is sometimes called the "aboutness" of a document. Significant topics are thus those topics that constitute the central thrust of a document or part of a document. The notion "significant," like the notion "relevant," is both task and user dependent. What is significant for an application that answers specific questions is different from what is significant for an application that conveys the sense of particular documents; what is significant in a domain for a naive user may be quite different from what is significant to an expert.

In order to identify significant topics in a document, a significance measure is needed, i.e.,a method for determining which concepts in the document are relatively important. In the absence of reliable full-scale syntactic and semantic parsing, frequency measures are often used to determine significance.

One of the earliest statistical techniques for identifying significant topics in a document for use in creating automatic abstracts was proposed by Luhn, who developed a method of making a list of stems and/or words, sometimes called keywords, removing keywords on a stop list, and then calculating the frequency of the remaining keywords. See H. P. Luhn, "The Automatic Creation of Literature Abstracts," IBM Journal of Research and Development, vol. 2(2), pp. 159–165 (1958). This method, which is based on the intuition that frequency of reference to a concept is significant, can be used to locate at least some important concepts in full text, especially when frequency of a keyword in a document is calculated relative to its frequency in a large corpus, as in standard information retrieval (IR) techniques. See G. Salton, *Automatic Text Processing: The Transformation Analysis and Retrieval of Information by Computer*, (Addison-Wesley, Reading, Mass., 1989).

However, the ambiguity of stems (trad might refer to trader or tradition) and of isolated words (state might be a political entity or a mode of being) means that lists of keywords have not usually been used to represent the aboutness of a document to human beings. Instead, techniques such as identifying sentences with multiple keywords have been used since Luhn for automatic creation of abstracts. See C. D. Paice, "Constructing Literature Abstracts by Computer: Techniques and Prospects," Information Processing & Management, vol. 26(1), pp. 171–186 (1990).

The challenge in preparing an abbreviated representation of an article is to identify heuristics which make it possible to represent to the user the sense in which an author used an expression in the document, without performing full sense disambiguation. In an important sense, every document can be viewed as forming its own "self-contained" world. A document is written to get across a particular idea or set of ideas. The task of the author, at least in documents intended for public distribution, is to convey to the reader what general knowledge is assumed and to inform the reader of the context so that ambiguous expressions can be easily identified. These references are governed by certain standard conventions.

For example, in an edited document such as a newspaper article, the first reference to a named entity such as a person, place or organization typically uses a relatively full form of the name in a version which is sufficient to disambiguate the reference for the expected audience. Later in the document, the same entity is usually referred to by a shorter, more ambiguous form of the name. See N. Wacholder, Y. Ravin and M. Choi, "Disambiguation of Proper Names in Text," *Proceedings of the Applied Natural Language Processing Conference*, pp. 202–208 (Washington, D.C., March 1997). An article might first refer to Columbia University or, more formally, Columbia University in the City of New York, and later refer only to Columbia. Without the initial disambiguating reference, Columbia by itself is quite ambiguous. It might be a city, i.e, Columbia, M.d., a bank Columbia Savings and Loan, the space shuttle Columbia, Columbia Pictures, or one of many other entity names containing the word Columbia.

Nominator, a domain-general software module developed at the IBM's T. J. Watson Research Center, is capable of identifying and disambiguating proper names in a text document. See id. Nominator categorizes them, and links expressions in the same document which refer to the same entity. See id. The module first builds a list of proper names in each document and then applies heuristics in order to link names which refer to the same entity, e.g., Hillary Clinton and Mrs. Clinton, but not Bill Clinton. Although the Nominator technique produces reliable links between references to the same entity in a document, the technique is strictly limited to identifying and conveying a list proper nouns of proper nouns for indexing and information retrieval purposes. Nominator is not capable of identifying common noun phrases or the aboutness of a particular article.

Common noun phrases (NP's) also manifest a pattern of referential linking in documents, although it is more subtle and complicated than the proper name behavior. Any article of more than minimal length contains repeated references to important concepts. In general, when a word appears as a head of an NP, i.e., the noun that typically contributes the most syntactically and semantically to the meaning of the NP, it is used in the same sense throughout the document especially in articles of newspaper length. Some of the references to the head are elliptical and therefore very ambiguous, at least out of context, but some of the references are usually longer and therefore more specific and more informative. The different references to a concept implicitly or explicitly refer to each other and collectively form an abstract construct that conveys the sense that the author presumably intended to convey. See M. Kameyama, "Recognizing Referential Links: An Information Extraction Perspective," *Computational Linguistics* (Jul. 7, 1997).

Recently, the effort to develop techniques for domain-independent content characterization has been addressed. See B. Boguraev and C. Kennedy, "Technical Terminology for Domain Specification and Document Characterization," *Information Extraction: A Multi-Disciplinary Approach to an Emerging Information Technology*, pp. 73–96 (Lecture Notes in Computer Science Series, Springer-Verlag, Berlin, 1997). Boguraev and Kennedy take as a starting point the question of the applicability to document characterization of the approach of Justeson and Katz to identify technical terms in a corpus. See J. S. Justeson and S. M. Katz, "Technical Terminology: Some Linguistic Properties and an Algorithm for Identification in Text," Natural Language Engineering, vol. 1 (1), pp. 9–27 (1995). Justeson and Katz developed a well-defined algorithm for identifying technical terminology, repeated multi-word phrases such as central processing Unit in the computer domain or word sense in the lexical semantic domain. This algorithm identifies candidate technical terms in a corpus by locating NP's consisting of nouns, adjectives, and sometimes prepositional phrases. Technical terms are defined as those NP's, or their subparts, which occur above some frequency threshold in a corpus.

However, as Boguraev and Kennedy observe, the technical term technique is not simply adaptable to the task of content characterization of documents. For an open-ended set of documents and document types, there is no domain to restrict the technical terms. Moreover, patterns of lexicalization of technical terms in a corpus do not necessarily apply to individual documents, especially short ones. Boguraev and Kennedy therefore propose relaxing the notion of a technical term to include an exhaustive list of "discourse referents" in a wide variety of text documents, and determining which referents are important by some measure of discourse prominence.

SUMMARY OF THE INVENTION

The aforedescribed limitations and inadequacies of conventional content characterization techniques are substantially overcome by the present invention, which in a preferred embodiment is a method including the steps of: extracting from a document a list of simplex noun phrases and corresponding heads that represent candidate significant topics of the document; clustering the simplex noun phrases into groups by head; and ranking the clustered simplex noun phrases by head in accordance with a significance measure to identify significant topics of the document from said candidate significant topics.

In another aspect of the present invention, a system for identifying significant topics in a document includes a general purpose computer having a computer usable media and computer readable program code embodied in the computer usable media. According to a preferred embodiment of the system, the program code is capable of extracting from the document a list of simplex noun phrases and corresponding heads that represent candidate significant topics of the document, clustering the simplex noun phrases into groups by head, and ranking the clustered simplex noun phrases by head in accordance with a significance measure to identify significant topics of the document from the candidate significant topics.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 3 shows an example of a document input for use by the computer program of FIG. 2;

FIG. 8 shows an output file corresponding to the document input shown in FIG. 3 showing a list of simplex noun phrase heads having three or more occurrences.

DETAILED DESCRIPTION OF THE INVENTION

Figure 1:
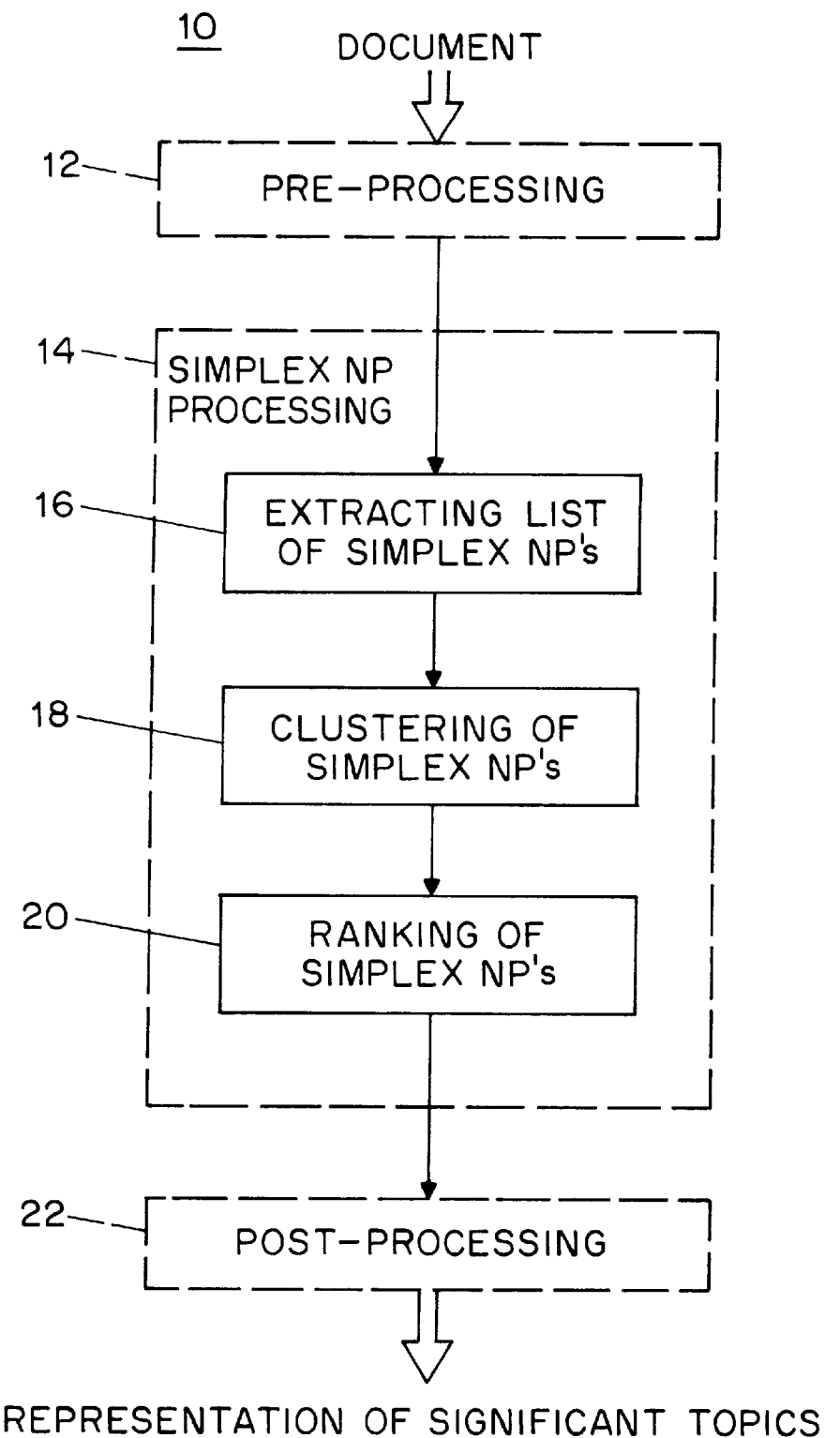
FIG. 1 shows block diagram of a preferred method for identifying significant topics in a document according to the present invention.

FIG. 1 shows a flow diagram of a domain-general method for identifying significant topics of a document. The document can be any electronically stored text document, including English or non-English text documents stored in ASCII, HTML, SGML or other formats. The method is domain-general in that it does not require a term-specific or domain-specific knowledge base to identify the significant topics of a document.

As shown in FIG. 1, the method first includes the step of extracting a list of simplex noun phrases (hereinafter "simplex NP's") from the document representing candidate significant topics of the document. A simplex NP is defined as a maximal noun phrase that includes pre-modifiers such as determiners (i.e., words such as a, the and any going to the definiteness of a noun) and possessives, but not post-modifiers such as prepositional phrases or verb phrases. The phrasal "head" (in the standard linguistic sense) of a simplex NP is the noun that typically contributes the most syntactic and semantic information to the meaning or "sense" of the simplex NP, and in the English language is typically the final element of the simplex NP, e.g., in the simplex NP the blue fiber, fiber is the head.

One example of a simplex NP is one which has a determiner (DET) preceded by an adjective (ADJ) preceded by a common noun (N) (DET-ADJ-N) as in the bluefiber. For proper names, a simplex NP is a name that refers to a single entity. For example, Museum of the City of New York, the name of an organization, is a simplex NP even though the organizational name incorporates a city name.

By comparison, complex NP's, e.g., 9.8 billion Kent cigarettes with asbestos filters or 9.8 billion Kent cigarettes sold by the company, are characterized in that the head of the NP is typically followed by additional speech elements such as prepositions and participial verbs. Such complex NP's are ambiguous, especially out of context, and as such are especially difficult to parse correctly by automatic means. For example, the meaning of the complex NP information about medicine for infants is ambiguous: in [[information about medicine][for infants]], the information is for infants; in [information about [medicine for infants]], the medicine is for infants. Simplex NPs therefore form coherent units having less structural ambiguity.

Referring again to FIG. 1, the present invention according to the preferred method of FIG. 1 further includes the steps of clustering the simplex NP's into groups by heads and ranking the clustered simplex NP's by heads in accordance with a significance measure to identify the significant topics of the document. The clustering and ranking steps are indicated by steps 18 and 20 in FIG. 1.

The steps of clustering and ranking the simplex NP's by head is based on the fundamental linguistic distinction between head and modifier: a head makes a greater contribution to the syntax and semantics of a grammatical constituent than does a modifier. This linguistic insight is thus extended to the document level: if, as a practical matter, it is necessary to rank the contribution to a whole document made by the sequence of words constituting an NP, the head is more important than the other words in the phrase. A variation of this observation has been recognized by Strzalkowski and others, who have used the distinction between heads and modifiers for query expansion. See T. Strzalkowski, "Building Effective Queries in Natural Language Information Retrieval," *Proceedings of the Applied Natural Language Processing Conference*, pp. 299–306 (Washington, D.C., March 1997).

After a list of simplex NP's is compiled, the simplex NP's are ranked according to a significance measure that indicates the relative significance of the heads of all the simplex NP's in the document. Preferably, the significance measure is the frequency of occurrence of the head, i.e., those simplex NP's with heads occurring with greater frequency in the document are more significant than simplex NP's whose heads occur less frequently in the document. The frequency measure can also be modified to depend at least in part on the frequency of occurrence of the heads as modifiers in any simplex NP's, or on the location (distribution) of the heads within the document.

FIG. 1 also shows two additional steps, a preprocessing step 12 and a post-processing step 22, which are advantageously performed to identify significant topics in a document. The pre-processing step 12 is performed to provide relevant parsing information, such as part-of-speech (POS) tags, for extracting the simplex NP's, and the post-processing step 22 is performed, for example, to remove duplicate entries and pronouns from the list of simplex NP's.

With this approach, the reliance on technical terms is greatly attenuated. Even in a technical document, technical terms do not constitute a complete list of all of the phrases in a document that contribute to its content, especially since technical terms are by definition multi-word. Moreover, a truly domain-general method should apply to both technical and non-technical documents. The relevant difference between technical and non-technical documents is that in technical documents, many of the topics which are significant to the document as a whole may be also technical terms.

Like the keyword and repeated word sequence methods for measuring topic significance, head clustering is statistical in that it relies on a frequency measure to provide an approximation of topic significance. However, instead of counting frequency of stems or repetition of word sequences, this method counts frequency of a relatively easily identified grammatical element, heads of simplex NP's.

Figure 2:
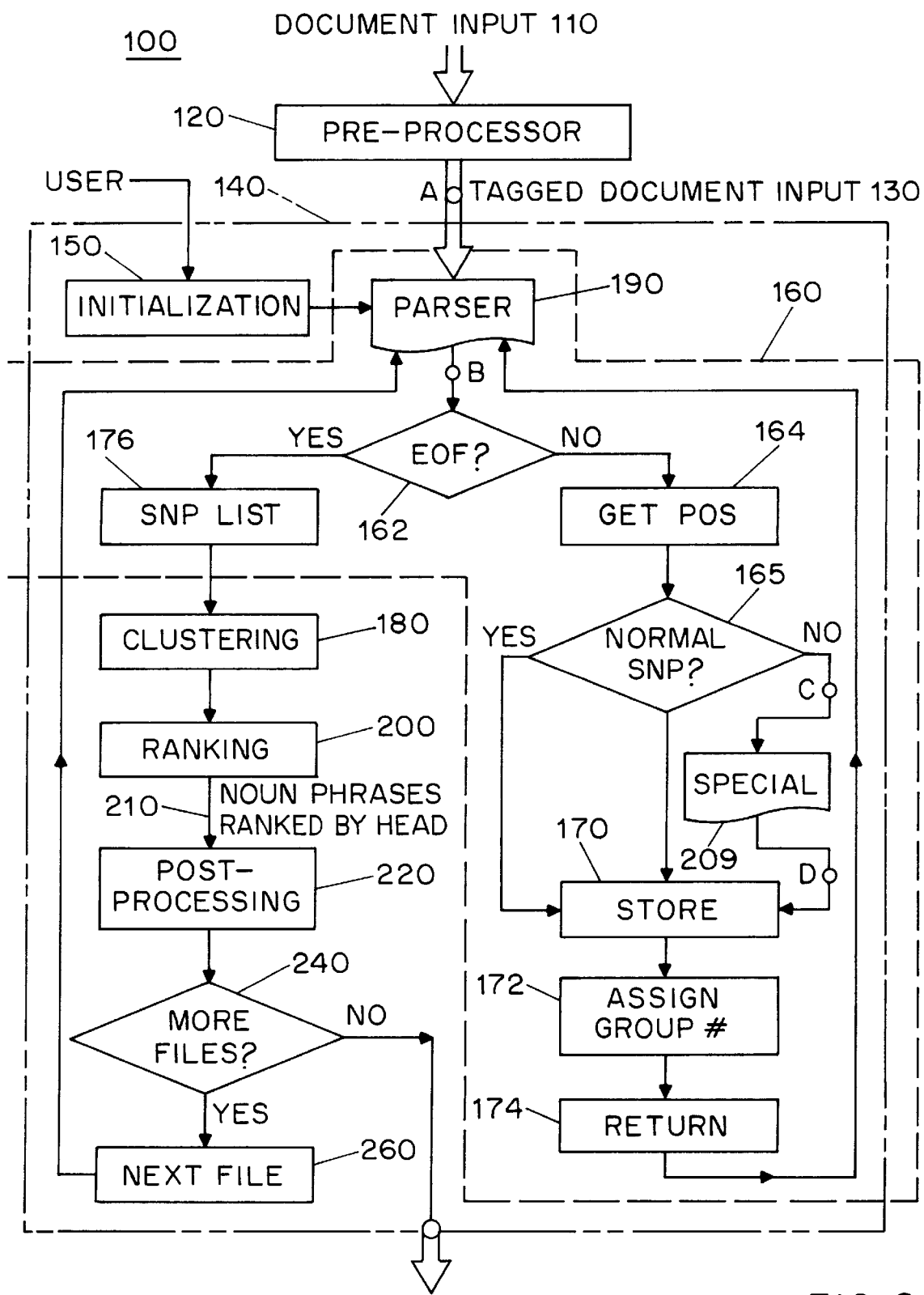
FIG. 2 shows a flow diagram for a computer program implementing the method of FIG. 1.

FIG. 2 is a flow diagram for a computer program 100 entitled LinkIT for implementing the method shown in FIG. 1. The LinkIT computer program 100 can be implemented on any suitable general-purpose computer. The source code listing of the main processing module, linkit.c, is provided in Appendix A. Listings of other associated modules, header files and dictionary data files, i.e., linkit.h, ruleNames.h, NPDict.h, NPDict.c, NP.lex, etc., are also provided in Appendix A.

Figure 4:
FIG. 4 shows a pre-processed version of an excerpt of the document input of FIG. 3 featuring part-of-speech tags.

As shown in FIG. 2, the LinkIT computer program 100 includes a pre-processor 120 for tagging text input with POS tags, which can be any publicly available part-of-speech tagger. The preferred embodiment of the present invention, for example, uses Mitre Corporation's Alembic Workbench. Alembic Workbench and supporting documentation can be found on the Internet at the following webpage: http://www.mitre.org/resources/centers, advanced_info/g04h/nl-index.html. A sample output corresponding to an excerpt of the document input of FIG. 3 is provided in FIG. 4. As shown in FIG. 4, the pre-processor 120 returns the original text input with standard POS tags, e.g., DT (determiner), NN (singular noun), IN (preposition), VB (verb), etc., for each of the words in the document input. Another example of a suitable POS tagger is the Maximum Entropy POS Tagger (MXPOST), which is available on the Internet at http://www.cis.upenn.edu/~adwait/statnlp.html.

Figure 5:
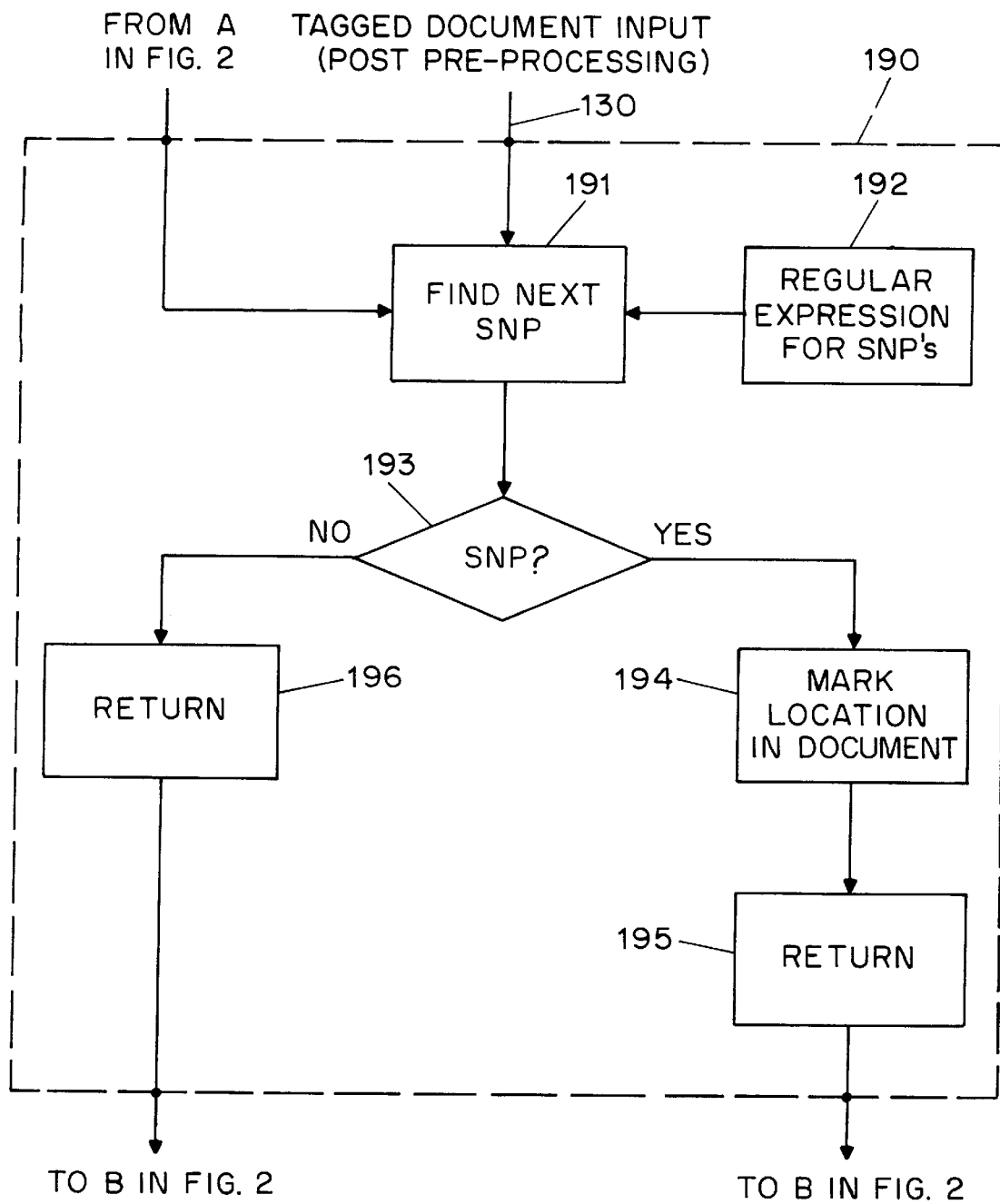
FIG. 5 shows a flow diagram of a software routine for extracting simplex noun phrases from a tagged document input as shown in FIG. 4.

The LinkIT computer program 100 for implementing the method of the present invention further includes code 160 for extracting from a document a list of simplex NP's representing candidate significant topics of the document. The extraction code 160 includes a parser 190, which is shown in FIG. 5, for processing the tagged document input generated by the pre-processor 120 and for returning simplex NP's that match regular expressions, i.e., user-specified patterns (provided by block 192) that describe the simplex NP's to be extracted, e.g., DET-ADJ-N. Additional patterns can be found in the NP.lex module listing provided in Appendix A. The parser 190 includes software elements 191 through 196 and is described in detail in the NP.lex listing.

Each time the parser 190 is called, the parser 190 returns a simplex NP and any text between the previous simplex NP and the current NP. In addition, a value is returned that indicates which regular expression matched the simplex NP. If the input text has been exhausted, an end-of-file indicator is returned. If the text is of the special form "adjective coordinating conjunction" (ACC), as in red and from red and blue flags, the parser returns a value indicating that an ACC phrase was found. If the ACC phrase immediately precedes the current simplex NP, e.g., blueflags, then the ACC is prepended to (added to the beginning of) the current simplex NP, e.g., red and blue flags.

If no end-of-file is returned by the parser 190 as determined by decision block 162, the extraction code interprets the POS code 164 provided by the pre-processor that corresponds to the current simplex NP. The extractor then determines via block 165 whether the simplex NP is a "normal" simplex NP, or whether the simplex NP is a "special" simplex NP. If the current simplex NP is a "normal" simplex NP, the current simplex NP and associated information is stored in computer memory at block 170. Associated information includes, for example, any information about the individual words or NP's extracted from the POS tags or the document itself including the location within the document. Previous simplex NP's are then checked for words that also occur in the current simplex NP. If the head, i.e., the last word of the simplex NP, has not been previously detected, then the current simplex NP is assigned a new group number by block 172. If the head has been previously detected, then the current simplex NP is assigned the group number previously assigned to that head. Control is then returned to the parser 190 via block 174 to process the next simplex NP.

Figure 6:
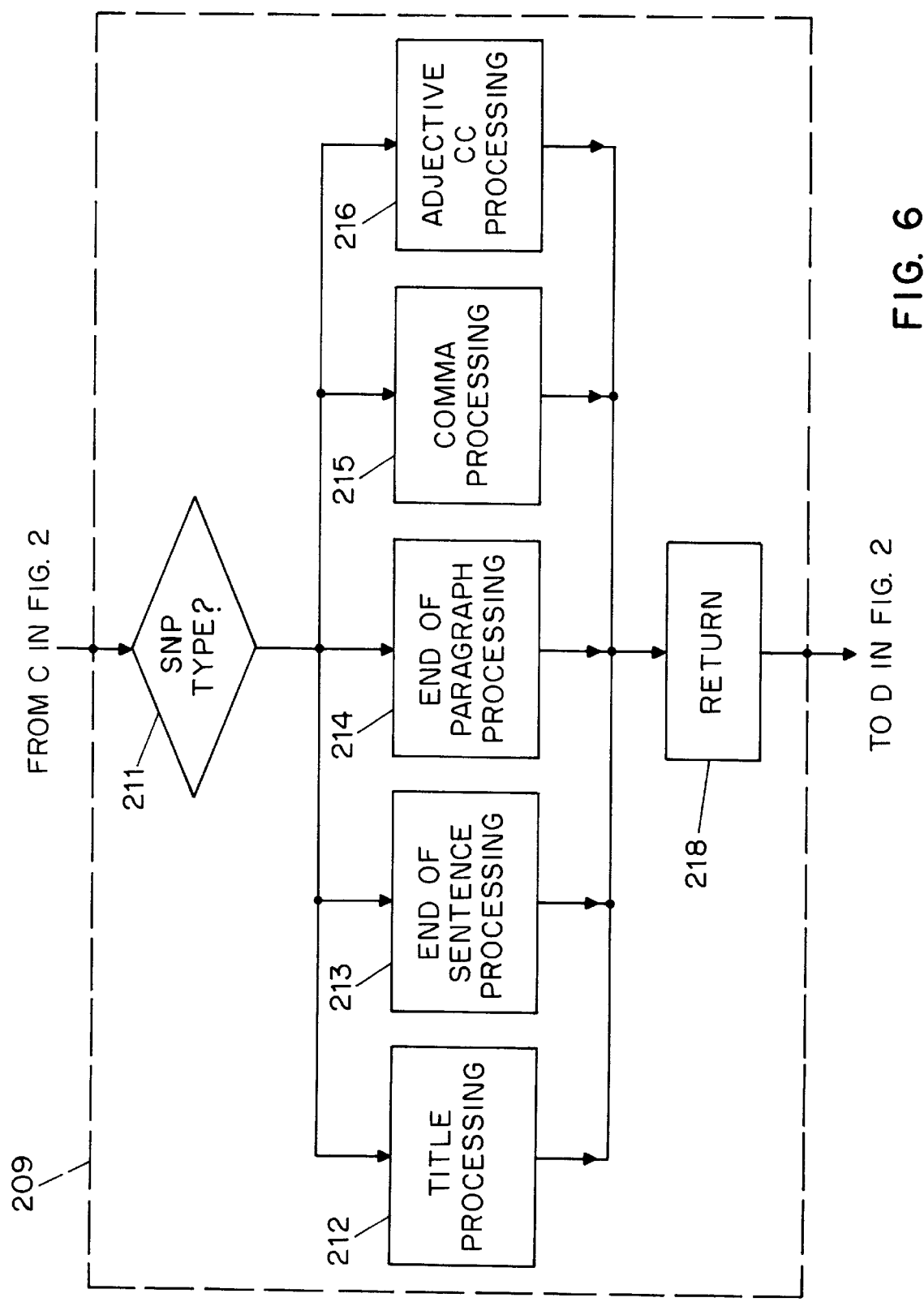
FIG. 6 shows a flow diagram of a software routine for processing special simplex noun phrases according to the computer program of FIG. 2.

However, if the indicator of a "special" simplex NP is found, then the type of "special" simplex NP is determined by block 209 in FIG. 2. A "special" simplex NP can be, for example, a title, the end of a sentence, a comma, and ACC, or the end of paragraph. The type of special simplex NP is determined by in FIG. 6 and processed accordingly by branches 212 through 216. After processing by the appropriate branches, the "special" simplex NP's are processed just like normal simplex NP's and control is returned to the main processing loop via 218.

Referring again to FIG. 6, if the current simplex NP is determined by 211 to be a title, e.g., Mr., Mrs., Dr., etc., the features of the simplex NP are set appropriately (human in the case of Mr., Mrs., or Dr., for example). Accordingly, the proper name is made the head of the current simplex NP and control is returned to the main processing loop.

If the current simplex NP is determined by 211 to be at the end of a sentence, then certain variables are re-initialized and control is returned to the main processing loop. If the current simplex NP is determined to be at the end of a paragraph, then appropriate variables are re-initialized before return to the main processing loop.

If the current simplex NP is determined by 211 to be a comma, then a check is performed for possible apposition, i.e., whether the current simplex NP modifies another noun phrase as in John Smith, president of XYZ Company. If apposition is detected, then apposition information is added to the information stored relating to the current simplex NP.

After the simplex NP list is assembled by 176, the simplex NP's are clustered into groups by head 180 according to the group numbers assigned by 172. Ranking by frequency of head is then performed by 200 according to a significance measure or weight to identify the significant topics in the document. Preferably, the significance measure of a simplex NP is the number of times its head occurs as a head in the document, but may be, for example, the number of times the head occurs as a head plus one-half the number of times the head is used as a modifier in any simplex NP. The clustering, ranking and post-processing steps of the preferred method are performed by the NPL_PRINTORDEREDLIST() subroutine found in the linkit.c listing in Appendix A.

Figure 7:
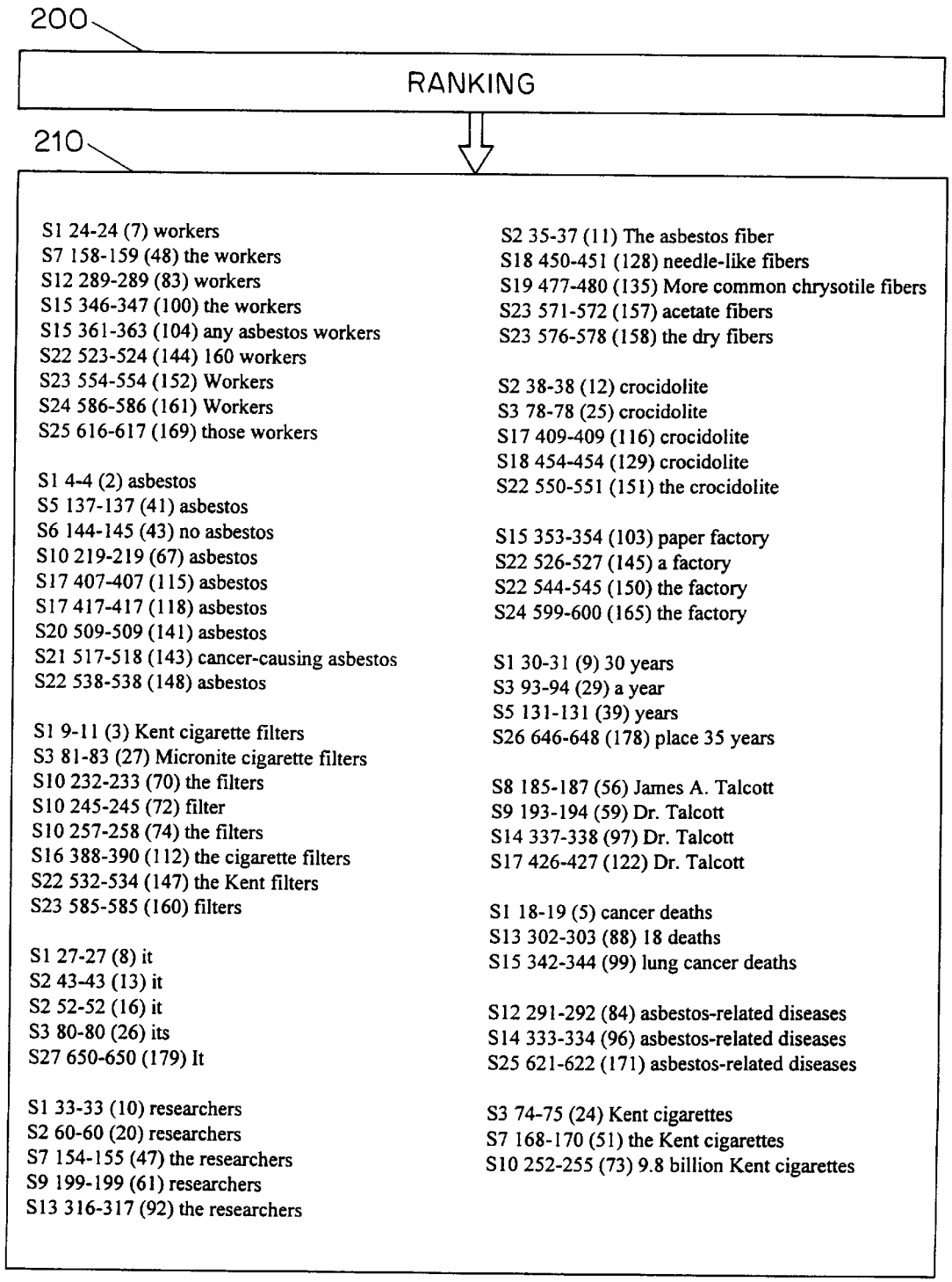
FIG. 7 shows an output file corresponding to the document input shown in FIG.3 showing a complete list of simplex noun phrases ranked by head having three or more occurrences.

FIG. 7 is a sample output after clustering and ranking by the LinkIT computer program 100 of FIG. 2. FIG. 7 shows the clustered simplex NP's and number of occurrences of each head present in the document input shown in FIG. 3. Each simplex NP is preceded by a sentence number, a token span and a sequential phrase identifier. For example, on the first line of the output 210, "S1" refers to sentence 1, "24—24" refers to the token span beginning at token number 24 and ending at token number 24 (only one word), and the sequential phrase identifier "(7)" indicating that the simplex NP workers is the seventh simplex NP identified in the document.

A second sample output is also shown in FIG. 8, which shows those heads having three or more occurrences in the document shown in FIG. 3. Note, by itself, FIG. 8 is a simple representation of the significant concepts embodied the document shown in FIG. 3. However, as shown by FIG. 7, the head clustering technique provides a way to situate the entities referred to in the document in the context of related entities so their sense is comprehensible to users who have not actually read a document. Examination of this list suggests that it provides a more detailed representation of the content of the article than does the list in FIG. 8.

For example, FIG. 7 shows that filter is the head of eight simplex NP's. Four of these have adjective and/or nominal pre-modifiers: Micronite cigarette filters, Kent cigarette filters, the cigarette filters and Kent filters. In the absence of other references to specific kinds of filters, the correct and accurate generalization is that the kinds of filters discussed in this document are cigarette filters, rather than coffee filters or oil filters. Asbestos workers and cancer-causing asbestos, the most specific NP's with the head workers and asbestos respectively, as measured by the number of content words preceding the head, accurately characterize the properties workers and asbestos that are most relevant to the document of FIG. 3. Similarly, the most specific simplex NP suggests that the type of factory under discussion is a paper factory.

For the head fiber, there are five different pre-modifiers. While it is impossible to determine from the list which of these types of fiber are the same and which are different, the variety of pre-modifiers suggests that different types of fibers are being discussed in the document.

Researchers and crocidolite, which have no associated modifiers, are repeatedly used as heads in the document and therefore are more likely to be candidate significant topics than a word like Kent which is used five times, but only as a modifier.

Referring again to FIG. 2, the clustered and ranked simplex NP's can be further processed by post-processor 220 to, for example, remove duplicate entries and/or pronouns. Near-duplicate entries, such as entries differing only by case, apostrophe or singular versus plural, for example, can also be removed by the post-processor 220. Examples of near-duplicate entries include boy and boy's and Attorney and attorney.

In addition, the simplex NP's can be further post-processed such that only those NP's having a modifier that is a content-bearing word, i.e., an adjective or a noun, are reported as significant topics. For example, in the cluster of simplex NP's shown in FIG. 7 where workers is the head, all but the simplex NP having the modifier asbestos, i.e., any asbestos worker, can be filtered out or excluded. Similarly, in the cluster of simplex NP's where filters or filter is the head, the cigarette filters may be preferred over the other simplex NP's. Because NP's having modifiers are more specific, all other NP's can be discarded in that they provide redundant syntactic and semantic information.

In summary, when a word is presented in isolation, the structural information provided by the ordered juxtaposition of the words that combine with it to form a meaningful unit is lost, as in the distinction between unit and central processing unit. On the other hand, a list of all of the nominals in a document is impractical because it is lengthy and repetitive, in part because of embedding of noun phrases.

As such, a method for extracting a list of simplex NP's, clustered by head, as disclosed herein provides a relatively coherent and compact representation of the content of a document. Simplex NPs, which are semantically and syntactically coherent, provide adequate content representation of expressions out of the context of the document. Accordingly, the method of the present invention is useful for various natural language processing applications, including but not limited to: (1) summarization or other techniques for conveying the content of a document; (2) advanced information extraction where important entities in the document must be identified and linked so that information about the entity from different parts of the document can be merged; (3) second stage information retrieval, where a subset of a larger corpus has been determined to be potentially relevant, perhaps by a statistically based system, i.e., the subset can then be further filtered in order to identify documents which are likely to be of interest for a particular query or which may provide the answer to a specific question; and (4) automatic or semi-automatic "back-of-the-book" indexing of print and electronic texts.

Although the present invention has been described in connection with particular embodiments thereof, it is to be understood that various modifications, alterations and adaptions may be made by those skilled in the art without departing from the spirit and scope of the invention. It is intended that the invention be limited only by the appended claims.

APPENDIX A

LinkIT Source Code and Related Files

FILENAME: readme-18
This is the README file for the LinkIT program. (FILENAME readme~)
INTRODUCTION
LinkIT generates a list of Simplex Noun Phrases (NPs) and relations between them from a given domain independent text. LinkIT is a work in progress, and is still under development.
A simplex NP is a maximal NP with a common or proper noun as its head,
where the NP may include premodifiers such as determiners and possessives but not post-nominal constituents such as prepositions or relativizers. Examples are asbestos fiber and 9.8 billion Kent cigarettes. Simplex NPs can be contrasted with complex NPs such as [9.8 billion Kent cigarette with the filters] where the head of the NP is followed by a preposition, or [9.8 billion Kent cigarettes sold by the company,] where the head is followed by a participial verb. Currently simplex NPs also end at a conjunction.
INPUT FILES
All files to be processed by LinkIT must first be tagged using the Alembic Utilities, available from the MITRE group.
(http://www.mitre.org/resources/centers/advanced_info/g04h/alembic.html)
There are two ways to tag files for use by LinkIT. The first is to manually tag the file using the Alembic Workbench's GUI. To do this, start up the Alembic Workbench, and from the "Utilities" menu select the "Process Text . . ." item. Select a source file using the "Select . . ." button, and set the output file to what you want. Set the rules file to $AWBDIR/awb-2.8/rules/english-rules-all-data1.lisp.
The stages that should be selected for processing are:
Punct, Sent, P-O-S, BiGrams, POS-Language: English, Phrasing

APPENDIX A-continued

LinkIT Source Code and Related Files

Then press the "Process Text" button.
The second method is to use the included perl script, awbTag.pl.
This script invokes another script, apply-alembic-dave, which tags the text file using the above parameters. The awbTag.pl script can take any number of file names as a command line arguement, and will process all of those files, creating <FILENAME>.tagged files for each command line argument.
On the cs machines at Columbia, the Alembic Workbench is installed at:
/proj/nlp/tools/discourseTools/awb-2.8/
RUNNING LINKIT
To run LinkIT on a pre-tagged file, and place the output files in an output directory, use
LinkIT -o/proj/nlp/users/devans/LinkIT/outputData/ ../taggedData/a9400011.tagged
or to run LinkIT on all a94 files that have been tagged, you can use
LinkIT -o/proj/nlp/users/devans/LinkIT/outputData/ ../taggedData/a94*.tagged
You can use relative or fully specified paths. Relative paths will be relative based off of the current working directory, not the directory that LinkIT actually resides in.
To print only the text of the document with the NPs intersperced use
LinkIT -printInitial -noStats -noFinal -noWordLists [ input files ]
To have only the list of simplex NPs sorted by head use
LinkIT -noWordLists -noStats -sort freq [ input files ]
If the directory that you are running LinkIT from does not contain the NP.dict file, you must locate the file with the -dict option. For example,
/proj/nlp/users/devans/LinkIT/currNp/LinkIT
-dict/proj/nlp/users/devans/LinkIT/currNP/NP.dict
-o ~devans/Research/outData/ wsj_*.tagged
will process all the wsj_*.tagged files in the current directory, and place the output in ~devans/Research/outData/.
FURTHER INFORMATION
For more information, please see the man page. (LinkIT.1)

```
FILENAME: linkit.c (LinkIT main module)
/* A C file to drive a lex liexer that returns us
noun phrases.
/*
#include "LinkIT.h"   /* Header file for this .c file */
#include "lex.yy.c" /* The header file created by lex NP.lex */
#include "ruleNames.h"/* A header file: constant names for the rules */
#include "NPDict.h"  /* Header for the dictionary stuff */
#include "WordInfo.h"/* Include the WordInfo (hash for words) stuff */
#include <timne.h>   /* time and date functions */
char *gTagNames[kVBM+1] = { "JJ", "JJR", "JJS",
                                      "RB", "RBR", "RBS",
                                      "DT", "EX", "CD", "CC",
                                      "WP", "WP$", "WDT", "WRB",
                                      "UH", "IN", "INDT",
                                      "NN", "NNS", "NNP", "NNPS",
                                      "FW", "POS",
                                      "CL", "CLS", "CLR", "PRP", "PP$",
                                      "PDT", "MD", ".", ",", "TO", "RP", "PRP$",
                                      "'"", """", "VBP", ".", "SYM",
                                      "(",")",
                                      "VB", "VBZ", "VBD", "VBF"
                                      "VBC", "VBI", "VBS", "VBG", "VBN", "VBM"};
            int gNPNum = 0;         /* Current number of Noun Phrases found */
            int gSentNum = 0;       /* Current sentence number */
            int gInTag = 0;         /* Are we currently inside a tag (ie, between
                                     * <. . .> for text that does not match a NP
                                     * regular expression. I use this inforrnation
                                     * to supress printing of the tag text. */
            int gWordNum = 1;    /* Current word number we are on. */
            int gParaNum = 1;     /* Current paragraph number we are on */
            int gGotWord = 0;     /* When processing text that does not match a
                                     * NP regular expression, have we counted the
```

-continued

```
                            * current text as a word or not? We see a
                            * word when we are outside of a tag and there
                            * is alphanumeric data there ie <lex
                            * pos=NNS>years</lex><lex
                            * pos=JJ>old</lex><lex pos=",">,</lex>the
                            * years is counted as a word, the space is
                            * not, old is, the comma isn't. */
int gPrintPOS=0;            /* Boolean - should we print the part of speech
                            * tags after the words in the NPs seperated by
                            * a/or not?
                            */
int gPrintPOS2=0;           /* Boolean - if set print out the POS tags
                            * for the words in an NP only under the words
                            * in the NP
                            /*
FILE *gOut;                 /* A file pointer to the output file, if
                            * we are using a named input file
                            /*
char *gOutFile=NULL; /* The name of the output file, if any
                            */
char *gStatFile=NULL; /* the name of the statistics file, if any
                            */
char *gOutDir="./"; /* Directory to place output files in, if any
                            */
char *gFileBaseName=NULL;
                   /* Base name for the file we are using -- ie
                            * the name minus the first .ext from the
                            * right of the string
                            /*
int gNoStats=0;             /* Boolean - should we output statistics or no?
                            /*
int gNoPrint=0;             /* Boolean - should we print to sdtout as we go or
                            * not?
                            /*
int gVerbosity=1;           /* A number that indicates how verbose we should be in
                            * reporting program status. Higher numbers mean to
                            * report more and more useless information.
                            */
NP gNP;            /* A global Noun Phrase variable to pass
                   * information to main
                            */
NP *gLastAdjCC=NULL; /* A global variabie to track the last thing we caught
                            * with the kAdjCC rule, which might be added to an
                            * NP if it immediately precedes one.
                            * It is NULL usually, until we find one. Then
                            * if the next NP doesn't immediate follow it,
                            * it is re-set to NULL
                            */
Word *gWords;               /* A global pointer to the current words in the NP */
int gPOSTagStats[kVBM+1];
                   /* An array equal in size to the number of POS
                            * tags. Each entry, as indexed by one of
                            * the POS tags defined in the tagTypes
                            * enumeration, is a running count of the
                            * number of that tag seen in the doc.
                            * kVMB is the last tag defined in the
                            * enumeration of tags types, so one more
                            * than it is the total number of tags
                            * (they start numbering at 0)
                            */
int gNewPP=1;               /* A boolean to indicate if we have started a new
                            * paragraph or not. Use this to mark the first
                            * NP of a paragraph as such.
                            */
NPList gNPList;             /* A variable that contains the list of all the NPs
                            * in the document. A doubly linked list of the NPs.
                            */
char gMissBuf[500];         /* A buffer that we will use to capture the
                            * characters that didn't get recognized as
                            * a noun phrase by the lexer.
                            */
int gMissLen=0;             /* An index into the gMissBuf
                            */
int gAppStack[3];           /* A stack to try and detect appositions -
                            * It store the last three items we have seen.
                            * If we see NP, NP and we are a, then we
                            * can mark the last two NPs as a possible apposition.
                            * Then collapse the apposition stack down to NP,
                            * to continue the process.
```

-continued

```
                               * If the gMissBuff is something other than white
                               * space, then ProcessMissBuf( ) will clear out the
                               * apposition stack because that (for now) cuts off
                               * the appostion.
                               */
int gAPSUndo[3];         /* Undo buffer for gAppStack. internal muckery
/*
char *gDictFile="Np.dict"; /* Name of dictionary file to use
                               * Can be changed with -dict file Name
                               /*
int gPrintFinal=1;       /* Boolean - should we print out the NPs
                               * at the end of the run or not?
                               * By default print out the sorted final output
                               /*
int gPrintInitial=0;     /* Boolean - should we print out the first
                               * in order set of NPs?
                               * By default, do not print. Can change with
                               * -printInitial global variable.
                               /*
int gPrintWordLists=1; /* Boolean - should we print the word lists for
                               * each word - the NPs that the word is a Head
                               * in and the NPs that the word is a modifier in
                               /*
int gNextNPPossModified=0; /* This flag is set in the case of a
                               * possesive that indicates "of
                               * modification" Boston's Dana-Farber
                               * Cancer Institute where the Dana-Farber
                               * Cancer Institute has to be set as the
                               * "of modifier" of Boston The value is
                               * set in the kPossesive case ofmain
                               * loopand is picked up/reset in
                               * CreateNP when the next NP is being
                               * created. */
int gNoRel=0;            /* Boolean: print common relations or not?
                               */
int gNextOccNum=1;          /* "group number" for "chains" of occurrences
                               * related by head nouns.
                               */
   enum sortTypes gSortType=kTermFrequency;
   /* How to sort the final output list. Defaults to
   * sorting based on the term, or group
   * size.
   /*
   int gNoTime=0;
/* Boolean to indicate if we should print timing information or not. */
int gProperOnly=0;
/* Boolean: when printing list, should we only print the NPs with
* proper nouns as heads?
/*
int gCompareFormat=0; /* An int indicating if we should print in
                               * the comparison format used to compare with
                               * just tf, and min's termer output.
                               * This prints all heads that occurr more than
                               * once, and removes duplicates from the
                               * lists, and implies -noRel
                               */
int gPrintOf=0; /* A Boolean that indicates whether we should
                    * print the pmod and phead NP Num or print the
                    * actual text of the NPs instead
                    */
int gPrintOnlyOfNPs=0; /* A boolean that says in
                               * List II we should print only the NPs
                               * that have been of modified
                               */
enum weightTypes gWeightTerms=kNoWeight;
/* This variable indicates if we should try to weight
* the terms at all or not. Values are from the enumeration
* weightTypes. Current valid values are kNoWeight,
* kHeadAndMod, and kHeadOnly. kHeadAndMod means that
* for each term we will weight it +1 if it is a head,
* and +.5 if it is a mod. If the value is kHeadOnly
* we will weight each term with +1 if it is a head,
* and ignore mods entirely.
*/
int main(int argc, char **argv)
{
/* the driver program to get the noun phrases */
int token_id;
int i=1; I* tracks what string we are on in argv, the arguments list */
```

-continued

```
int doneWithOptions=0; /* Lets us break out of the option handling loop */
dlist *dn; /* A dictionary entry - used for "strong" words */
Word *missWords; /* pointer to words we missed in the missbuf */
Word *hitWords; /* pointer to words return by yyiex */
Word *tempWord;
NP tempNP; /* A temporary pomter to an NP structure used in
            * the title case to store the name that follows the
            * title before joining the two structures together into
            * one NP.
            */
clock_t start, finish, diff; /* Used for timings for each document */
if(argc>1) {
/* We have some command line arguments. */
/* should be like LinkIT (opts) filename */
/* For each of the arguments */
while (i < argc && !doneWithOptions) {
    if ((strcmp(argv[i], "-help") ==0)
            || (strcmp(argv[i], "-h") ==0)
            || (strcmp(argv[i], "-?") ==0)) {
            /* The help flag/option request */
            printf("usage: LinkIT (options) [filenames]\n");
            printf("\tIf no file name is supplied, stdin will be used\n");
            printf("\tfor the input, stdout for the output, and\n");
            printf("\tstats will go to np.stat\n");
            pnntf("\t-h\n\t-help\t\t  This message.\n∞);
            printf("\t-printPOS\t\tTurn on part of speech printing\n");
            printf("\t\t\t\tfor components of the NPs.\n");
            printf("\t-printPOS2\t\tTurn on POS tagging for components of NPs\n"
                    "but print the tags under the words in the NP.\n");
            printf("\t-v integer\n\t-verbosity integer\tA value ranging from\n");
            printf("\t\t\t\t0 to 10, indicating how much state infoimation to report\n");
            printf("\t-noStats\t\tTurns generation of statistical report (.stat) files.\n");
            printf("\t-noPrint\t\tTurns off printing to stdout.\n");
            printf("\t-noRel\t\t\tTurn off printing of word relations.\n");
            printf("\t-o Directory\n");
            printf("\t-output Directory\tSend the output to the named directory.\n");
            printf("\t\t\t\t-o with no argument defaults to current working directory.\n");
            printf("\t\t\t\t please note that without using -o, the only output will°n");
            printf("\t\t\t\t go to standard out. Not specifying -o and using -noPoint\n");
            printf("\t\t\t\t will suppress all output entirely.\n");
            printf("\t-d filenarne\n");
            printf("\t-dict filename\t\tName of the dictionary file to use.\n");
            printf("\t\t\t\tDefault is NP.dict\n");
            printf("\t-noFinal\t\tDo not print out the final list of sorted NPs at end of run.\n");
            printf("\t-printlnitial\tPrint the initial list of sequential NPs.\n");
            printf("\t-nowordLists\tDon't print the word lists (word as head, word as modifier) for each
word.\n");
            printf("\t-sort [freq | occ\tPrint out the list sorted by;\n");
            printf("\t\tfreq: \tPrint groups based on size of the group.\n");
            printf("\t\tocc : \tPrint groups staating with file first occurring term, it's group,\n");
            printf("\t\t\tthe next occurring term and it's group, etc.\n");
            printf("\t\t\tme default is to sort by frequency.\n");
            printf("\t\t\t-sort alone also defaults to sort by frequency.\n");
            printf("\t-noTime\t\tTurn off printing of timing information. (How many seconds"
                    "each file took.\n");
            printf("\t-properOnly\tOnly print the NPs that have a proper noun as the bead.\n");
            printf("\t-weight\tweight the terrns in WordList output (use heads and mods)\n");
            printf("\t-weightHeadOnly\tWeight the terms using only the head.\n");
            printf("\t-compareFormat\tPrint the format that is used to compare to min's termner.\n\t\t\tImplies
-noRel, -noWordLists\n");
            printf("\t-printOf\tInstead of a phead or pmod print the actual NP phrases that of modify.\n");
            printf("\t-printOnlyOfNPs\tPrint only the of modified NPs in list II\n");
            exit(1); /* We should exit right? Since they just wanted this info. */
    } else if(strcmp(argv[i], "-printPOS") == 0) {
            /* Turn the option ON to print the parts of speech in the NPs */
            gPrintPOS = 1; /* Print the parts of speech in the NPs */
            if (!gNoPrint)
                printf("Printing POS in NPs.\n");
    } else if(strcmp(argv[i], "-weight") == 0) {
            gWeightTerms = kHeadAndMod;
    } else if(strcmp(argv[i], "-printOf") == 0) {
            gPrintof = 1;
    } else if(strcmp(argv[i], "-printOnlyOfNPs") == 0) {
            gPrintOnlyOfNPs = 1;
    } else if (strcmp(argv[i], "-weightHeadOnly") == 0) {
            gWeightTerms = kHeadOnly;
    } else if((strcmp(argv[i], "-printPOS2") == 0) {
            gPrintPOS2 = 1;
    } else if((strcmp(argv[i], "-compareFormat") == 0)) {
```

```
            gCompareFormat = 1;
            gNoRel = 1;
            gPrintwordLists = 0;
    } else if((strcmp(argv[i], "-noWordLists") == 0)) {
            gPrintWordLists = ;
    } else if((strcmp(argv[i], "-verbosity") == 0)||(strcmp(argv[i], "-v") == 0)) {
            /* This is the switch for program verbosity. The higher the number, the
             * more verbose we are, the more debug messages and so on we will print.
             */
            gverbosity = atoi(argv[++i]);
            if (!gNoPrint)
                printf("Verbosity level set to %d\n",gVerbosity);
    } else if(strcmp(argv[i], "-noStats") == 0) {
            /* Do not print statistical report */
            gNoStats = 1;
            if(gVerbosity > 7)
                if(!gNoPrint)
                    printf("Not printing stats report.[1]0 n");
    } else if(strcmp(argv[i], "-noPrint") == 0) {
            /* Do not print to stdout */
            gNoPrint = 1;
    } else if(strcmp(argv[i], "-noRel") == 0) {
            /* Don't want to print the relations that we find
             * in CheckForCommonString
            /*
            gNoRel = 1;
    } else if(strcmp(argv[i], "-noFinal") == 0) {
            /* Print NPList at end */
            gPrintFinal = 0;
            if (gVerbosity > 7)
            if (!gNoPrint)
                printf("Will not print final list of NPs.   n");
    } else if(strcmp(argv[i], "-printInitial") == 0) {
            /* print the initial in order NPs */
            gPrintInitial = 1;
            if(gVerbosity > 7)
                if (!gNoPrint)
                    printf("Will not print out initial in order list of NPs.\n");
    } else if(strcmp(argv[i], "-output") == 0||strcmp(argv[i], "-o") == 0) {
            /* Option to set the directory for the output file(s) */
            if(argv[i+1][0]== '-') {
            /* Next arg is another arg. No directory named so
             * default to the current directory
             /*
            gOutDir = (char *)malloc(strlen("./")+1);
            assert(goutDir);
            strcpy(gOutDir, "./");
            fprintf(stderr,"No argument specificed after %s, defaulting to %s\n",argv[i], gOutDir);
            } else {
            gOutDir = (char *) malloc(strlen(argv++i])+1);
            assert(gOutDIr);
            strcpy(gOutDir, argv[i]);
            if(gVerbosity > 7)
                if (!gNoPrint)
                    printf("Putting output file(s) in %s.\n",gOutDir);
            }
    } else if(strcmp(argv[i], "-noTime") == 0) {
            /* Turn off the timing stuff */
            gNoTime = 1;
    } else if(strcmp(argv[i], "-properOnly") == 0) {
            /* Set the only proper nouns on print flag */
            gProperOnly = kNNP;
    } else if(strcmp(argv[i], "-dict") == 0 || strcmp(argv[i], "-d") == 0) {
            /* Change the dictionary file name */
            gDictFile = argv[++i];
            if(gVerbosity > 7)
                if (!gNoPrint)
                    printf("Using dictionary file %s\n",gDictFile);
    } else if(strcmp(argv[i], "-sort") == 0) {
            /* The sort option - can be followed by (for now)
             * "freq" - sort based on the number of terms in the groups
             * "occ" - the lexical occurrence of the terms.
             */
            if(argv[i] == '-') {
            /* The next arg is another option, so set to default for
             * this option.
             */
            gSortType = kTermFrequency;
            fprintf(stderr,"No sort type specified after -sort: defaulting to kTermFrequency\n");
```

-continued

```
            } else if(strcmp(argv[++i], "freq") == 0) {
                /* Set the sort by frequency option */
                gSortType = kTermFrequency;
        } else if(strcmp(argv[i], "occ") == 0) {
    /* Set file sort by term occurrence option */
    gSortType = kTermOccurrence;
    }
            } else if(argv[i][0]!='-') {
                /* All the options are preceded by a -, the rest of the
                * strings should be input file names
                */
                doneWithOptions = 1;
                if (freopen(argv[i], "r", stdin) == NULL) {
                printf("Can't open file %s. Aborting.\n", argv[i]);
                exit(1);
                }
                if (gverbosity > 0)
                   if(!gNoprint)
                      printf("Using file %s\n",argv[i]);
                /* Remember the file name in variable fileName */
                fileName = (char *) malloc(strlen(argv[i])+1);
                assert(fileName);
                strcpy(fileName, argv[i]);
            }
            i++;
        } /*the while*/
    } /* The if argc > 1 */
    /* Initialize the Dictionary (load it) */
    if (NPD_Init(gDictFile) == 0) {
        fprintf(stderr, "Error loading dictionary file.\n");
        exit(3);
    } else {
        if (gVerbosity > 8)
        if (!gNoPrint)
                printf("Loaded dictionary\n");
    }
    /* Loop for each of the remaining file names */
    while (i <= argc) {
    /* Process the file input/output options
        * Open the input file, open an output file
        * (possibly in a directory specified by -output)
        * open the file for stats
        */
    DoFileOptions(fileName);
    /* Initialize global variables we need.
    */
    DoGlobalInit( );
    /* Get the time that we start processing the file */
    start = clock( );
    /* yylex( ) is the call that will return an integer
        * specifying which rule was used to recognize a noun phrase,
        * and the actual noun phrase will be in the variable
        * yytext
        *
        * Should make a list of NPs here and look at how to relate
        * them. Right now this is just looping through the file to
        * get all the NPs it finds and print them out. Later should
        * change the output to here - perhaps will be able to
        * consolidate nps . . .
        *
        * - Changed the above. We do make a big list of NPs now.
        *
        * Any non-noun phrase entity is printed out in the lexing
        * process, but is not accessible here.
        *
        * - Changed the above. All the non-NP stuff is printed
        * out here. We don't save that non-NP stuff beyond
        * ifs use here though, which is why we have to print
        * out the NPs as we go as well - if we saved the non-NP
        * stuff as well, then we could print it all out at one
        * time.
        *
        * How the dictionary works:
        * only do this if the last thing was an NP (check apposition stack)
        * Look up the head noun of the LAST NP we got.
        * The current NP is under the effects of the stuff
        * if the current missBuf - that is what immediately
        * proceeds that NP. So we look up the head of the LAST
        * NP and check the missbuf to see if that matches. If
```

-continued

```
        * so we join the current NP with the last NP (decrement
        * the number of NPs as well) and print it out specially
        * on that same line (maybe with a + or something)
        * - if we printed out all the NPs at the end, it would
        * be correct, but since we already printed everything out . . .
        * unless we went back and erased what we already did that is
        * the best we can do. It is ok though because it will be a good
        * visual indicator of what just happened - that a strong word
        *joined these two NPs. We will __LOSE THAT__in the data
        * structure though. might want to add that info in there somehow.
        */
/*If we are printing out initial stuff, print
        * a header for the stuff
        */
        if (gPrintInitial) {
                Print("\n\n-------------------------------------\nO: Text with
NPs:\n----------------------------------------\n");
}
        while ((token__id = yylex( ))) {
        switch (token.3id) {
        case kEnamex:
                        /* printf("Recognized via Enamex\n"); */
                        goto NormalNP;
                case kRepeatedNoun:
                        /* printf("Recognized via RepeatedNoun\n"); */
                        goto NormalNP;
                case kAdjNoun:
                        /* printf("Recognized via AdjNoun\n"); */
                        goto NormalNP;
                case kPronoun:
        /* printf("Recognized via Pronoun\n"); */
        goto NormalNP;
NormalNP:
        /* This is the processing for a "Normal" NP */
        /* Null-terminate the miss-buffer, count words, stats, print. */
        missWords = ProcessMissBuf( );
        hitWords = ProcessHitBuf( );
        /* Check to see if we need to prepend
        * gLastAdjCC
        */
        if(gLastAdjCC != NULL) {
        /* Prepend if it exists, and if there is nothing
        * in the miss buffer (save possibly white space)
        */
        if (missWords == NULL) {
        /* Add it - there is nothing in the miss buffer */
        /* Prepend the words from kAdjCC to hitWords
        */
        Word *tempWord;
        /* Get to end of tempWords and point to hitWords */
        tempWord = gLastAdjCC->words;
        while (tempWord && tempWord->next)
        tempWord = tempWord->next;
        tempWord ->next = hitWords;
        /* point hitWords to "new" head */
        hitWords = gLastAdjCC->words;
        /* Get rid of one NP num here too */
        gNPNum--;
        /* Now set gLastAdjCC to null - don't free word because
        * those are part of hitWords
        /*
        free(gLastAdjCC);
        gLastAdjCC = NULL;
        } else {
        /* Don't add it - the miss buffer had something in it. */
        /* If we are gPrintInitial, print out the words in gLastAdjCC
        */
        if (gPrintInitial)
                        printWords(gLastAdjcc->words);
                        /* Remove one NP from the gNPNum variable --
                        * this AdjCC thing took one up when it shouldn't
                        * have (it isn't an NP)
                        */
                        gNPNum--;
                        /* Clear out and null gLastAdjCC */
                        ClearLastAdjCC( );
                }
        }
        /* Check dictionary for "strong" nouns
```

-continued

```
 * in the head of the previous NP
 */
if((APS_Peek(gAppStack) != kComma) &&
        (dn = NPD_Lookup(lastWordofNp(gNpList.tail))) != NULL) {
    APS_UndoClear(gAppStack); /* Undo ffie previous clear we did in processmissbuf */
    /* The head of the previous NP is in the dictionary */
    if(dn->type == kStrong) {
    /* It is a strong noun */
    /* Check to see if the missBuf was the correct word */
    /* that there was only that word
     * and that there was at least something in the missbuffer
     /*
    if(missWords != NULL && missWords->next == NULL
            && strcmp(missWords->str, dn->takes) == 0) {
        /* We can join the previous NP and this NP */
        /* We will set the of modifier fields of both NPs to indicate they
         * are related
         /*
        /* Make this NP from the global */
        CreateNP(&gNP, hitWords);
        /* This NP is of Modified by the previous NP */
        gNP.ofModified = gNPList.tail->num;
        /* The previous NP is an of Modifier of this NP */
        gNPList.tail->ofModifier = gNP.num;
        if (gPrintInitial)
                Print("\t\t\t");
                if (gPrintInitial)
                        printWords(missWords); /* Print file "of" word */
                /* Check for common strings in previous NPs */
                CheckForCommonString(&gNPList, &gNP);
                NPL_CopyToTail(&gNPList, &gNP);
                /* Insert a copy of the current NP in the list at the tail */
                if (gPrintInitial) /* Only output here if we aren't printing final */
                Output(gNPList.tail);
                /* Print the NP we just added to the end of the list */
                freeWords(missWords);
                /* Free these words, we just printed them and don't need them
                 * any more
                 */
                break; /* Done */
                }
        }
    }
    if (gPrintInitial)
    printWords(missWords); /* Print the words out */
    /* Update apposition stack with a NP */
    APS_Add(gAppStack, kNP);
    /* Take the text from the lexer and place it in a
     * structure that represents the NP.
     */
    CreateNP(&gNP, hitWords);
    /* Check for common strings in previous NPs */
    CheckForcommonString(&gNPLISt, &gNP);
    NPL_CopyToTail(&gNPList, &gNP);
    /* Insert a copy of the current NP in the list at the tail */
    if (gPrintInitial)
    Output(gNPList.tail);
    /* Print the NP we just added to the end of the list */
    freeWords(missWords);
    /* Free these words, we just printed them and don't need them
     * any more
     */
    break;
case kPossesive:
    /* We have a possesive 's
     * <lex pos=POS>'s</lex>
     */
    /* Or, alternatively here could
     * ProcessHitBuf( )
     * and then append that word structure to the
     * end of the previous NP
     */
    /* Update global stats on 's
     */
    gPOSTagStats[kPOS]++;
    /* Want to make the next NP "+of" the previous NP
     */
    gNextNPPossModified = 1;
    /* Set this to be of modified by the next NP.
```

-continued

```
            * Boston's Dana-Farber Cancer Institue ==
            * Dana-Farber Cancer Institute of Boston
            * so this is of modifief by the NEXT NP
            */
            gNPList.tail->ofModified = gNpList.tail->num + 1;
            /* Add the 's to the previous NP */
        tempWord = gNpList.tail->words;
            while (tempWord->next != NULL)
                    tempWord = tempword->next;
            tempWord->next = (Word * )malloc(sizeof(Word));
            assert(tempWord->next);
            tempWord = tempWord->next;
            ternpWord->str = (char *)malloc(3);
            assert(tempWord->str);
            strcpy(tempWord->str, "'s");
            tempWord->next = NULL;
            tempWord->tag = kPOS;
            tempWord->function = kNormal;
            tempWord->num = gWordNum - 1;
            tempWord->relWord = NULL;
            tempWord->reINP = NULL;
            tempWord->wordNP = gNPList.tail;
            if(gprintInitial)
                    Print("\t\t\t's (poss)");
            break;
        case kTitle:
            /* We have a Mr. or a Dr. - we should
            * join that with the next NP and indicate
            * that it is human
            * Note this could be a source oferror as it is because
            * 1 just take the next NP and join it with the Mr./Dr.
            * What happens in a case like: He said "Hey, Mr!↩
            * So I should check the missbuff or something like that . . .
            */
            /* Null-terminate the miss-buffer, count words, stats, print. */
            missWords = ProcessMissBuf( );
            hitWords = ProcessHitBuf( );
            /* Update apposition stack with a NP */
            /* Check dictionary for "strong" nouns */
            if (APS_Peek(gAppStack) != kComma && (dn = NPD_Lookup(lastWordOfNP(gNPList.tail)))
!= NULL) {
            APS₁₃ UndoClear(gAppStack); /* Undo the previous clear we did in processmissbuf */
            /* The head of the previous NP is in the dictionary */
            if (dn->type == kStrong) {
            /* It is a strong noun */
            /* Check to see if the missBuf was the correct word */
            /* and that there was only that word */
            if (missWords->next == NULL && strcmp(missWords->str, dn->takes) == 0) {
            /* We can join the previous NP and this NP */
            /* Make this NP from the global */
            CreateNp(&gNP, hitWords);
            /* Insert the joining word in <TITLE>'s words */
            missWords->next = gNP.words;
            gNP.words = missWords;
            joinNP(gNPList.tail, &gNP); /* Join the prev NP and Mr. */
            /* Now we want to get the next NP and join it to the Mr. */
            yylex( ); /* Get the text of the next NP */
            /I* Put the text from yytext into the hitWords buffer */
            hitWords = ProcessHitBuf( );
            CreateNp(&gNP, hitWords); /* Make an NP out of it */
            /* Check for common strings in previous NPs */
            CheckForCommonString(&gNPList, &gNP);
                    gNpList.tail->human = kHuman; /* This is a human pretty reliably */
                    /* Join the NPs */
                    joinNp(gNPList.tail, &gNP);
                    gNpList.tail->head = gNP.head; /* Make the head of the name the head of the whole phrase
*/
                if (gPrintInitial)
                        Print("\t\t + ");
                if (gprintInitial)
                        printWords(gNP.words);
                if (gPrintInitial)
                        Print("\n");
                break; /* Done */
                }
            }
        }
        if (gPrintInitial)
        printWords(missWords); /* Print the words out */
```

```
            APS_Add(gAppStack, kNP);
            /* Take the text from the lexer and place it in a
             * structure that represents the NP.
             */
            CreateNP(&gNP, hitWords);
            /* Now we want to get the next NP and join it with this one */
            yylex( ); /* Get the text of the next NP */
            /* Put the text from yytext into hitWords */
            hitWords = ProcessHitBuf( );
            CreateNP(&tempNP, hitWords); /* Make an NP out of it */
            joinNP(&gNP, &tempNP); /* Join the two NPs */
            /* Check for common strings in previous NPs */
            CheckForCommonString(&gNPList, &gNP);
            NPL_CopyToTail(&gNPList, &gNP); /* Insert a copy of the title NP in the list at the tail */
            gNpList.tail->human = kHuman; /* This is a human pretty reliably */
            gNPList.tail->head = gNP.head; /* Make the head of the name the head of the whole phrase */
            if (gprintInitial)
                 Output(gNpList.tail);
            break;
    case kSentStart:
            /* Start of a sentence, not a NP */
                 /* printf("Recognized via SentStart\n"); */
                 break;
            case kSentEnd:
                 /* End of a sentence, not a NP */
                 /* printf("Recognized via SentEnd\n"); */
                 /* Print out any words we might have "missed."*/
                 if (gPrintInitial)
                 printWords(ProcessMissBuf( ));
                 /* We don't want the possesive 's things to carry over
                  * across sentences, so reset the variable that controls
                  * attachment off.
                  */
                 gNextNPPossModified = 0;
                 break;
            case kComma:
                 /* A comma, also not itself a NP */
                 if (gPrintInitial)
                 printWords(ProcessMissBuf( ));
                 /* Check to see if we have a possible apposition */
                 if (gAppstack[0] = kNP && gAppStack[1] == kComma && gAppStack[2] == kNP) {
                 /* We have a pattern of NP, NP, so it is a possible apposition */
                 /* Make a note in the data structures, then print it out */
                 gNPList.tai!->appositiveNum = gNPNum-1;
                 if (gPrintInitial)
                 Print("\tPossible apposition: NP%d, NP%d,\n",gNPNum-1, gNPNum);
                 /* Remove the last NP from the apposition stack -
                  * essentially collapse NP, NP , to NP,
                 /*
                 APS_Remove(gAppStack);
                 } else {
                 /* Update apposition stack with a Comma */
                 APS_Add(gAppStack, kComma);
                 }
                 /* printf("Recognized via Comma\n"); */
                 if (gPrintInitial)
                 Print(",");
                 break;
    case kAdjCC:
                 /* We want to merge this with the next NP
                  * iff there is no intervening text between
                  * this and the NP.
                  * Place this in a variable, and when we get the
                  * next NP check ifgLastkdjCC exists, if so,
                  * check to see if we have an empty miss buffer,
                  * if so add it. If not, clear out the
                  * gLastkdjCC variable.
                  */
                 /*
                  * Print("Got kAdjCC: %s\n", yytext);
                  */
                 if(gLastAdjCC != NULL) {
                 /* There is something in there.
                  * The last phrase was also an AdjCC
                  * In this case, do we want to join the two?
                  * For now, don't.
                  */
                 fprintf(stderr,"Found a second kAdjCC immediately after another!\n"
                          "I will ignore the firsth kAdjCC and remember the second.\n");
```

-continued

```
            /* Free the words of the gLastAdjCC variable
            /*
            ClearLastAdjCC( );
            }
            /* Now we have to create the NP for this thing */
            /* Null-tenninate the miss-buffer, count words, stats, print. */
            missWords = ProcessMissBuf( );
            hitWords = ProcessHitBuf( );
            /* Get the words for this NP (?? not really NP) */
            /* Allocate the memory for this NP */
            gLastAdjCC = (NP*) calloc(1, sizeofNP));
            assert(gLastAdjCC);
            CreateNp(gLastAdjcc, hitWords);
            if (gPrintInitial)
            printWords(missWords); /* Print the words out */
            /* We would print the words for the kAdjCC here,
            * but if it gets joined to an NP, we don't want to
            * print it here, since it will show up in the NP
            * when that is printed. When we check for
            * whether to add this onto the NP or not, if
            * we decide not, then we will print out the words
            * of this np using printwords.
            */
            freeWords(missWords);
            /* Free these words, we just printed them and don't need them
            * any more
            */
            break;
        case kParagraph:
            /* Update the number of paragraphs we have seen.
            */
            if (gPrintInitial)
            Print("\nPP %d\n",gParaNum);
            gParaNum++;
            break;
    }
}
/*
|
| Done with that really large case statement.
|
*/
/* There is a chance that there is some "missed" text left over
* after the last NP is returned. We want to be sure to get the
* stats on that as well.
*/
if (gPrintInitial && !gNoPrint) {
/* If we are printing stuff out, print it out
*/
printWords(ProcessMissBuf( ));
} else {
/* Not printing stuff out. Still want to process the
* missbuffer for statistics
*/
ProcessMissBuf( );
}
if (gPrintInitial)
Print("\n");
/* Create the new SGML output file here
* Give the filename of the input file we used,
* create an output file that ends in out
* and
* Add in the tags to identify the NPs
* taken from the NPList gNPList
*/
WriteSGMLOutput(fileName, gNPList);
/* Print out the list of NPs to see if they were collected correctly
* We have the list in memory, and can use it if we wanted
*
* We want to print out the list ordered by head nouns now.
*/
if (gPrintFinal) {
if (gPrintFinal)
            /* We should add in something to turn this off */
            if (!gcompareFormat) {
            Print("\n\n----------------------------\nI: In-order Simplex NP Listing:\n-------------------------------\n");
            NPL_Print(&gNPList);
            }
```

-continued

```
    Print("\n\n---------------------------------\nII: Noun Phrases Ordered by
Heads:\n---------------------------------\n");
            NPL_PrintOrdered(&gNPList, gSortType, gProperOnly);
            Print("\n");
        }
        if (gPrintWordLists == 1) {
        /* Print the word lists for each word:
         * each word if it is in a head, and mod
         */
    Print("\n\n---------------------------------\nIII: Words as heads and
mods:\n-------------------------------------\n");
            WI_PrintWordList(gWeightTerrns);
        }
        /* We are done processing the file. Now we can output
         * whatever statistics we want, if that option is set.
         */
        if(!gNoStats) {
        OutputStats( );
        OutputStats2( );
        }
        /* Get the ending time */
        finish = clock( );
        /* Get the difference in time, and print out */
        diff = difftime(finish, start);
        if(!gNoTime) {
        Print("\n_____ Timing Information\n");
        Print("Took %ld ticks (%f seconds)\n", diff, ((float) diff) / ((float) CLOCKS_PER_SEC));
        Print("finish: %ld start: %ld\n", finish, start);
        }
        fclose(gOut); /* Close the output file up */
        /* Free up storage used by globals here */
        DoGlobalFree( );
        /* Get new fileName right here
         * - but only if we have a file name to get!
         */
                if(i <argc) {
                if (freopen(argv[i], "r", stdin) == NULL) {
                        fprintf(stderr, "Can't open file %s. Aborting.\n", argv[i]);
                        exit(1);
                }
                if (gVerbosity > 0)
                        printf("Using file %s\n",argv[i]);
                /* Remember the file name in variable fileName */
                fileName = (char *) malloc(strlen(argv[i])+1);
                assert(fileName);
                strcpy(fileName, argv[i]);
            }
            i++; /* Increment file name counter */
        }
        /* Free the memory used by the dictionary */
        NPD_Free( );
        /* Done with processing */
        return(0);
}
/* WriteSGMLOutput( )
 * Write out a copy of the input file and add in the tags for
 * the NPs that we identified
 *
 * fileName is the name of the input file. Copy this file
 * until we see the start of an NP that we identified, and
 * then write out the NP tag, words in the NP, continue on
 * to the next NP
 *
 * theList is the NPList that has all of the NPs that we
 * identified.
 *
 * has trouble with the dates that are not in tags yet!!
 */
void WriteSGMLOutput(char *fileName, NPList theList) {
FILE *input, *output;
char*outName, *s;
int tokenNum=0;
enurn tagTypes tokenTag;
NP *tempNP;
Word *tempWord;
/* Open up the file that they gave us as the input */
input = fopen(fileName,"r");
if (input == NULL) {
    fprintf(stderr, "WriteSGMLOutput Error: couldn't open %s for reading!\n",fileName);
```

-continued

```
    return;
}
outName = (char * )calloc(strlen(gFileBaseName)+strlen(gOutDir)+1+4, sizeof(char));
assert(outName);
strcpy(outName, goutDir);
strcat(outName, gFileBaseName);
strcat(outName,".out");
output = fopen(outName, "w");
assert(output);
if (gVerbosity > 1)
    printf("Created %s for SGML output.\n", outName);
tempNP = theList.head; /* get to the first Np */
while ((s = getOneToken(input)) != NULL) {
/* Print the tokens that are not in NPs as they are,
* but the ones that are in NPs print the NP tag out first
* and then also put the individual word information in there
* as well!
*/
/* Don't increment tokenNum if it was a period or comma */
if(((tokenTag = getTokenTag(s)) == kComma || tokenTag == kPeriod || tokenTag == kPOS)) {
} else {
tokenNum++;
}
    if (tempNP == NULL || (tokenNum <tempNP->wordStart)) {
    fprintf(output, "%s", s);
    free(s);
    } else {
    /* We have a token that starts an NP
    */
    /* Print the NP tag */
    fprintf(output,"<NP NUM=%d GROUP=%d SENT=%d START=%d FINISH=%d HEAD=%d"
        ,tempNP->num, tempNP->prevOccNum, tempNP->sentNum, tempNP->wordStart
        ,tempNP->wordEnd, tempNP->head->num - tempNp->wordStart);
    if (tempNP->appositiveNum !=0)
        fprintf(output, "PAPP=%d",tempNP->appositiveNum);
    fprintf(output, ">");
    /* We have printed the NP tag. Now we have to print each word */
    tempWord = tempNP->words; /* Get the list of Words */
    while (tempWord != NULL) {
        /* For each word, we have the "parallel" string. This string might
        * contain formatting information, or other interesting stuff that
        * we don't know about, such as <5> <P>, \n, etc. We should really
        * print this out. This stuff will always be at the front of the
        * string. We want to print what is first before the tag that was
        * returned. So that is anything before xxxxx<TAGOPEN> . . . </TAGCLOSE>
        * (all the xxxx stuff, which could be a non-closing tag itself, like <5>
        */
        char *leading;
        leading = getLeadingString(s);
        if(leading != NULL) {
        fprintf(output,"%s", leading);
        free(leading);
        }
        /* Check to see if this word is a start or end of an ENAMEX,
        * if so, print out the tags for that.
        */
        if (tempWord->enamex == kEnamexPerson || tempWord->enamex - kEnamexEnd ==
kEnamexPerson)
        fprintf(output, "<ENAMEX TYPE=PERSON>");
        else if (tempWord->enamex == kEnamexOrganization || tempWord->enamex - kEnamexEnd ==
kEnamexOrganization)
        fprintf(output, "<ENAMEX TYPE=ORGANIZATION>");
        else if (tempWord->enamex == kEnamexLocation || tempWord->enamex - kEnamexEnd ==
kEnamexLocation)
        fprinf(output, "<ENAMEX TYPE=LOCATION>");
        /* Print this word, add any information we might need to to the
        * LEX tag, and also get the next token from the input file
        * (to keep things parallel. There will be problems with this
        * though - need to change the LinkIT word counting to be in sync
        * with getOneToken( )
        */
        fprintf(output,"<lex"); /* Base tag */
        /* Optional parts: functional role of word
        * kNormal - nothing
        * kPost - position (post=WHOLE)
        * kTitle - title word (title=WHOLE)
        */
        if (tempWord->function == kTitle)
        fprintf(output,"title=WHOLE");
```

-continued

```
            else if (tempWord->function == kPost)
            fprintf(output, "post=WHOLE");
            /* Optional part: previous occurrence of this word
            * print in format:
            * POCC="NPNum,WordNum"
            */
            if (tempWord->relWord != NULL) {
               if (tempWord->relWord && tempWord->relWord->relNP)
                  fprintf(output,"POCC-\"%d,%d\"", tempWord->relWord->relNP->num,
                        tempWord->relWord->num);
            }
            /* The final, required pos tag
            * also the ending LEX tag, and a space for the next word
            * if we are not the last word
            */
            fprintf(output,"pos=%s>%s<lex>%s", posTagToString(tempWord->tag),
                              tempWord->str, tempWord->next == NULL?"":":");
                     /* If it is an ending ENAMEX tag, print that out too.
                     */
                     if (tempWord->enamex >= kEnamexEnd)
                        fprintf(output, "</NAMEX>");
                     tempWord = tempWord->next;
                     free(s);
                     if(tempWord != NULL) {/* If we are null, then the while loop will
                                   * get a new s for us
                                   s =*/
                     s = getOneToken(input);
                     /* Don't increment tokenNum if it was a period or comma */
                     if ( s == NULL || ((tokenTag = getTokenTag(s))== kComma || tokenTag == kPeriod ||
tokenTag == kPOS)) {
                     } else {
                           tokenNum++;
                     }
                  }
               }
               /* And now print the end of the NP tag */
               fprintf(output,"</NP>");
               /* Get the next NP */
               tempNP = tempNP->next;
               /* Don't free the word accounting after this -- we already did -- just continue */
               continue;
         }
         free(s);
      }
      fprintf(output,"\n");
      fclose(output);
      fclose(input);
}
/* getLeadingString(char * s)
* For each word, we have the "parallel" string. This string might
* contain fonnauing information, or other interesting stuff that
   * we don't know about, such as <S><P>\n, etc. We should really
   * print this out. This stuff will always be at the front of the
   * string. We want to print what is first before the tag that was
   * returned. So that is anything before xxxxx<TAGOPEN> . . . </TAGCLOSE>
   * (all the xxxx stuff, which could be a non-closing tag itself, like <s>
   */
   char *getLeadingString(char *s) {
         char *tagClose, *temp, *leading, *temp2;
   /* Search backwards for the first "/"
   */
   if (s == NULL)
         return NULL;
   temp s + strlen(s); /* Get to end of string */
   while (temp != s && *temp != '/')
         temp--;
   if(temp != s) {
         /* We now know what the "tag" is. Search backwards for the
         * open of the tag (something of the form <tag
         */
   char *tagOpenS;
   tagClose = temp;
   tagOpenS = (char *) calloc(strlen(tagClose)+1, sizeof(char));
   assert(tagOpenS);
   strcpy(tagOpenS, tagClose);
   tagOpenS[0]='<'; /* Change the "/" to a "<" */
   tagopenS[strlen(tagOpenS)-1] = '\0'; /* terminate string at the ">" mark */
   /* Search backwards for tag open */
   while (temp != s && strncmp(temp, tagOpenS, strlen(tagOpenS)) != 0)
```

```
            temp--;
    if (temp == s)
        return NULL;
    else {
        /* We found the opening tag, and there is some leading string
         * create that string and return it
                */
            /* We don't want to return any <ENAMEX . . . > things though.
            */
            temp2 = s;
            while (temp2 != temp && strncmp(temp2, "<ENAMEX",7) != 0)
                    temp2++;
            if (temp2 < temp)
                    temp = temp2;
            leading = (char *) calloc(temp-s+1, sizeof(char));
            assert(leading);
            strncpy(leading, s, temp-s);
            return leading;
        }
    } else {
        /* temp == s, we didn't find a "/" in the whole string
         * This is a problem, big error condition
         */
        fprintf(stderr, "Didn't find close tag in %s!!\n",s);
        exit(2);
    }
}
/* getTokenTag( )
 * Return the tag of the token
*/
enum tagTypes getTokenTag(char * s) {
char *tag;
char *start, *end;
enurn tagTypes myTag;
if (s == NULL) {
if (gVerbosity > 3)
fprintf(stderr,"getTokenTag: passed a NULL string !\n");
return ( );
}
/* Identify the tag string, and convert it */
    start = s;
    while (start - s <strlen(s) && strncmp(start, "pos=", 4) != 0)
            start++;
    if (start - s == strlen(s))
            return ( );
            start+=4;
            end = start;
            whiie (*end != ' '&& *end != '>')
            end++;
    tag = (char *) calloc(end-start+2, sizeof(char));
    assert(tag);
    strncpy(tag, start, end-start);
    myTag = convertPOSTag(tag);
    free(tag);
    return myTag;
        }
/* getOneToken( )
    * Return one 'token' from the FILE
    *
    * One token will be one word that is not a tag
    * so if we have a <ENAMEX . . . ><LEX . . . >ljkal;as </LEX>
    * that wiII be returned as a token. At some point
    * we will also return a <LEX . . . >lsadkljsd; </LEX></ENAMEX> as well
    *
    * If the file is empty, return NULL
    */
char *getoneToken(FILE *input) {
    static char buffer[1024]; /* Static buffer to read into over invocations */
    static int bufIndex=-1; /* Static index pointing to current location
                            * in buffer. A -1 value means we have read
                            * all that is in the buffer and need to refresh
                            * it at some point. soon.
                            */
static char *result="stopComplaining"; /* Will go to NULL when input file exhausted */
/* Also the static "stopComplaining" will keep the compiler from complaining:
    * we need this value to not be null on the initial pass through.
    */
int done=0, finalCloseTag=0, inCloseTag=0;
int startIndex; /* Start of the string we will return in buffer */
```

-continued

```
char *token; /* the token to return */
    /* We have a buffer with some number of characters in it
    * We want to run through this buffer and return the
    * first token in it -- as defined above
    *
    * We have to watch out for a token running off the end of
    * our buffer, which we will have to re-fill and then
    * continue searching for the end of the token. could
    * possibly happen any number of times.
    /*
    startIndex = bufIndex; /* Start where we last left off */
    token = NULL; /* nothing in there yet */
    while(!done) {
    if(bufIndex == -1 && result != NULL) {
        /* Read in 1024 more bytes into the buffer */
        result = fgets(buffer, 1024, input);
        /* result will be EOF if we got an EOF */
        bufIndex = 0; /* start from the beginning of the new buffer */
        startIndex = 0;
        if(result == NULL) {
            /* We read the entire file */
            /* We want to end once we have found the token */
        }
    } else if(bufIndex== -1 && result == NULL) {
        /* We have finished once. Maybe we got a new file?
        * If it was an old file, just return NULL. If a new one,
        * start all over. Check to see if it was old by reading
        * on the file again. If NULL again, we know it is an empty
        * file. If it is not, then it is a new file, and continue as
        * normal.
        */
    if ((result = fgets(buffer, 1024, input)) == NULL)
            return NULL;
        else {
            bufIndex = 0;
            startIndex = 0;
        }
    }
    }
    if(bufIndex == 1024) {
        bufIndex '2 -1; /* Need to re-fill the buffer */
        /* Since we will re-fill the buffer, copy what we have
        * in the buffer to token
        */
        if (token == NULL) {
            token = (char *) calloc(1024-startIndex + 2, sizeof(char));
            assert(token);
            strncpy(token, buffer+startIndex, bufIndex-startIndex);
        } else {
            /* We already have something in token, so re-alloc it
            */
            token = (char *)realloc(token, strlen(token)+1+1024-startIndex+1);
            assert(token);
            strncat(token, buffer+startIndex, bufIndex-startIndex);
        }
    } /* bufIndex== 1024 */
    while (!finalCloseTag && bufIndex != -1) {
    /* Look for a close tag (search for "<\" */
    while (bufIndex < 1024) {
            if (buffer[bufIndex] == '\0'{
            /* Copy what we have so far */
            if (token == NULL) {
            token = (char *) calloc(bufIndex-startIndex + 1, sizeof(char));
            assert(token);
            strncpy(token, buffer+startIndex, bufIndex-startIndex);
            } else {
            /* We already have something in token, so re-alloc it
            */
            token = (char *)realloc(token, strlen(token)+1+bufIndex-startIndex);
            assert(token);
            strncat(token, buffer+startIndex, bufIndex-startIndex);
            }
            bufIndex = -1; /* Need to re-fill buffer */
            break;
            }
            if (buffer[bufIndex-1] == '<' && buffer[bufIndex] == '/')
                inCloseTag = 1;
            if (inCloseTag && buffer[bufIndex-1] == '>'&& isspace(buffer[bufIndex])) {
                /* Found the last close tag, flag it off */
                finalCloseTag = 1;
```

-continued

```
                    break;
                } else if(inCloseTag && buffer[bufIndex-1] == '>' && !isspace(buffer[bufIndex])) {
                    /* this is a tag that is closed, followed by another something */
                    /* if that something is the start of another tag, then we are done */
                    I* If it is another close tag, then we are not */
                    if (buffer[bufIndex] != '<') {
                        /* It is not another close tag, so we had found the final close tag */
                        finalCloseTag = 1;
                        break;
                    } else {
                        /* it might be another close tag */
                        if(bufIndex < 1023 && buffer[bufIndex+1] !='/') {
                        /* it wasn't - it is opening another tag. we are done then. */
                        finalCloseTag = 1
                        break;
                        } else {
                        /* It is another close tag. Keep going to then end of it eh. *#
                        }
                    }
                }
                bufIndex++;
            }
        }
        if(bufIndex != -1)
            done = 1;
    } /* the while loop */
    /* Copy in the to token */
    if(token == NULL) {
    token =(char *) calloc(bufIndex-startIndex + 2, sizeof(char));
        assert(token);
        strncpy(token, buffer+startIndex, bufIndex-startIndex);
    } else {
        /* We already have something in token, so re-alloc it
        /*
        token = (char *)realloc(token, strlen(token)+1+1024-startIndex+1);
        assert(token);
        strncat(token, buffer+startIndex, bufIndex-startIndex);
        }
        return token;
}
/* DoGlobalFree( )
    * Free up the memory used by global structures
    */
void DoGlobalFree( ) {
    NP *temp;
    WL_Free( ); /* Free the WordInfo structure */
    /* Free the flle names, gOutFile, gStatFile, because they will
        * be changed on the next run to new file names
        */
    if(gOutFile != NULL) {
        free(gOutFile);
        goutFile = NULL;
    }
    if(gStatFile != NULL) {
        free(gStatFile);
        gStatFile = NULL;
    }
    if(gFileBaseName != NULL) {
        free(gFileBaseName);
        gFileBaseName = NULL;
    }
    /* Free gWords */
    /*
        * We free all of the words in the list, the tail of which
        * is actually the word list for gwords -- so we don't want to
        * free that twice.
        * freeWords(gWords);
        * gWords = NULL;
        */
    /* Free the NPList gNPList */
    gNpList.numNPs = 0; /* Reset that quantity */
    /* Starting at the head of the list ofNPs, free
        * each NP and advance on item. Stop when we reach the
        * end of the list, or the head is null. (head should only
        * be null if the list is null.)
        */
    while (gNPList.head != NULL && gNPList.head != gNPList.tail) {
        /* For each NP, free the list of words associated with it */
        freeWords(gNPList.head->words);
```

```
            temp = gNpList.head->next; /* Remember the next item */
            free(gNpList.head); /* Free the space for this NP structure */
            gNPList.head = temp; /* Move head to point to next item */
      }
      if(gNpList.head != NULL) {
            /* stopped in the case where head = tail, one item left */
            freeWords(gNPList.head->words);
            free(gNpList.head);
      }
      gNPList.head = NULL;
      gNPList.tail = NULL;
}
/* DoGlobalInit( )
      * Initializes the global variables that we use for each run
      * Do not initialize the state variables that control program
      * behavior - those have been set by the option handling
      * previously, and should remain constant through all
      * runs.
      */
void DoGlobalInit( ) {
      int i;
      gNPNum = 0;
      gSentNum = 0;
      gInTag = 0;
      gWordNum = 1;
      gParaNum = 1;
      gGotword = 1;
      gWords = NULL;
      /* Clear out the POS tags count array */
      for (i=kJJ; i<=kVBM; i++)
            gPOSTagStats[i] = 0;
            gNewPP = 1;
            gMissLen = 0;
            /* clear out the apposition stack */
            APS_Clear(gAppStack);
            gNPList.numNPs = 0;
            gNPList.head = NULL;
            gNPList.tail = NULL;
            gNextoccNum = 1; /* Re-set the numbering of the "chains" */
            gNextNPPossModified=0; /* Don't carry 's modification over across files! */
            WI_Init( ); /* Initialize the Word Info stuff */
}
/* DoFileOptions( )
      * Process the file input/output options
      * Open the input file, open an output file
      * (possibly in a directory specified by -output)
      * open the file for stats
      * also print a header for the output file
      * <fileName> processed on <time>
      *
      * Set the global variable gFileBaseName to the
      * base name of the file (strip the first .ext
      * from the right of the string if present, if
      * no .'s in the string, then copy it straight over
      *
      */
void DoFileOptions(char *fileName) {
      time_t myTime;
      if (fileName != NULL) {
      /* If we have no file name - we are getting input from
      * Standard Input. Send the output to standard output as
      * well. Otherwise, open up a file to send the output to
      * as well
      */
      char *temp, *temp2;
      /* Set temp to the end of the file and then search backwards for.
      */
      temp = fileName + strlen(fileName);
      while (temp != fileName && *temp !='.')
            temp--;
      /* Also get only the file name, so strip off any
      * leading path elements
      */
      temp2 = fileName + strlen(fileName);
      while (temp2 != fileName && *temp2 !='/')
            temp2--;
      temp2++; /* We were pointing at the "/" which we don't
                  * want included in the base name.
                  */
```

-continued

```
        if(temp != fileName) {
            /* We found a period, so copy from fileName up to temp
             * for the gFileBaseName
             */
            gFileBaseName = (char *) calloc(temp - temp2, sizeof(char) + 1);
            assert(gFileBaseName);
            strncpy(gFileBaseName, temp2, temp-temp2);
        }
        /* If we want to place the files in a specified directory,
             * Check to see how much we need to add onto the file name
             * add 4 for .np\n if no directory to prepend
             * add 5 for directory seperator / and .np\n if dir to prepend
             */
        if(gOutDir[0] != '\0')
            goutFile = (char *)malloc(strlen(fileName)+strlen(gOutDir)+10);
        else
            gOutFile = (char *)malloc(strlen(fileName)+10);
        assert(gOutFile);
        if(gOutDir[0] != '\0') {
            /* Need to prepend the file name */
            strcpy(gOutFile, gOutDir);
            /* If they do not end the directory with a path seperator,
             * we need to add one.
             */
            if (gOutFile[strlen(gOutFile)] != '/')
                strcat(gOutFile, "/"); /* Get the path seperator */
            /* We only want to add the file name part of the
             * file name - it very well may be a more complete
             * path specification, but we don't want to add all ofthat.
             *
             * ie LinkIT -o ~devans/out/~devans/in/somefile.tagged
             *
             * we want the gOutFile to be ~devans/out/somefile.np
             */
            /* Set a temp pointer to the rear of the string
             * and search backwards until we get to the front,
             * or the first path seperator.
             */
            temp = fileName + strlen(fileName);
            while (temp != fileName && *temp !='/') {
                temp--;
            }
            if (*temp == '/')
                temp++; /* don't want to include that "/" in there! */
            strcat(gOutFile, temp); /* And finally copy the file name */
        } else
            strcpy(gOutFile, fileName);
        /* Remove the tagged from the file, if it is present */
        temp = goutFile + (strlen(gOutFile) - 7); /* point temp to .tagged */
        if(strncmp(temp, ".tagged", 7) == 0) {
            /* The file ended in .tagged */
            /* Make the stat file name first */
            strcpy(temp,".stat");
            /* If we have set an output directory */
            if (gOutDir[0] != '\0') {
                gStatFile = (char *)malloc(strlen(gOutFile)+0 10);
                assert(gStatFile);
                strcpy(gStatFile, gOutFile);
            }
            /* Now change the .stat to replace ffiat with .np and keep it that way */
            strcpy(temp,".np");
        } else {
        /* Does not end in .tagged, so just append .np to the end */
        strcat(gOutFile, ".np");
        if(goutDir[0] != '\0') {
                /* Create it if an output dir has been set */
                gStatFile = (char *)malloc(strlen(gOutFile)+10);
                assert(gStatFile);
                strcpy(gStatFile, fileName);
                strcat(gStatFile, ".stat");
        }
    }
}
/* IfgOutDir== ""then we don't have an output dir set -
 * which means we don't want to do any output file at all.
 * so do not up up the gout file pointer, just make it NULL
 */
if(strcmp(gOutDir, "") != 0) {
    /* Open the file for writing */
    gOut = fopen(gOutFile, "w");
```

-continued

```
if(gOut == NULL) {
            printf("Null file: %s\n",gOutFile);
}
assert(gOut);
if (gVerbosity > 0)
            if (!gNoPrint)
                printf("Sending output to file %s\n",gOutFile);
        }
    } else if(gOutFiie == NULL || strcmp(gOutFile, "")== 0) {
    /* Filename is null. Tell them we are using stdin */
        if (gVerbosity > 0) {
            if (!gNoPrint)
                printf("Using stdin for input. No output file, stats to np.stat\n");
            gStatFile = (char *)malloc(10);
            assert(gStatFile);
            strcpy(gStatFile,"np.stat");
        }
    }
    if (goutDir[0] == '\0') {
        /* There is no out dir, so only output to screen */
        if (gVerbosity > 0) {
            if(!gNoPrint)
                printf("No output directory specified. Not creating .np or .stat output files.\n");
        }
    }
    /* Write a header saying file name, and the date/time */
    myTime = time(&myTime);
    Print("File %s processed on %s", fileName, ctime(&myTime));
}
/* ProcessMissBuf
    * Null-terminate the miss buffer, look and see if there is
    * only one word, etc.
    */
Word *ProcessMissBuf( ) {
    /* Null terminate the string */
    gMissBuf[gMissLen] = '\0';
    gMissLen = 0; /* Reset the index into the buffer to zero */
    /* Check to see if the miss buffer is just white space */
    /* If it is not, then clear out the apposition buffer */
    if (notWhiteSpace(gMissBuf)) {
        /* Clear out the apposition buffer */
        APS_Clear(gAppStack);
    }
    /* Get the stats for the miss buffer - the same way as for NPs
    * printStrippedMarkup will count the words in the missbuf,
    * increment the global count of words, and place those words
    * in a linked Word list.
    */
    printStrippedMarkup(gMissBuf);
    return gWords; /* Here is the list of words from the above call */
}
/* ProcessHitBuf
    * Take the words from the yytext buffer that were returned
    * matching to a regular expression, and put them in the gWords
    * word list.
    */
    Word *ProcessHitBuf( ) {
    printStrippedMarkup(yytext); /* Get the words into the gWord structure */
    return gWords;
}
/* OutputStats( )
    * Opens the file specifled in gStatFile and prints a
    * summary of various statistics gathered over the document
    */
void OutputStats( ) {
    time_t myTime;
    FILE *stats;
    if(gStatFile != NULL) {
    /* Create the file for the stats */
    stats = fopen(gStatFile, "w");
    assert(stats);
    /* First lets get the date/time */
    myTime = time(&myTime);
    fprintf(stats, "%s",ctime(&myTime));
    fprintf(stats, "words: %d\n",gWordNum);
    fprintf(stats, "Sentences: %d\n",gSentNum);
    fprintf(stats, "Paragraphs: %d\n",gParaNum);
    fprintf(stats, "Simplex NPs: %d\n",gNPNum);
    OutputPOSTagStats(stats);
```

-continued

```
            fclose(stats);
        }
}
/* OutputPOSTagStats
 * Write the contents of the array gposTagStats to the
 * statistics file specified by the FILE * argument
 */
void OutputPOSTagStats(FILE *stats) {
        fprintf(stats, "Nouns: %d\n",
gPOSTagStats[kNN]+gPOSTagStats]kNNS]+gPOSTagStats[kNNP]+gPOSTagStats[kNNPS]);
        fprintf(stats, "\tNN %d\tNNS %d\tNNP %d\tNNPS %d\n", gPOSTagStats[kNN], gPOSTagStats[kNNS],
gPOSTagStats[kNNP],gpoSTagStats[kNNPS]);
        fprintf(stats, "Verbs: %d\n",
gPOSTagStats[kVB]+gPOSTagStats[kVBZ]+gPOSTagSTats[kVBD]+gPOSTagStats[kVBF]+POSTagSt
ats]kVBC]+gPOSTagStats[kVBI]+gPOSTagStats[kVBS]+gPOSTagStats[kVBG]+gPOSTagStats[kVBN]
+gPoSTagStats[kVBM]);
        fprintf(stats, "\tVB %d\tVBZ %d\tVBD %d\tVBF %d\tVBC %d\tVBI %d\tVBS %d\tVBG %d\tVBN
%d\tVBM %d\n", gPOSTagStats[kVB], gPOSTagStats[kVBZ], gPOSTagStats[kVBD],
gPOsTagStats[kVBF], gPOSTagStats[kVBC], gPOSTagstats[kVBI], gPosTagStats[kVBS],
gPOSTagStats[kVBG], gPOSTagStats[kVBN], gPOSTagStats[kVBM]);
        fprintf(stats, "Adverbs: %d\n", gPOSTagStats[kRB] + gPOSTagStats[kRBR] + gPOSTagStats[kRBS]);
        fprintf(stats, "\tRB %d\tRBR %d\tRBS %d\n", gPOSTagStats[kRB], gPOSTagStats[kRBR],
gPOSTagStats[kRBS]);
        fprintf(stats, "Adjectives: %d\n", gPOSTagStats[kJJ] + gPOSTagstats[kJJR] + gPOSTagStats[kJJS]);
        fprintf(stats, "\tJJ %d\JJR %d\tJJS %d\n", gPOSTagStats[kJJ], gPOSTagStats[kJJR],
gPOSTagStats[kJJS]);
        fprintf(stats, "Determiners: DT %d\n", gPOSTagStats[kDT]);
        fprintf(stats, "Existentials: EX %d\n", gPOSTagStats[kEX]);
        fprintf(stats, "Cardinals: CD %d\n", gPOSTagStats[kCD]);
        fprintf(stats, "Coordinating Conjunctions: CC %d\n", gPOSTagStats[kCC]);
        fprintf(stats, "WH-things: %d\n", gPOSTagStats[kWP] + gPOSTagStats[kWPPoss] +
gPOSTagStats[kWDT] + gPOSTagStats[kWRB]);
        fprintf(stats, "\tWP %d\tWPS %d\tWDT %d\tWRB %d\n", gPOSTagStats[kWP],
gPOSTagStats[kWPPoss], gPOSTagStats[kWDT], gPOSTagStats[kWRB]);
        fprintf(stats, "Interjection: UH %d\n", gPOSTagStats[kUH]);
        fprintf(stats, "Preposition/complementizer IN %d\n", gPOSTagStats[kIN]);
        fprintf(stats, "Preposition/determiner: INDT %d\n", gPOSTagStats[kINDT]);
        fprintf(stats, "Foreign words: FW %d\n", gPOSTagStats[kFW]);
        fprintf(stats, "Possesive 's: \"POS\"%d\n", gPOSTagStats[KPOS]);
        fprintf(stats, "Pronouns: %d\n", gPOSTagStats[kCL]+ gPOSTagStats[kCLS] + gPOSTagStats[kCLR] +
gPOSTagStats[kpRP] + gPOSTagStats[kpPPoss]);
        fprintf(stats, "\tCL %d\tCLS %d\tCLR %d\tPRP %d\tPP$ %d\n", gPOSTagStats[kCL],
gPOSTagStats[kCLS], gPOSTagStats[kCLR], gPOSTagStats[kpRP], gPOSTagStats[kPPoss]);
        fprintf(stats, "Predeterminers: PDT %d\n", gPOSTagStats[kpDT]);
        fprintf(stats, ".%d\t, %d\t" %d\t"%d\n",gPOSTagStats[kPeriod], gPOSTagStats[kComma],
gPOSTagStats[kLQuote], gPOSTagStats[kRQuote]);
        fprintf(stats, "MD %d\tTO %d\tRP %d\tRPR$ %d\tVBP %d\tColon %d\tSYM %d\n",
gPOSTagStats[kMD], gPOSTagStats[kTO], gPOSTagStats[kRP], gPOSTagStats[kpRPPoss],
gPOSTagStats[kVBP], gPOSTagStats[kColon], gPOSTagStats[kSYM]);
        fprintf(stats, "(%d\t) %d\n",gPOSTagStats[kLParen], gPOSTagStats[kRParen]);
}
/* OutputStats2( )
    * Opens the file specified in gStatFile and prints a
    * summary of various statistics gathered over the document
    *
    * Machine readable form for Eleazar:
    * One number per line
    */
void OutputStats2( ) {
    time_t myTime;
    FILE *stats;
    char *name2;
    if(gStatFile != NULL) {
        /* Create tbe file for the stats */
        name2 = (char *) calloc(strlen(gStatFile)+2, sizeof(char));
        assert(name2);
        strcpy(name2, gStatFile);
        strcat(name2, "2");
        stats = fopen(name2, "w");
        assert(stats);
        if(gVerbosity > 3)
            printf("Outputing stats2 in file %s\n",name2);
        free(name2);
        /* First lets get the date/time */
        myTime '2 time(&myTime);
        fprintf(stats, "%s\n",ctime(&myTime));
        fprintf(stats, "%d\n",gWordNum);
        fprintf(stats, "%d\n",gSentNum);
        fprintf(stats, "%d\n",gParaNum);
```

-continued

```
            fprintf(stats, "%d\n",gNPNum);
            OutputPOSTagStats2(stats);
            fclose(stats);
        }
    }
}
/* OutputPOSTagStats2
    * Write the contents of the array gPOSTagStats to the
    * statistics file specified by the FILE * argument
    * for Eleazar: write only one number per line
    */
void OutputPOSTagstats2(FILE *stats) {
        fprintf(stats, "%d\n",
gPOSTagStats[kNN]+gPOSTagStats[kNNS]+gPOSTagStats[kNNP]+gPOSTagStats[kNNPS]);
        fprintf(stats, "%d\n%d\n%d\n%d\", gPOSTagStats[kNN], gPOSTagStats[kNNS],
gPOSTagStats[kNNP],gPosTagstats[kNNPS]);
        fprintf(stats, "%d\n",
gPOSTagStats[kVB]+gPOSTagStats[kVBZ]+gPOSTagStats[kVBD]+gPOSTagStats[kVBF]+gPOSTagSt
ats[kVBC]+gPOSTStats[kVBI]+POSTagStats[kVBS]+gPOSTagStats[kVBG]+gPOSTagStats[kVBN]
+gPOSTagStats[kVBM]);
        fprintf(stats, "%d\n%d\n%d\n%d\n%d\n%d\n%d\n%d\n%d\n",gPOSTagStats[kvB],
gPOSTagStats[kVBZ], gPOSTagStats[kVBD], gPOSTagStats[kVBF], gPOSTagStats[kVBC],
gPOSTagStats[kVBI], gPOSTagStats[kVBS], gPOSTagStats[kVBG], gPOSTagStats[kVBN],
gPOSTagStats[kVBM]);
        fprintf(stats, "%d\n", gPOSTagStats[kRB]+ gPOSTagStats[kRBR] + gPOSTagStats[kRBS]);
        fprintf(stats, "%d\n%d\n%d\n", gPOSTagStats[kRB], gPOSTagStats[kRBR], gPOSTagStats[kRBS]);
        fprintf(stats, "%d\n", gPOSTagStats[kJJ] + gPOSTagStats[kJJR] + gPOSTagStats[kJJS]);
        fprintf(stats, "%d\n%d\%d\n", gPOSTagStats[kJJ], gPOSTagStats[kJJR], gPOSTagStats[kJJS]);
        fprintf(stats, "%d\n", gPOSTagstats[kDT]);
        fprintf(stats, "%d\", gPOSTagStats[kEX]);
        fprintf(stats, "%d\n", gPOSTagStats[kCD]);
        fprintf(stats, "%d\n", gPOSTagStats[kCC]);
        fprintf(stats, "%d\n", gPOSTagStats[kWP] + gPOSTagStats[kWPPoss] + gPOSTagStats[kWDT] +
gPOSTagStats[kWRB]);
        fprintf(stats, "%d\n%d\n%d\%d\n", gPOSTagStats[kWP], gPOSTagStats[WwPPoss],
gPOSTagStats[kWDT], gPOSTagStats[kwRB]);
        fprintf(stats, "%d\n", gPOSTagStats[kUH]);
        fprintf(stats, "%d\n", gPOSTagStats[kIN]);
        fkrintf(stats, "%d\n", gPOSTagStats[kINDT]);
        fprintf(stats, "%d\n", gPOSTagStats[kFW]);
        fprintf(stats, "%d\n", gPOSTagStats[kPOS]);
        fprintf(stats, "%d\n", gPOSTagStats[kCL] + gPOSTagStats[kCLS] + gPOSTagStats[kCLR] +
gPOSTagStats[kPRP] + gPOSTagStats[kPPPoss]);
        fprintf(stats, "%d\n%d\n%d\n%d\n%d\n", gPOSTagStats[kCL], gPOSTagStats[kCLS],
gPOSTagStats[kCLR], gPOSTagStats[kPRP], gPOSTagStats[kPPPoss]);
        fprintf(stats, "%d\n", gPOSTagStats[kPDT]);
        fprintf(stats, "%d\n%d\n%d\n%d\n",gPOSTagStats[kPeriod], gPOSTagStats[kComma],
gPOSTagStats[kLQuote], gPOSTagStats[kRQuote]);
        fprintf(stats, "%d\n%d\n%d\n%d\n%d\n%d\n", gPOSTagStats[kMD], gPOSTagStats[kTO],
gPOSTagStats[kRP], gPOSTagStats[kpRPPoss], gPOSTagStats[kVBP], gPOSTagStats[kColon],
gPOSTagStats[kSYM]);
        fprintf(stats, "%d\n%d\n",gPOSTagStats[kLParen], gPOSTagStats[kRParen]);
}
/* printStrippedMarkup
    * this will print the string minus any markup that
    * it has. It will also carry over any interesting features
    * that are indicated by the markup and place them after the
    * word. Mostly will take the pos=XX label and place after
    * the word followed by a /, treebank pos style.
    * Bracket the output, if enamex, label tbe bracket as person, place, etc.
    *
    * char *s points to the string we want to print, less markup tags
    * char * lastPOS points to the last Part of Speech tag we saw in
    *     cases like <lex pos=NNP>word</lex>so we can print it out
    *     as word/NNP
    * char *lastENAMEX points to the last type of the Enamex we saw
    *     so we can print out <ENAMEX TYPE=LOCATION>Seattle</ENAMEX>
    *     as Seattle (LOCATION)
    *
    * Go through the string character by character (whiie the string is not nuiI)
    * and check to see if we are looking at the start of a tag. If we see a
    * <from <lex pos=. . . >etc then skip the text inside of it.
    * If the tag types are lex or enamex, remember the information in them
    * that we want to print out. (the actual part of speech, or type of entity.)
    *
    * Now this function wiii also fill in a variable, gNP, with information on
    * the NP taken from the text string. All of the words are placed into
    * individual Word structures in a linked list, and inserted into the
    * gNP structure. This structure can then be manipulated later on,
    * perhaps joined with another NP structure, and then printed out.
```

-continued

```
 * The printing has been removed from this function - perhaps I should
 * re-name the function as well.
 *
 * Also increases the global word count by recognizing words here.
 */
void printStrippedMarkup(char *s) {
    char *lastPOS;
    char *lastENAMEX;
    char wordBuf[100]; /* Temporary buffer for words */
    Word *tempWord; /* Use this to build the word list for the NP */
    int inPost=0; /* Are we in a post? */
    int inTitle=0; /* Are we in a title? */
    int firstTime=1; /* First time through the loop? */
    int EnamexTag=0;
    lastPOS = lastENAMEX = '\0'.
    gWords = NULL; /* We will set this later - or leave it NULL if there
                    * are no words in the string at all.
                    */
    while (*s != '\0') {
        if(*s =='<') {
            /* Open of sgml tag - want to skip, but see if it is lex enamex */
            s++;
            if(strncmp(s,"lex",3) ==0 || strncmp(s, "LEX",3) == 0) {
                s += 4;
                while (strncmp(s,"pos=",4) != 0)
                    s++; /* Get to the pos, maybe skip a ttl= or role= or post=whole */
                s += 4; /* Get to the POS that the pos=is */
                lastPOS = s; /* remeber where we are at. */
                while (*s != '' && *s !='>')
                    s++; /* Get to after the POS */
                if(*s='>>) {
                    *s = '\0'; /* terminate the lastPOS string */
                    s++;
                }
                else {
                    *s = '\0';
                    while (*s !='>')
                        s++;
                    s++;
                }
            }
        }
        if(strncmp(s,"/lex>",5) == 0 || strncmp(s,"/LEX>",5) == 0) {
            /* Close of a lex tag - print tbe lastPOS we saw */
            /*
             * if (gPrintPOS) {
             * printf("/0%s",lastPOS);
             * Print to the output file if we have one
             * if(gout != NULL) {
             * fprintf(gOut, "/%s",lastPOS);
             *}
             *}
             */
            /* We will also count the POS for the stats tracking at this point */
            gPOSTagStats[convertPOSTag(lastPOS)]++;
            s += 5;
        }
        if(Strncmp(s,"ENAMEX",6) == 0) {
            /* Found an ENAMEX, want to remember what type it is */
            if(s[12] == 'L')
                EnamexTag = kEnamexLocation;
            else if(s[12] == 'O')
                EnamexTag = kEnamexOrganization;
            else if(s[12] = 'P')
                EnamexTag = kEnamexPerson;
            s += 12; /* skip: ENAMEX TYPE= */
            lastENAMEX = s; /* remember where we are at. */
            while (*s != '>')
                s++; /* Get to close of enamex */
            *s = '\0';
            s++;
        }
        if(strncmp(s,"/ENAMEX>",8) == 0) {
            /* Close of an ENAMEX tag - print lastENAMEX we saw */
            /* printf("(%s)",lastENAMEX);
             * Print to the output file if we have one
             * if(gout != NULL) {
             * fprintf(gOut, "(%s)",lastENAMEX);
             * }
             */
```

```
                    s += 8;
                    /* Since we see a </ENAMEX>tag, we want the
                    * word right before this to be a kEnamexEnd word.
                    * that word is in tempWord (the last word processed)
                    */
                    if (tempWord != NULL)
                        tempWord->enamex += kEnamexEnd;
            }
            if(strncmp(s,"POST>",5) == 0) {
                    s+=5; inPost = 1;
            }
            if(strncmp(s,"/POST>"6) == 0) {
                    s += 6; inPost = 0;
            }
            if (strncmp(s,"TTL>",4) == 0) {
                    s+= 4; inTitle = 1;
            }
            if(strncmp(s,"/TTL>",5) == 0) {
                    s += 5; inTitle =0;
                }
            }
        }
        else {
            /* Not starting a tag - so we have a word. Print it. */
            int i=0;
            while (*s != '<' && *s != '\0') {
                /* putchar(*s); */
                /* Output to the file if we have one
                * if(gOut != NULL)
                * fputc(*s, gOut);
                */
                /* copy this letter to the wordbuffer */
                wordBuf[i++] = *s;
                s++;
            }
            wordBuf[i] = '\0'; /* Terminate the word buffer */
            if (notWhiteSpace(wordBuf)) {
                    if(firstTime) {
                    /* It is the first time through, allocate the tempWord */
                    /* Allocate space for a the tempWord word structure */
                    tempWord = (Word *)malloc(sizeof(Word));
                    assert(tempWord);
                    tempWord->next = NULL;
                    /* Set the global word structure to this tempWord */
                    gWords = tempWord;
                    firstTime = 0; /* Not the first time anymore */
                    } else {
                    /* It isn't the first time through - add to current tempWord list */
                    tempWord->next = (Word *)malloc(sizeof(Word));
                    assert(tempWord->next);
                    tempWord = tempWord->next;
                    tempWord->next = NULL;
                    }
                    InitWord(tempWord);
                    tempWord->str = (char *)malloc(strlen(wordBuf)+1); /* allocate the space */
                    assert(tempword->str);
                    strcpy(tempWord->str, wordBuf); /* copy the word in the word structure */
                    if(lastPOS != NULL)
                            tempWord->tag = convertPOSTag(lastPOS); /* Get the integer value based on string value */
                            else tempWord->tag = -1; /* A word from the missBuf that isn't tagged. */
                            if (tempWord->str[0] == '.')
                              tempWord->num = -1; /* No number for a period */
                            else
                              tempWord->num = gWordNum++; /* the number of the word */
                            if (inPost)
                              tempWord->function = kPost; /* The word is a post word */
                            if (inTitle)
                              tempWord->function = kTitle; /* The word is a title word */
                            tempWord->enamex = EnamexTag;
                            EnamexTag = 0; /* reset the value to normal */
            }
        }
    }
}
/* InitWord
    * Initialize a word to default values
    /*
void InitWord(Word *theWord) {
    theWord->str = NULL;
    theWord->tag = -1;
```

-continued

```
        theWord->num = 0;
        theWord->function = kNormal;
        theWord->relWord = NULL;
        theWord->relNP = NULL;
        theWord->next = NULL;
        theWord->wordNP = NULL;
        theWord->enamex = 0; /* No enamex info */
}
/* notWhiteSpace
    * Check to see if the string passed in is white space or not.
    * Return a 1 if the string is not white space, 0 if it is.
    */
int notWhiteSpace(char *s) {
    int ans=0;
    while(*s != '\0' && !ans) {
      if(*s !→ ' ' && *s !='\n' && *s != '\t')
        ans = 1;
        s++;
    }
    if(ans == 1)
      return 1;
    else return ( );
}
/* convertTag
    * Given a string representation of a part of speech tag
    * (NNP, NNPS, JJ, etc.) convert that to it's corresponding
    * integer constant value.
    */
int convertPOSTag(char *tag) {
    if (strcmp(tag, "JJ") == 0)
      return kJJ;
    else if(strcmp(tag, "JJR") == 0)
      return kJJR;
    else if (strcmp(tag, "JJS") == 0)
      return kJJS;
    else if(strcmp(tag, "RB") == 0)
      return kRB;
    else if (strcmp(tag, "RBR") == 0)
      return kRBR;
    else if(strcmp(tag, "RBS") == 0)
      return kRBS;
    else if(strcmp(tag, "DT") == 0)
      return kDT;
    else if(strcmp(tag, "EX") = 0)
      return kEX;
    else if(strcmp(tag, "CD") == 0)
      return kCD;
    else if(strcmp(tag, "CC") == 0)
      return kCC;
    else if (strcmp(tag, "WP") = 0)
      return kWP;
    else if(strcmp(tag, "WP$") == 0 || strcmp(tag, "\"WP$\"⇆") == 0)
      return kWPPoss;
    else if (strcmp(tag, "WDT") == 0)
      return kWDT;
    else if (strcmp(tag, "WRB") == 0)
      return kWRB;
    else if(strcmp(tag, "UH") == 0)
      return kUH;
    else if (strcmp(tag, "IN") == 0)
      return kIN;
    else if (strcmp(tag, "INDT") == 0)
      return kINDT;
    else if (strcmp(tag, "NN") == 0)
      return kNN;
    else if(strcmp(tag, "NNS") == 0)
      return kNNS;
    else if (strcmp(tag, "NNP") == 0)
      return kNNP;
    else if (strcmp(tag, "NNPS") == 0)
      return kNNPS;
    else if(strcmp(tag, "FW") = 0)
      return kFW;
    else if (strcmp(tag, "CL") == 0)
      return kCL;
    else if (strcmp(tag, "CLS") == 0)
      return kCLS;
    else if (strcmp(tag, "CLR") = 0)
      return kCLR;
```

```
        else if (strcmp(tag, "PRP") == 0)
            return kPRP;
        else if(strcmp(tag, "PP$") == 0)
            return kPPPoss;
        else if (strcmp(tag, "PDT") == 0)
            return kPDT;
        else if(strcmp(tag, "VB") = 0)
            return kVB;
        else if(strcmp(tag, "VBZ") == 0)
            return kVBZ;
        else if (strcmp(tag, "VBD") == 0)
            return kVBD;
        else if (strcmp(tag, "VBF") == 0)
            return kVBF;
        else if (strcmp(tag, "VBC") == 0)
            return kVBC;
        else if(strcmp(tag, "VBI") O)
            return kVBI;
        else if(strcmp(tag, "VBS") == 0)
            return kVBG;
        else if (strcmp(tag, "VBG") == 0)
            return kVBG;
        else if (strcmp(tag, "VBN") == 0)
            return kVBN;
        else if(strcmp(tag, "VBM") == 0)
            return kVBM;
        else if (strcmp(tag, "POS") == 0)
            return kPOS;
        else if (strcmp(tag, "MD") O)
            return kMD;
        else if(strcmp(tag, "\".\"") == 0)
            return kPeriod;
        else if(strcmp(tag, "\",\"") = 0)
            return kComma;
        else if (strcmp(tag, "TO") == 0)
            return kTO;
        else if (strcmp(tag, "RP") == 0)
            return kRP;
        else if(strcmp(tag, "\"PRP$\"") == 0)
            return kPRPPoss;
        else if (strcmp(tag, "\"'\"") == 0)
            return kLQuote;
        else if (strcmp(tag, "\"'\"") == 0)
            return kRQuote;
        else if(strcmp(tag, "VBP") == 0)
            return kVBP;
        else if(strcmp(tag, "\":\"") == 0)
            return kColon;
        else if (strcmp(tag, "SYM") == 0)
            return kSYM;
        else if(strcmp(tag, "\"(\"") == 0)
            return kLParen;
        else if(strcmp(tag, "\")\"") == 0)
            return kRParen;
        fprintf(stderr, "Encountered unknown tag: %s\n".tag);
        return ( );
    }
    /* posTagToString( )
     * convert the tagType number to the string that it matches
     */
char *posTagToString(enum tagTypes tag) {
    if (tag == kJJ)
        return "JJ";
    else if (tag == kJJR)
                        return "JJR";
                    else if (tag == kJJS)
                        return "JJS";
                    else if (tag == kRB)
                        return "RB";
                    eise if(tag == kRBR)
                        return "RBR";
                    else if(tag == kRBS)
                        return "RBS";
                    else if (tag == kDT)
                        return "DT";
                    else if (tag == kEX)
                        return "EX";
                    else if(tag == kCD)
                        return "CD";
```

```
                        else if(tag == kCC)
                         return "CC";
                        else if(tag == kWP)
                         return "WP";
                        else if(tag == kWPPoss)
                         return "WP$";
                        else if (tag == kWDT)
                         return "WDT";
                        else if (tag == kWRB)
     return "WRB";
  else if (tag == kUH)
   return "UH";
  else if (tag == kIN)
   return "IN";
  else if (tag == kINDT)
   return "INDT";
  else if (tag == kNN)
   return "NN";
  else if (tag == kNNS)
   return "NNS";
  else if (tag == kNNP)
   return "NNP";
  else if(tag == kNNPS)
   return "NNPS";
  else if(tag == kFW)
   return "FW";
  else if (tag == kCL)
   return "CL";
  else if(tag == kCLS)
   return "CLS";
  else if (tag == kCLR)
   return "CLR";
  else if (tag == kPRP)
   return "PRP";
  else if (tag == kPPPoss)
   return "PP$";
  else if (tag == kPDT)
   return "PDT";
  else if (tag == kVB)
   return "VB";
  else if(tag == kVBZ)
   return "VBZ";
  else if(tag == kVBD)
   return "VBD";
  else if(tag == kVBF)
   return "VBF";
  else if(tag == kVBC)
   return "VBC";
  else if(tag == kVBI)
   return "VBI";
  else if(tag == kVBS)
   return "VBG";
  else if (tag == kVBG)
   return "VBG";
  else if (tag == kVBN)
   return "VBN";
  else if(tag == kVBM)
   return "VBM";
  else if(tag == kPOS)
   return "POS";
  else if (tag == kMD)
   return "MD";
  else if(tag == kPeriod)
   return "\".\"";
  else if (tag == kComma)
   return "\",\"";
  else if (tag == kTO)
   return "TO";
  else if(tag == kRP)
   return "RP";
  else if (tag == kPRPPoss)
   return "\"PRP$\"";
  else if(tag == kLQuote)
   return "\"``\"";
  else if (tag == kRQuote)
   return "\"''\"";
  else if (tag == kVBP)
   return "VBP";
  else if (tag == kColon)
```

```
            return "\":\"";
        else if(tag == kSYM)
            return "SYM";
        else if (tag == kLParen)
            return "\"(\"";
        else if (tag == kRParen)
            return "\")\"";
        fprintf(stderr, "Encountered unknown tag: %d\n", tag);
            return "??";
    }
    /* getEnamexStrippedMarkup
     * not used currently
     * return a string that is just the text part of an Enamex tag
     * currently does not work with multi-word entitles - it only returns
     * the last word
     */
        char * getEnamexStrippedMarkup(char * s) {
            char *lastPOS;
            char *lastENAMEX;
            char *newS;
            lastPOS = lastENAMEX = '\0';
            while (*s != '\0') {
                if (*s == '<') {
                    /* Open of sgml tag - want to skip, but see if it is lex | enamex */
                    s++;
                    if(strncmp(s,"ENAMEX",6) == 0) {
                            /* Found an ENAMEX, want to remember what type it is */
                            s += 12; /* skip: ENAMEX TYPE= */
                            lastENAMEX = s; /* remember where we are at. */
                            while (*s != '>')
                            s++; /* Get to close of enamex */
                            *s = '\0';
                            s++;
                    }
                    if(strncmp(s,"/ENAMEX>",8) == 0) {
                            char *tempS;
                            char *finalS;
                            /* Close of an ENAMEX tag - print lastENAMEX we saw */
                            tempS = (char *)malloc(strlen(lastENAMEX)+6);
                            assert(tempS);
                            sprintf(tempS, "(%s)",lastENAMEX);
                            s += 8;
                            finalS = (char *)malloc(strlen(tempS) + strlen(newS) + 1);
                            assert(finalS);
                            strcpy(finalS,newS);
                            strcat(finalS,tempS);
                            return finalS;
                    } else {
                            /* some other tag. skip it. */
                            while (*s != '>' && *s != '\0')
                            s++;
                            s++;
                    }
                }
                else {
                    /* Not starting a tag - so we have a word. Print it. */
                    char *old = s;
                    int count=0;
                    while (*s != '<' && *s != '\0') {
                            count++;
                            s++;
                    }
                    newS = (char *)malloc(count+1);
                    assert(newS);
                    strncpy(newS,old,count);
                }
            }
            /* Should not reach here, but we want to avoid a compiler warning */
            return "";
    }
    /* CreateNP
     * creates the NP and Word structures as defined in LinkIT.h
     * based on the text of the noun phrase passed in the Words.
     * It puts the text from the last NP (from yytext) into the
     * passed variable called theNP.
     */
void CreateNP(NP *theNp, Word *theWords) {
    Word *temp;
    /* Default values for NPs here */
```

-continued

```
tl,5 if(theWords != NULL) {
        theNP->wordStart = theWords->num; /* Set the word the NP starts on */
        theNP->wordEnd = gWordNum-1; /* Set the word the NP ends on */
        theNP->num = ++gNPNum;       /* Set the number of the NP */
        theNP->gSentNum = gSentNum;      /* Set the sentence number it is in */
        theNP->gParaNum = gParaNum;      /* Set the paragraph number it is in */
        theNP->human = kNotHuman;     /* FIX Assume it is not human for now */
        theNP->words = theWords;      /* Set the words for the NP - made in CountWords */
        theNP->finalTag = getFinalTag(theNP->words); /* Set the finalTag */
        theNP->appositiveNum = 0;    /* Initially, not an appositive with anything */
        theNP->prevOccNum = 0;       /* Initially not part of a previous occurence chain */
        theNP->ofModified = 0;       /* Initially, this NP is not being of modified */
        if(gNextNPPossModified == 1) {
theNP->ofModifier = theNP->num -1; /* It is the of modifier of the previous NP */
gNextNPPossModified = 0;     /* Clear the flag */
        } else theNP->ofModifier = 0; /* Initially, this NP is not an of modifier of any NP */
        if (gNewPP) {
            theNP->firstInPP = 1;     /* It is the first NP of the new PP */
            gNewPP = 0;            /* Reset the flag */
        } else theNp->firstInPP = 0;  /* It isn't the first in the PP */
        /* Set up pointer to the head word of the NP */
        temp=theWords;
        /* Get to end of word list */
        while (temp != NULL && temp->next != NULL) {
            temp->wordNP = theNP; /* Point each word back to this NP */
            temp = temp->next;
        }
        temp->wordNP = theNP; /* Point the head back to this NP */
        theNP->head = temp;
        theNP->next = NULL;        /* Not in any lists yet */
        theNP->prev = NULL;        /* Not in any lists yet */
    } else {
    if(gVerbosity > 1)
        fprintf(stderr, "Words is Null!\n");
    }
}
}
/* getFinalTag
* Given the list of words, return the integer value of the final
* tag on the last word.
        */
    int getFinalTag(Word *words) {
        while (words != NULL && words->next != NULL)
            words = words->next;
        /* Either at the end of the list or words was empty */
        if (words == NULL) {
            fprintf(stderr, "In getFinalTag: the words list was empty! aborting.\n");
            exit(2);
        } else   return words->tag;
    }
    /* Output:
        * print out the sentence number, word span of the noun phrase, and np number.
        * This only prints that information for one NP, gNP, the global variable
        * that stores the last NP created by CreateNP.
        */
    void Output(NP *np) {
        printNP(np); /* Print the NP from the structure */
        Print("\n");
    }
    /* joinNP
        * Join NP2 to the end of NP1
        */
    voidjoinNP(NP * np1, NP * np2) {
        Word *temp;
        npl->finalTag = np2->finalTag; /* joining them, so that head of the last
                                         * is actually the head of the first now
                                         */
        np1 ->wordEnd = np2->wordEnd; /* Starts from NP1 ->wordStart ends at
                                        * np2->wordEnd
                                        */
        npl->human = np2->human;
        npl->head = np2->head;     /* The head of the new NP is the head of
                                    * the final NP.
                                    */
        temp = npl->words;
        /* Get to the end of np1's word list */
        while (temp->next != NULL)
            temp = temp->next;
        temp->next = np2->words; /* attack np2's words on to the end */
        gNPNum--; /* Because we joined 2 NPs */
```

```
}
/* lastWordOfNP( )
 * Return the string of the last word of the NP
 */
char *lastWordOfNP(NP *np) {
    Word *temp;
    if (np == NULL)
        return "";
    temp = np->words;
    /* Get to the end of the word list */
    while (temp->next != NULL)
        temp = temp->next;
    return temp->str;
}
/* printNP
 * Prints the NP that toPrint points to
 */
void printNP(P *toPrint) {
    if (!gCompareFormat) {
        Print("\n\tS%d%d-%d(%d)",toPrint->sentNum, toPrint->wordStart,
                toPrint->wordEnd, toPrint->num);
    } else {
        /* For compare format, just print out the return, no header */
        Print("\n");
    }
    /* If we are printing out the text of the of modifier
     * do that before we print the words of the modified NP
     */
    if(gPrintOf && !gNoRel && toPrint->ofModified != 0) {
        NP *tempNP = toPrint->prev;
        while (tempNP != NULL && tempNP->num != toPrint->ofModified) {
            tempNP = tempNP->prev;
}
if (tempNP == NULL) {
    /* Search the other way -- if it is assigned of mod by 's
     * the NP will be after not before
     */
    tempNP = toPrint->next;
    while (tempNP != NULL && tempNP->num != toPrint->ofModified) {
            tempNP = tempNP->next;
    }
}
if (tempNP == NULL) {
    fprintf(stderr, "printNP: Couldn't find of modifier for toPrint!(%d)\n", toPrint->num);
} else {
    Print("(");
    printWords(tempNP->words);
    Print("of) ");
}
}
printWords(toPrint->words);
if(toPrint->ofModified != 0 && !gNoRel && !gPrintOf) {
    /* It is being of modified by some other NP */
    Print("(of pmod: %d)", toPrint->ofModified);
}
if(toprint->ofModifier != 0 && !gNoRel) {
    /* It is modifier of some other NP */
    /* change mode to possible head */
    if (gPrintOf) {
        /* Print out the words if we are doing that
        /*
        NP *tempNP = toPrint->next;
        while (tempNP != NULL && tempNP->num != toPrint->ofModifier) {
                tempNP = tempNP->next;
        }
    if (tempNP == NULL) {
            /* Search the other way -- if it is assigned of mod by 's
             * the NP will be after not before
             */
            tempNP = toPrint->prev;
            while (tempNP != NULL && tempNP->num != toPrint->ofModifier) {
                    tempNP = tempNP->prev;
            }
        }
        if(tempNP == NULL) {
                fprintf(stderr, "printNP: Couldn't find of head for toPrint!(%d)\n", toPrint->num);
        } eise {
                Print("(of");
                printWords(tempNP->words);
```

-continued

```
                Print(")");
            }
        } else {
            /* Just print out the number of the NP
             */
            Print("(of phead: %d)", toPrint->ofModifier);
        }
    }
    if(toPrint->appositiveNum != 0 && !gNoRel) {
        /* Possible appositive with some other NP */
        Print("(papp: %d)"', toPrint->appositiveNum);
    }
    if (gVerbosity > 8)
        Print("PON: %d",toPrint->prevOccNum);
    if (gPrintPOS2) {
        /* Second form of printing out POS tags
         * Print the NP, with tags under it
         * S%d%d-%d(%d)W1 W2 W3 . . . WN
         *          T1 T2 T3 . . . TN
         * Where WX = word X and TX = tag for word X
         */
        char header[256];
        int hlen, i;
        sprintf(header, "S%d %d-%d(%d)",toPrint->sentNum,
                        toPrint->wordStart, toPrint->wordEnd, toPrint->num);
        Print("\n\t");
        hlen = strlen(header);
        for (i=0; i<hlen; i++) {
            Print(" ");
        }
        printWordTags(toPrint->words);
    }
}
/* printWordTags(Word *toPrint)
 * Prints the tags for the words passed in toPrint
 */
void printWordTags(Word *toPrint) {
    char spacer[256];
    int spaceLen, i, overflow=0;
    while (toPrint != NULL) {
        spaceLen = 0;
        Print("%s", gTagNames[toPrint->tag]);
        if (strlen(toPrint->str)>strlen(gTagNames[toPrint->tag])) {
            /* If the word is bigger than three chars, let's add
             * the length of the word (minus the three chars) to
             * spacer as well
             */
            spaceLen += strlen(toPrint->str) - strlen(gTagNames[toPrint->tag]);
            if (spaceLen >= overflow) {
                spaceLen -= overflow;
                overflow = 0;
            }
        } else if (strlen(toPrint->str) < strlen(gTagNames[toPrint->tag])) {
            overflow = strlen(toPrint->str) - strlen(gTagNames[toPrint->tag]);
        }
        if (toPrint->relWord != NULL) {
            /* There is another previous occurrence of this word
             * want to print that relation in the form of
             * NPNumber.WordNumber
             */
            sprintf(spacer, "(pocc: %d.%d)",toPrint->relNP->num,
                            toPrint->relWord->num);
            spaceLen += strlen(spacer) - overflow;
            overflow = 0;
        }
        for (i=0; i<spaceLen; i++)
            spacer[i] = ' ';
        spacer[i] = '\0'; /* terminate the string after correct
                           * number of spaces
                           */
        Print("%s",spacer);
        toPrint = toPrint->next;
    }
}
/* printWords
 * Prints the list of words from an NP
 */
void printWords(Word *toPrint) {
    while (toPrint != NULL) {
```

```
                Print("%s",toPrint->str);
                if (gPrintPOS == 1)
                    Print("/%s",gTagNames[toPrint->tag]);
                else Print(" ");
                if (!gNoRel)
                    if(toPrint->relWord != NULL) {
                            /* There is another previous occurrence of this word
                             * want to print that reiation in the form of
                             * NpNumber.WordNumber
                             */
                            Print("(pocc: %d.%d)",toPrint->relNP->num, toPrint->relWord->num);
                    }
                toPrint = toPrint->next;
        }
}
/* freeWords
    * Frees the memeory used by the list of words
    */
    void freeWords(Word *toFree) {
        Word *temp;
        while (toFree != NULL) {
            temp = toFree->next; /* Remember the next item in the list */
            free(toFree->str);   /* Free the space taken by the string for the word */
            free(toFree);        /* Free the space taken by the entire word structure */
            toFree = temp;       /* Move to the next item in the list */
        }
}
/* CountWords
    * takes a string, and counts the number of words that are in that string.
    *
    * A word is a sequence of characters not within a tag.
    * Skip everything between <. . . > and if the characters
    * in between are alphanumeric, count it as a word.
    */
    int CountWords(char * s) {
        int inTag=0;
        int numWords = 0;
        while (*s != '\0') {
          if(*s == '<') {
              inTag= 1;
              s++;
        } else if(*s =='>') {
              inTag = 0;
              s++;
        } else if(inTag == 0 && isalnum(*s)) {
            numWords++;
            /* Get to the end of this word */
            while (*s != '\0' && isalnum(*s))
                        s++;
        } else {
          s++;
          }
       }
       return numWords;
}
    /* APS_Init
        * Clear the apposition stack
        */
    void APS_Clear(int stack[3]) {
        gAPSUndo[0] = stack[0];
        gAPSUndo[1] = stack[1];
        gAPSUndo[2] 32 stack[2];
        stack[0] = 0;
        stack[1] = 0;
        stack[2] = 0;
    }
    /* APS_UndoClear
         * Undo the last clear done by using the global aps undo stack
         * ugly and change this later
         */
    void APS_UndoClear(int stack[3]) {
        stack[0] = gAPSUndo[0];
        stack[1] = gAPSUndo[1];
        stack[2] = gAPSUndo[2];
    }
    /* APS_Add
         * Add to the apposition stack
         * Puts the value toAdd on the stack
         */
```

```
        void APS_Add(int stack[3], int toAdd) {
            int i=0;
            /* Find the first empty (0) value */
            while (i<3 && stack[i] != 0) {
                i++;
            }
        }
        if(i== 3) {
            /* printf("Apposition stack full!\n"); */
            /* Slide everybody down */
            stack[0] = stack[1];
            stack[1] = stack[2];
            stack[2] = toAdd;
            return;
        }
        stack[i] = toAdd; /* Add the value */
    }
    /* APS_Peek
     * Return value on top of the stack
     */
    int APS_Peek(int stack[3]) {
        int i=2;
        while (stack[i] == 0)
            ii--;
        if(i >= 0)
            return stack[i];
        else return ( );
    }
    /* APS_Rernove
     * Remove the last value from the stack
     */
    int APS_Remove(int stack[3]) {
        int i=2;
        int temp;
        while (i > 0 && stack[i] == 0) {
            i--;
        }
        if(i==0){
            if (!gNoPrint)
                printf("Apposition stack empty!\n");
            return -1;
        }
        temp = stack[i];
        stack[i] = 0;
        return temp;
    }
}
/* CheckForCommonString
 * This Function will check the words of the passed NP
 * against words in the NPs in the passed NPList
 * for previous occurrences.
 *
 * This used to be done in a brute force manner, but
 * now we will use the WordInfo functions to implement
 * a hash table that maps strings to their Word structure.
 * We will check the words in theNP and see ifthey have
 * been inserted into the hash table previously, if not
 * that is a new word, and we will insert it. If it is
 * found in the hash table, we will mark the word with
 * the information of the previous occurrence of the word.
 */
void CheckForCommonString(NPList *theList, NP *theNP) {
    int done=0;   /* Loop flag */
    Word *NPWord;   /* The current word we are checking
                                    * in the passed in NP
                                    */
    WordInfoNode *tempWord;
    /* Initially an inefficient attempt to do simple matching
     *
     * Switching over now to use the Wl_Lookup/WI_Install
     * functions that will associate a word in a hash to
     * a Word structure, and let us keep track of lists
     * of words
     */
    NPWord = theNP->words;
    /* For each of the words in the NP
     * except for the head, relate the words to the last
     * word we saw that was the same
     */
    while(NPWord != NULL && NPWord != theNP->head) {
    /* We don't want to check for some words
```

-continued
```
        * All determiners for one
        * lots of pronouns - they stand for some other noun, don't want
        * to relate to other pronouns of the same type. well, maybe we do but . . .
        */
        if(NPWord->tag == kDT || NPWord->tag == kPRP || NPWord->tag ==kPRPPoss || NPWord->tag ==
kIN)
            done= 1;
            if(!done) {
                WordInfoNode *tempWord;
                /* Look up the word in the WordInfo structure */
                if ( (tempWord = WI_Lookup(NPWord->str)) != NULL) {
                        /* We have a previous occurrence of the word */
                        /* Get the word relation information we need */
                        /* Store a pointer to the word that we matched to
                        * in the word that we matched from
                        */
                        NPWord->relWord = tempWord->occurrence;
                        /* Store a pointer to the NP that we matched to
                        * in the word that we matched from. */
                        NPWord->relNP = tempWord->occurrence->wordNP;
                }
                /* Now install this word into the hash */
                WI_Install(NPWord->str, NPWord);
            }
            /* Now check with the next word */
            NPWord = NPWord->next;
            done = 0;
    }
    /* We have checked all of the modifiers, now we want to check
        * the head of the NP. The head is a bit special: we want to
        * only link the head in if it also links to a head of another
        * NP. If there are no heads that match, then we set the
        * NP's prevOccNum to a new number (it is it's own new group.)
        */
    NPWord = theNP->head;
    tempWord = WI_Lookup(NPWord->str);
    if (tempWord = NULL) {
        /* No previous word, much less head. Start a new
        * group number for this NP,
        */
        theNp->prevOccNum = gNextOccNum++;
    } else {
        /* We have a previous word, check through them to find
        * a head. If there is a head, link to that, otherwise
        * start a new group number as before.
        *
    while (tempWord && tempWord->occurrence != tempWord->occurrence->wordNP->head)
            tempWord = tempword->next;
        if (tempWord == NULL) {
        /* No previous word, much less head. Start a new
            * group number for this NP.
            */
            theNp->prevOccNum = gNextoccNum++;
            } else {
                /* tempWord points to the last head that matches
                * link it in
                */
                /* Set the group number */
                theNP->prevOccNum = tempWord->occurrence->wordNP->prevOccNum;
                /* Set a pointer to the word we matched to */
                NPWord->relWord = tempWord->occurrence;
                /* Set a pointer to the NP that word we matched to is in */
                NPWord->relNP = tempWord->occurrence->wordNP;
            }
    } /* end of there was a previous match */
    /* Now install the head in the WordInfo structures */
    WI_Install(NPWord->str, NPWord);
    /* done */
}
/* CommonStringCompare
    * Compare the two words and return ( ) if they are not the
    * same, 1 if they are the same. This comparison is
    * made in all uppercase, maybe other checks should be
    * done here as well, like check for plurals, etc.
    right now it is very simple - doesn't even do uppercase
    *
    * We want to check if they are the same with different
    * capitalization.
    *
```

```
 * (simple check for plurality)
 * We want to check if the same minusjust a "s"
    * or "e" on the end.
    */
int CommonStringCompare(Word *w1, Word *w2) {
    char *localw1, *localw2;
    intj;
    int len1, len2;
    dlist *dictW1, *dictW2;
    /* Initial try: just use strcmp!
     * 0: Check for exact similarity
     * 1: lowercase the strings and check for similarity
     * 2: check for "ies" and change to "y" ending
     * 3: check for "s" or "es" on the end of either
     * string and remove
     * 4: look up words in our dictionary of irregular plurals
     * and replace with the plural form if found then check
     */
    if (strcmp(w1->str, w2->str) == 0)
        return 1;
    /* Now check for lowercase */
    /* Make local copies of the words so we don't mess them up! */
    localw1 = (char *) malloc(strlen(wl->str)+1);
    assert(localw1);
    localw2 = (char *) malloc(strlen(w2->str)+1);
    assert(localw2);
    len1 = strlen(w1->str)-1;
    len2 = strlen(w2->str)-1;
    /* Really only the first lefter should be capitalized, but 1
     * will tool through the whole string regardless
     * copy the string over here as well (save a bit of time)
     */
    for (i=0; i<=len1; i++)
        localw1[i] =tolower(w1->str[i]);
    localw1[i]='\0';
    for (i=0; i<=len2; i++)
        localw2[i]=tolower(w2->str[i]);
    localw2[i]=\0';
    /* Now check and see if they are the same */
    if (strcmp(localw1, localw2) == 0) {
    free(localw1);
    free(localw2);
    return 1;
    }
/* Check for "ies" -> y
*/
if(len1 > 2 && localw1[len1] == 's' && localw1[len1-1] == 'e' && localw1[len1-2]0 == 'j') == 'i') {
    localw1[len1-2] = 'y';
    localw1[len1-1] = '\0't;
    len1 -=2;
    if(strcmp(localw1, localw2) == 0) {
        free(localw1);
        free(localw2);
        return 1;
    }
} else if(len2 > 2 && localw2[len2] == 's' && localw2[len2-1] == 'e' && localw2[len2-2] == 'i') {
localw2[len2-2] = 'y';
localw2[len2-1] = '\0';
len2 -= 2;
if(strcmp(locaw1, localw2) == 0) {
        free(locaw1);
        free(localw2);
        return 1;
    }
}
/* Now check for "5" at end of word and remove
     * Only need to check one word, because if they were the
     * same save an "5" ending we would have caught that in
     * 0 or 1 above.
     */
if (localw1[len 1] == 's') {
    localw1[len 1] = '\0'; /* remove the s */
    if (strcmp(localw1, localw2) == 0) {
    free(localw1);
    free(localw2);
    return 1;
    }
} else if(localw2[len2] == '5') {
    localw2[len2] = '\0'; /* remove the s */
```

-continued

```
            if (strcmp(localw1, localw2) == 0) {
                free(localw1);
                free(localw2);
                return 1;
            }
        }
    }
    /* Now we need to look up the words in the dictionary
     * and see if either of them is an irregularPlural
     * word. If so, we will use the plural form of the
     * word to match to
     */
    if((dictW1 = NPD_Lookup(localw1)) != NULL && dictW1->type == kIrrPlural) {
        if (strcmp(dictW1->plural, localw2) == 0) {
            free(localw1);
            free(localw2);
            return 1;
        }
    } else if((dictW2 = NPD_Lookup(localw2)) != NULL && dictW2->type == kIrrPlural) {
        if(strcmp(localw1, dictW2->plural) == 0) {
            free(localw1);
            free(localw2);
            return 1;
        }
    }
    free(localw1);
    free(localw2);
    return ( ); /* Not "similar" enough */
}
/* Print(char *s, . . .)
 * Take the printf formatted string and args, print them
 * to stdout if we are printing to std out, print to the
 * output file if we are printing to the output file
 */
void Print(char *s, . . .) {
    va_list ap1, ap2;
    if(!gNoPrint) {
        /* We are printing to stdout, so do that.
         */
        /* Start the arg list
         */
        va_start(ap1, s);
        /* Print
         */
        vprintf(s, ap1);
        va_end(ap1);
    }
    if (gOut) {
        /* We have an output file to print to
         */
        /* Start the arg list
         *//
        va_start(ap2, s);
        /* Print
         */
        vfprintf(gOut, s, ap2);
        va_end(ap2);
    }
}
/* ClearLastAdjCC
 * This is a function call to just
 * clear out the global variable
 * gLastAdjCC and set it to NULL
 * It is reset to NULL each time
 * that it isn't immediately followed by an NP
 * or a sentence ends, pp ends, etc.
 */
void ClearLastAdjCC( ) {
    if (gLastAdjCC != NULL) {
        /* There is something in there.
         */
        if (gVerbosity > 9)
            printf("Clearing out LastAdjCC\n");
        /* Free the words of the gLastkdjCC variable
            */
        freeWords(gLastAdjCC->words);
        /* Now free the variable itself */
        free(gLastAdjCC);
        /* Reset to NULL */
        gLastAdjCC = NULL;
```

```
        }
        /* Done */
}
```

```c
FILENAME: linkit.h (header file for linkit.c)
/* LinkIT.h
 * Header file for LinkIT.c
 */
#ifndef __LinkIT__
#define __LinkIT__
/* Standard includes
 */
#include <stdio.h>
#include <stdlib.h>
#include <assert.h>
#include <string.h>
#include <stdarg.h>
/* Data Structures
 */
/* NP Data structure
 *
 * This structure will hold the noun phrase and some information
 * about it.
 */
/* Define used for the appostion stack:
 */
#define kNP 488 /* some random number */
enum sortTypes { kTermFrequency = 466, kTermOccurrence };
enum weightTypes { kNoWeight = 723, kHeadAndMod, kHeadOnly };
/* documentation is in the global variable gWeightTerms
 */
enum humanTypes { kHuman = 266, kUnreliablyHuman, kUnreliablyNotHuman, kNotHuman };
enum tagTypes { kJJ, kJJR, kJJS,
                kRB, kRBR, kRBS,
                kDT, kEX, kCD, kCC,
                kWP, kWPPoss, kWDT, kWRB,
                kUH, kIN, kINDT,
                kNN, kNNS, kNNP, kNNPS,
                kFW, kPOS,
                kCL, kCLS, kCLR, kPRP, kPPPoss,
                kPDT, kMD, kPeriod, kComma, kTO, kRP, kPRPPoss,
                kLQuote, kRQuote, kVBP, kColon, kSYM,
                kLParen, kRParen,
                kVB, kVBZ, kVBD, kVBF, kVBC, kVBI, kVBS, kVBG, kVBN, kVBM };
typedef struct NP {
 int num; /* The number of this NP */
 int sentNum; /* What sentence number is it in ? */
 int paraNum; /* What paragraph number is it in? */
 int firstInPP; /* Is this the first NP in the paragraph? 1 if yes, 0 otherwise. */
 enum humanTypes human; /* Is this NP human, not human? */
 int finalTag; /* The tag on the final word in the NP */
 int wordStart; /* The number of the word this NP starts on */
 int wordEnd; /* The number of the word this NP ends on. */
 int ofModified; /* The number of the NP that this is of modified by */
 int ofModifier; /* The number of the NP that this NP is an of
                  * modifier of
                  */
 struct Word *words; /* A pointer to a linked list of the words that sequentially
                      * make up this noun phrase.
                      */
 int appositiveNum; /* Number of the NP that this NP might be an appositive with
                     * 0 if not an appositive
                     */
 int prevOccNum; /* A number indicating the NP number of the previous occurrence
                  * that the head of this NP can be found in
                  * Similar to a "group" number for chains of related NPs
                  */
 struct Word *head; /* Pointer to the head word of this NP */
 struct NP *next; /* A pointer to the next NP */
 struct NP *prev; /* A pointer to the previous NP */
} NP;
/* Word Data Structure
 * Holds the words that are in an NP
 */
```

-continued

```
/* Function types for a word */
/* The kEnamex labels are used to ID the start and end of Enamex tags. A word can be both
 * a start and an end, so the kEnamexEnd is simply added to the value of the enamex field. If
 * a word has no ENAMEX info at all, it is 0, if it is just a start, it will be one of
 * kEnamexPerson, kEnamexLocation, kEnamexOrganization. If it is just an end, it will be
 * kEnamexEnd. If it will be a start and an end, it will be one of
 * (kEnamexPerson, kEnamexLocation, kEnamexOrganization) + kEnamexEnd.
 */
enum wordFunctions { kNormal, kPost, kTitle, kEnamexPerson, kEnamexLocation,
kEnamexOrganization, kEnamexEnd };
typedef struct Word {
 char *str; /* The str representation of the word */
 enum tagTypes tag; /* The part of speech tag of the word */
 int num; /* The number of this word */
 int function; /* The function of the word
                  * kNormal — normal word
                  * kPost — is a post or position
                  * kTitle — is a title word — Dr., Mr., etc.
                  */
 NP *wordNP; /* The NP that this word can be found in
                  */
 struct Word *relWord; /* A related word — a pointer to another
                  * word that we think is related in some way
                  */
 NP *relNP; /* The NP the relWord can be found in
                  */
 int enamex; /* tracks the enamex info */
 struct Word *next; /* The next word in the sequence */
} Word;
/* NPList Data Structure
 * A doubly linked list of NPs
 */
typedef struct NPList {
 int numNPs; /* How many NPs are in this list */
 NP *head; /* Pointer to the first NP */
 NP *tail; /* Pointer to the last NP */
} NPList;
/* NPListNode
 * A data structure for a simple list of pointers to
 * NP types
 * Used in NPList.c:NPL_PrintOrdered(NPList *)
 */
typedef struct NPListNode {
 NP *theNP; /* The pointer to the NP */
 struct NPListNode *next; /* Pointer to next node in the list */
 /* Added for use with -compareFormat tag
  * for the printing, only one of each string
  */
 int printed;
 char *str;
} NPListNode;
/* Global Variables
 */
extern char *gTagNames[kVBM+1];/* Names of the tags indexed by tag */
extern int gNPNum; /* Current number of Noun Phrases found */
extern int gSentNum; /* Current sentence number */
extern int gInTag; /* Are we currently inside a tag (ie, between <...>)
                  * for text that does not match a NP regular expression.
                  * I use this information to supress printing of the tag text.
                  */
extern int gWordNum; /* Current word number we are on. */
extern int gParaNum; /* Current paragraph number we are on. */
extern int gGotWord; /* When processing text that does not match a NP regular expression,
                  * have we counted the current text as a word or not? We see a word
                  * when we are outside of a tag and there is alphanumeric data there
                  * ie <lex pos=NNS>years</lex><lex pos=JJ>old</lex><lex pos=",">,</lex>
                  * the years is counted as a word, the space is not, old is, the comma isn't.
                  */
extern int gPrintPOS; /* A boolean value to indicate whether we should print the part of speech
                  * tags after the words in the noun phrases or not.
                  */
extern int gPrintPOS2;
extern int gPrintFinal;
extern FILE *gOut; /* A pointer to a global output file. It might be NULL if we are
                  * using stdin as the input.
                  */
extern char *gOutFile; /* The name of the output file we are processing, if not stdin */
extern int gNoStats; /* Boolean — should we output statistics or no? */
extern int gNoPrint; /* Boolean — should we print to sdtout as we go or not? */
```

-continued

```
extern int gVerbosity;  /* A number that indicates how verbose we should be in
                         * reporting program status. Higher numbers mean to
                         * report more and more useless information.
                         */
extern NP gNP; /* A global Noun Phrase variable to pass information to main */
extern Word *gWords; /* A global pointer for the words in the current NP */
extern int gPOSTagStats[]; /* An array equal in size to the number of POS tags.
                            * Each entry, as indexed by one of the POS tags
                            * defined in the tagTypes enumeration, is a running
                            * count of the number of that tag seen in the doc.
                            */
extern int gNewPP; /* A boolean that indicates if this is a new
                    * paragraph or not. Set the first NP of a
                    * paragraph's indicator if it is.
                    */
extern char gMissBuf[]; /* A buffer that we will use to capture the
                         * characters that didn't get recognized as
                         * a noun phrase by the lexer.
                         */
extern int gMissLen; /* An index into the gMissBuf */
extern int gAppStack[]; /* A stack to try and detect appositions —
                         * It store the last three items we have seen.
                         * If we see NP, NP and we are a, then we
                         * can mark the last two NPs as a possible apposition.
                         * Then collapse the apposition stack down to NP,
                         * to continue the process.
                         * If the gMissBuff is something other than white
                         * space, then ProcessMissBuf() will clear out the
                         * apposition stack because that (for now) cuts off
                         * the appostion.
                         */
extern int gNextNPPossModified; /* This flag is set in the case of
                                 * a possesive that indicates "of modification"
                                 * Boston's Dana-Farber Cancer Institute
                                 * where the Dana-Farber Cancer Institute has
                                 * to be set as the "of modifier" of Boston
                                 */
extern int gNextOccNum; /* The next occurence chain number */
extern enum sortTypes gSortType; /* The method we should use to sort the final list of
                                  * NP phrases with. Defaults to kTermFrequency
                                  */
extern int gPrintInitial;
extern int gPrintWordLists;
extern int gNoRel;
extern int gNoTime;
extern int gProperOnly;
extern int gCompareFormat;
extern enum weightTypes gWeightTerms;
extern int gPrintOf;
extern int gPrintOnlyOfNPs;
/* Function Prototypes
 */
void printStrippedMarkup(char *); /* A routine to print out text skipping tags */
void Output(); /* Prints the information in the gNP variable — the last created NP */
void CreateNP(NP *, Word *); /* Take the words from Word * and place them in a NP structure */
void OutputStats(); /* Open the statistics file, output statistics */
void OutputPOSTagStats(); /* Dump the statistics array for POS tags */
void OutputStats2(); /* Dump stat file, one line per number */
void OutputPOSTagStats2(); /* dump stats file one line per number */
int CountWords(char *); /* Counts the number of words in the string */
int convertPOSTag(char *); /* Convert a string POS tag (NNP, JJ) to it's int constant value */
void DoGlobalInit(); /* Initialize global variables for each run */
void DoGlobalFree(); /* Free up memory taken by the global variables */
void DoFileOptions(char *); /* Set up the input/output/stat files */
void printNP(NP *); /* Print the NP structure */
void joinNP(NP *, NP *); /* Join NP2 to NP1 */
char *lastWordOfNP(NP *); /* Return the string of the last word of the NP */
void InitWord(Word *); /* Initialize a word to null values */
void printWords(Word *); /* Print the list of words in an NP structure */
void printWordTags(Word *); /* Print the tags of the words passed in Word *
                             * Taking into account the length of the words
                             * to line the tags up with where the words would
                             * be (so we can print under the words
                             */
void freeWords(Word *); /* Free the memory taken by the list of words */
Word *ProcessMissBuf(); /* Null terminate miss buffer, count stats, etc. */
Word *ProcessHitBuf(); /* Put text from yytext into a word list, count stats, etc. */
/* From NPList.c */
void NPL_Init(NPList *); /* Initialize the NPList to default values */
```

-continued

```
void NPL_CopyToTail(NPList *, NP *); /* Copy the NP to the NPList, and add it to the tail */
void NPL_Print(NPList *); /* Print the list of NPs from Head to Tail */
void NPL_PrintOrdered(NPList *, enum sortTypes, enum tagTypes); /* Print out the list,
                                                * ordered based on sortType
                                                * print only NPs with head of
                                                * the tagType if != 0
                                                */
void NPLN_Free(NPListNode *, int); /* Free a list of NPListNodes */
int NPLN_Print(NPListNode *, enum tagTypes); /* Print a list of NPListNodes
                                                * only print it out if it's head matches
                                                * tagType pos tag if tagTypes != 0
                                                * return number of NPs printed
                                                */
void LowerString(char *s); /* make a string lower case */
/* Apposition stack functions */
void APS_Clear(int stack[ ]); /* Clear out the stack */
void APS_UndoClear(); /* Undo the last clear of the APS stack */
void APS_Add(int stack[ ], int); /* insert the second value onto the stack */
int APS_Remove(int stack[ ]); /* Remove the top value from the stack and return it */
int APS_Peek(int stack[3]); /* Return the top value off of the stack — 0 if empty */
int CommonStringCompare(Word *, Word *); /* Return 1 if the two words are similar enough,
                                                * 0 if they are not. currently a simple strcmp,
                                                * but should evolve to look at plurality and stuff
                                                */
void CheckForCommonString(NPList *, NP *); /* Check the words in the NP for some common
                                                * sub string within the list of the previous
                                                * NPs.
                                                */
void WriteSGMLOutput(char *, NPList); /* Write the SGML output for the file we are
                                                * processing given the file name and the
                                                * list of NPs from that file.
                                                */
int getFinalTag(Word *words); /* Get the tag of the last word in the Word list
                                                * Word.
                                                */
int notWhiteSpace(char *s); /* Check to see if the string s is white space or not
                                                * return 1 if it is not white space, 0 if it is white space
                                                */
char *getOneToken(FILE *); /* return one token from the file *, null if no more */
enum tagTypes getTokenTag(char *s); /* return the tag type from the single text token
                                                * <lex pos=...>jksafsaf;l</lex> type thing
                                                */
char *posTagToString(enum tagTypes tag); /* Convert the tagType number to a string */
char *getLeadingString(char *s); /* Get anything before xxxxx<TAGOPEN>...</TAGCLOSE>
                                                * (all the xxxx stuff, which could be a non-closing tag itself, like <s>
                                                * Used in WriteSGMLOutput()
                                                */
void Print(char *s, ...); /* Wrapper call to print to both stdout and output file
                                                * depending on global variable settings
                                                */
void ClearLastAdjCC(); /* Clear out gLastAdjCC — free words, free var,
                                                * make gLastAdjCc = NULL
                                                */
#endif
```

FILENAME: rulenames.h (maps identifiers for NP expressions to numbers)

```
/* token names */
#define kEnamex         257
#define kRepeatedNoun   258
#define kAdjNoun        259
#define kSentStart      260
#define kSentEnd        261
```

-continued

FILENAME: rulenames.h (maps identifiers for NP expressions to numbers)

```
#define kComma          262
#define kParagraph      263
#define kTitle          264
#define kPossesive      265
#define kPronoun        266
#define kAdjCC          267
```

FILENAME: NPDict.h (header file that contains constants and structures relevant to the dictionary module)
```
/* NPDict.h
 * Header file for Dictionary routines used with LinkIT
 * The dictionary is a small collection of word,
 * "Strong" nouns, that indicate a strong connection
 * with the following NP when connected by "of"
 *
 * We want to look up the head of the previous NP,
 * check to see if the non-NP is "of" and then
 * join the previous and current NP if that is the case.
 */
/* Dictionary format
 * The current format of the dictionany file is:
 * word <tab> strong <tab> of
 * the strong indicates that it is a strong noun,
 * at some point there might be other options there
 * such as weak. of is the word that is used to
 * connect the two NPs.
 */
/* I will use a hashtable to store the words in.
 * The size in the hashtable is controlled by
 * kHashsize — to keep performance good, this should
 * be about 1.3 times as large as the number of words
 * at least. Since the hash table is a table of
 * linked lists, it will still perform no matter what
 * the size, but performance will approach linear as
 * the number of installed words increases.
 */
#ifndef __NPDDict__
#define __NPDDict__
#define kHashsize 101
/* Define some constants for the types of dictionary words */
/* kStrong:
 * This is a word that when followed by of and another NP
 * actually indicates that there is an interaction between
 * this NP and the next one. For example,
 * A type of asbestos
 *
 * kIrrPlural:
 * This word has an irregular plural form, and the plural
 * form is given
 */
enum dictTypes { kStrong = 233, kIrrPlural };
typedef struct dlist { /*Table entry*/
 struct dlist *next; /* next entry in chain */
 char *word; /* The name of the dictionary entry */
 char *takes; /* What must follow to link to next word? (of) */
 char *plural; /* What is the plural form if it is kIrrPlural word */
 int type; /* What type of word is it? kStrong, kIrrPlural */
} dlist;
/* Define the function prototypes for the hash table functions */
unsigned hash(char *); /* return the hash value of string */
dlist *lookup(char *); /* return the nlist* of string, or null if not found */
dlist *install(char *, char *, int); /* put the string into hashtable with symbol_id int, return new node*/
/* Function prototypes for the dictionary functions */
int NPD_Init(char *); /* Initialize the dictionary —
                       * load the dict file passed as arg —
                       * return 1 on success, 0 fail */
dlist *NPD_Lookup(char *); /* Lookup the word passed in,
                            * return a pointer to the dictionary entry if
                            * found, NULL if not
                            */
void NPD_Free(); /* Free the memory used by the dictionary */
#endif
```

FILENAME: NPDict.c (dictionary modules and routines)
```
/* NPDict.c
 * This file implements a small dictionary used with
 * LinkIT. The dictionary stores words that are
 * "strong" nouns, which connect up NPs in certain
 * cases. (such as "a form of asbestos" etc.)
 *
 * It uses a hashtable to implement the lookup and
```

-continued

```c
 * storage of words in the dictionary.
 */
#include "NPDict.h"
#include "LinkIT.h"
#include <stdio.h>
/* The functions to implement the hashtable lookup
 * functionality
 */
static dlist *hashtab[kHashsize]; /* pointer to table */
/* hash: make a hash value for a string */
unsigned hash(char *s) {
 unsigned hashval;
 for (hashval = 0; *s != '\0'; s++)
  hashval = *s + 31 * hashval;
 return (hashval % kHashsize);
}
/* lookup look for s in hashtab */
dlist *lookup(char *s) {
 dlist *np;
 for (np=hashtab[hash(s)]; np != NULL; np = np—>next)
  if (strcmp(s, np—>word) == 0)
   return np; /* Found it */
 return NULL; /* Didn't find it */
}
/* install: put(word, takes, type) into hashtable */
dlist *install(char *word, char *takes, int type) {
 dlist *np;
 unsigned hashval;
 if ((np = lookup(word)) == NULL) { /* not found */
  /* Allocate memory for the dictionary entry structure */
  np = (dlist *) malloc (sizeof(*np));
  assert(np);
  /* Copy the word in */
  if (np == NULL || (np—>word = (char *)strdup(word)) == NULL)
   return (NULL);
  /* Copy in the takes string as takes if it is kStrong word
   * or as the plural form of the word if it is kIrrPlural word
   */
  if (type == kStrong) {
   if (np == NULL || (np—>takes = (char *)strdup(takes)) == NULL)
    return (NULL);
  } else if (type == kIrrPlural)
   if (np == NULL || (np—>plural = (char *)strdup(takes)) == NULL)
    return (NULL);
  hashval = hash(word);
  np—>type = type;
  np—>next = hashtab[hashval];
  hashtab[hashval] = np;
  return (np);
 } else { /* already there */
  return (np);
 }
}
/* The functions to implement the NPD_interface
 */
/* NPD_Init()
 * Called to initialize the dictionary by loading in the
 * dictionary file passed in as a string.
 *
 * Return a 1 on success, 0 on failure.
 */
int NPD_Init(char *dictFileName) {
 FILE *dict;
 char word[100], takes[100], typeStr[100];
 int type;
 /* Open the dictionary file for reading */
 dict = fopen(dictFileName, "r");
 if (dict == NULL) {
  /* Could not open the file */
  fprintf(stderr, "Could not open dictionary file %s. Aborting.\n",dictFileName);
  return 0; /* Failure. */
 }
 while (fscanf(dict, "%s %s %s\n", &word, &typeStr, &takes) == 3) {
  /* We got the string representation of all three qualities.*/
  /* Convert the "type" into an integer value */
  if (strcmp(typeStr, "strong") == 0)
   type = kStrong;
  else if(strcmp(typeStr, "irrPlural") == 0) {
   /* This is an irregular plural type of word */
```

-continued

```
type = kIrrPlural;
} else {
type = kStrong; /* This should not happen */
fprintf(stderr, "Unknown dictionary type encountered: %s\n", typeStr);
fprintf(stderr, "Assuming value is \"strong\" and continuing...\n");
}
if (install(word, takes, type) == NULL) {
/* This should not happen either */
fprintf(stderr, "Error in installing %s %s %s in dictionary!\n", word, typeStr, takes);
fprintf(stderr, "Attempting to continue...\n");
}
if (gVerbosity > 7)
  if (!gNoPrint)
    printf(".");
}
/* Done reading in everything */
fclose(dict);
return 1; /* Success */
}
/* NPD_Lookup()
 * Lookup the word s, return a pointer to the
 * dictionary entry if it exists, otherwise return
 * NULL
 */
dlist *NPD_Lookup(char *s) {
  return lookup(s);
}
/* NPD_Free()
 * Free the memory used by the dictionary
 */
void NPD_Free() {
int i;
dlist *temp, *temp2;
/* For each list in the hashtable */
for (i=0; i<kHashsize; i++) {
 /* Clear out the list */
 temp = hashtab[i];
 while (temp != NULL) {
  /* Clear out each entry */
  if (temp—>word != NULL)
    free(temp—>word); /* Free the memory for the word */
  if (temp—>takes != NULL)
    free(temp—>takes); /* Free the memory for takes */
  temp2 = temp—>next; /* Remember where to go next */
  free(temp); /* Free the space for the structure */
  temp = temp2;
 }
}
}
```

| FILENAME: NP.Dict (dictionary data) | | |
|---|---|---|
| form | strong | of |
| percentage | strong | of |
| group | strong | of |
| unit | strong | of |
| team | strong | of |
| type | strong | of |
| class | strong | of |
| kind | strong | of |
| chairman | | strong of |
| editor | strong | of |
| fraction | strong | of |
| director | strong | of |
| copy | strong | of |
| copies | strong | of |
| pair | strong | of |
| total | strong | of |
| mouse | irrPlural | mice |
| child | irrPlural | children |
| man | irrPlural | men |
| woman | irrPlural | women |
| die | irrPlural | dice |
| dwarf | irrPlural | dwarves |
| foot | irrPlural | feet |
| fungus | irrPlural | fungi |
| goose | irrPlural | geese |
| half | irrPlural | halves |
| hoof | irrPlural | hooves |
| knife | irrPlural | knives |
| leaf | irrPlural | leaves |
| life | irrPlural | lives |
| loaf | irrplural | loaves |
| octopusses | | irrplural octupi |
| ox | irrPlural | oxen |
| phenomenon | | irrplural phenomena |
| lamb | irrPlural | sheep |
| thief | irrPlural | thieves |
| tooth | irrPlural | teeth |
| wife | irrPlural | wives |
| wolf | irrPlural | wolves |

```
FILENAME: NP.lex (lexer source code, generates files lex.yy.c and y.tab.h that implement lexer)
%{
/*
 * I want to use lex to recognize simply patterns for NPs
 * from an SGML marked up file with POS tags and some
 * Alembic added entity tags.
 */
#include <ctype.h>
#include "ruleNames.h"
#include "LinkIT.h"  /* Global Variable declarations, function prototypes, etc. */
%}
%e 4000
%p 15000
%a 9000
%n 02000
%o 8000
ADJECTIVE   (JJ|JJR|JJS|RB|RBR|RBS)
DET         ((<lex[ ]+pos=DT>[a-zA-Z0-9.]+<Vlex>|<LEX[
]+pos=DT>[a-zA-Z0-9.]+<VLEX>){WS}*)
ENAMEX      (ENAMEX[ ]+TYPE=(LOCATION|ORGANIZATION|PERSON))
ENAMEXEND   (VENAMEX)
NOUN        (NN|NNS|NNP|NNPS|CD)
PRONOUN     (PRP|[|]P'PRP[$]|[|]P')
POS         ((lex[ ]+((title|ttl|role|post|prof|titlefrag)=[a-zA-Z]+[ ]+)*pos)|(LEX[
]+((title|ttl|role|post|prof|titlefrag)=[a-zA-Z]+[ ]+)*pos))
POSEND      (Vlex|VLEX)
PUNCT       ([|]P'.[|]P')
PLNCTEND    (Vlex)
SGMLSTART   (<)
SGMLEND     (>)
WORD        ([a-zA-Z0-9.&-]+|"%"|"/")
WS          ([ ]|<TTL>|<POST>|<VTTL>|<VPOST>)
%%
        {/* printf("return ");*/}
{DET}?(({SGMLSTART}{POS}=({NOUN}{ADJECTIVE}|[|]P':[|]P'){SGMLEND}{WORD}{SGMLSTAR
T}{POSEND}{SGMLEND}{WS}*)* {SGMLSTART}{ENAMEX}{SGMLEND}(({SGMLSTART}{PO
S}=({NOUN}|CC|IN|{ADJECTIVE}|[|]P':[|]P'){SGMLEND}{WORD}{SGMLSTART}{POSEND}{SGMLE
ND}{WS}*)* {SGMLSTART}{ENAMEXEND}{SGMLEND}{WS}*)*+(({SGMLSTART}{POS}=({N
OUN}{ADJECTIVE}|[|]P':[|]P'){SGMLEND}{WORD}{SGMLSTART}{POSEND}{SGMLEND}{WS }*)*(
{SGMLSTART}{POS}={NOUN}{SGMLEND}{WORD}{SGMLSTART}{POSEND}{SGMLEND}{
WS}*))* {
/*
   ENAMEX Type - DET? (NOUN/ADJ)* ENAMEX)+(NOUN/ADJ)* NOUN)*
   A determiner, any number of nouns/adjectives
   then enamexs separated by nouns or adjectives,
   some final nouns To get complicated stuff like:
   <lex pos=DT>the</lex>
   <ENAMEX TYPE=LOCATION><lex pos=NNP>New</lex><lex
pos=NNP>York</lex></ENAMEX>
   <lex pos=JJ>-based</lex>
   <ENAMEX TYPE=ORGANIZATION><lex pos=NNP>Loews</lex><lex
pos=NNP>Corp.<lex></ENAMEX>
   */
   return kEnamex; }
({SGMLSTART}{POS}=({NOUN}|{ADJECTIVE}){SGMLEND}{WORD}{SGMLSTART}{POSEND
}{SGMLEND}{WS}*)+({SGMLSTART}{POS}={NOUN}{SGMLEND}{WORD}{SGMLSTART}{P
OSEND}{SGMLEND}{WS}*) {
   /*
      Adj. Noun Phrase -(NOUN/ADJ)* NOUN
   */
   return kAdjNoun; }
{DET}?({SGMLSTART}{POS}={NOUN}{SGMLEND}{WORD}{SGMLSTART}{POSEND}{SGML
END}{WS}*)+{
/*
   Determiner RepeatedNoun Type - very simply just DET?NOUN+
   */
   return kRepeatedNoun; }
{DET}?({SGMLSTART}{POS}=({NOUN}{ADJECTIVE}|[|]P':[|]P') {SGMLEND}{WORD}{SGMLSTAR
T}{POSEND}{SGMLEND}{WS}*)+({SGMLSTART}{POS}={NOUN}{SGMLEND}{WORD}{SGM
LSTART}{POSEND}{SGMLEND}{WS}*) {
   /*
      Determiner Adj. Noun Phrase - DET (NOUN/ADJ)* NOUN
   */
   return kAdjNoun; }
{SGMLSTART}TTL{SGMLEND}({SGMLSTART}(lex|LEX){WS}pos=({NOUN}|{ADJECTIVE}){W
S}ttl={WORD}{SGMLEND}{WORD}{SGMLSTART}{POSEND}{SGMLEND})+{SGMLSTART}VT
TL{SGMLEND}{
/* Mr./Dr.*/
return kTitle; }
```

-continued

```
{SGMLSTART}{POS}={PRONOUN}{SGMLEND}{WORD}{SGMLSTART}{POSEND}{SGMLEN
D} {
/* Get individual pronouns */
return kPronoun; }
{SGMLSTART}{POS}=POS {SGMLEND}'s{SGMLSTART}{POSEND}{SGMLEND}{
/* Get the possessive 's'
  <lex pos=POS>'s</lex>
*/
return kPossesive; }
({SGMLSTART}{POS }={ADJECTIVE}{SGMLEND}{WORD}{SGMLSTART}{POSEND}{SGMLE
ND}{WS}*)+{SGMLSTART}{POS}=CC{SGMLEND}{WORD}{SGMLSTART}{POSEND}{SGMLE
ND}{WS}* {
/* Get Adj+ CC
 * After we have got this, then return it to LinkIT.c
 * LinkIT will remember this, and if the immediately following
 * NP has no intervening text in the miss buffer, then pretend this
 * to the NP.
 */
 return kAdjCC; }
{SGMLSTART}VTIMEX{SGMLEND}{SGMLSTART}{POS}=[|]P'[|]P'{SGMLEND}{SGMLSTART}{P
OSEND}{SGMLEND}{
/* The TIMEX case where the sentence was not recognized. This happens
 * when there is a date then period. 1956. does not get tagged as a new
* sentence because I think Satz did not train with the tags in there.
gSentNum++;
/*
if(gPrintInitial && !gNoPrint && !gPrintFinal)
 Print(" ");
*/
return kSentEnd; }
{SGMLSTART}(s|S){SGMLEND}{/* Start a new sentence*/ gSentNum++; return kSentStart; }
{SGMLSTART}V(s|S){SGMLEND}{/* End of a sentence */
if (gPrintInitial && !gNoPrint && !gPrintFinal)
 printf(" ");
/* Output to file if applicable */
if(gPrintInitial && gOut != NULL && !gPrintFinal)
 fprintf(gOut, " ");
return kSentEnd; }
("<lex pos=[|]P',[|]P'>,<Vlex>") {
 /* Update stats on commas */
 gPOSTagStats[kComma]++;
return kComma; }
  {
 /* A new paragraph.
 if (gPrintInitial && !gNoPrint && !gPrintFinal)
  printf(" PP %d ",gParaNum);
 if(gPrintInitial && gOut !=NULL && !gPrintFinal)
  fprintf(gOut, " PP ");
 gNewPP = 1; /* Start a new PP, mark next NP as first */
 return kParagraph;
}
|  {/* default */
   gMissBuf[gMissLen++]= yytext[0];
   /* We are now printing out all the "missed" information
    * through the missBuf, so we don't need to print anything here.
    *
    * We also count the words in the missBuf so we don't need to do
    * the word counting here either
    */
/*     if(yytext[0] =='<') */
/*         gInTag = 1; */
/*     if(gInTag == 0){*/
/*         printf("%s",yytext);*/
/*         Output to the file if we have one */
/*         if(gOut != NULL) */
/*          fprintf(gOut, "%s", yytext);*/
/*     if (gGotword == 0 && isalnum(yytext[0])){*/
/*         If this is alphanumeric, we will count it as a word */
/*         Set a variable so we don't count the other chars in */
/*         this word as a word, and increment the number of words */
/*         gGotWord = 1; */
/*         gWordNum++; */
/*     } */
/*    } */
/*    if(yytext[0] == '>'){*/
/*        gInTag = 0;*/
/*        Reset the got word flag because we just exited a tag */
/*        gGotword = 0; */
/*    } */
```

```
    }
%%
/* the following function is defined here because I ran into a link
 * error without it . . .
 */
int yywrap(void){
    return(1);
}
/* A Bison parser, made from NP2.y
 by GNU Bison version 1.25
 */
#define YYBISON 1 /* Identify Bison output. */
#define kEnamex      258
#define kLex     259
#define kPOS     260
#define kPOSRole     261
#define kPOSPost     262
#define kLexEnd      263
#define kPunct   264
#define kPunctEnd    265
#define kSGMLStart   266
#define kSGMLEnd     267
#define kJJ      268
#define kJJR     269
#define kJJS     270
#define kRB      271
#define kRBR     272
#define kRBS     273
#define kDT      274
#define kEX      275
#define kCD      276
#define kCC      277
#define kWP      278
#define kWP4     279
#define kWDT     280
#define kWRB     281
#define kUH      282
#define kIN      283
#define kINDT    284
#define kNN      285
#define kNNS     286
#define kNNP     287
#define kNNPS    288
#define kFW      289
#define kCLs     290
#define kCLS     291
#define kCLR     292
#define kPRP     293
#define kPP4     294
#define kPDT     295
#define kVB      296
#define kVBZ     297
#define kVBD     298
#define kVBF     299
#define kVBC     300
#define kVBI     301
#define kVBS     302
#define kVBG     303
#define kVBN     304
#define kVBM     305
#define kWord    306
#define kEq      307
#define kComma       308
#line 1 "NP2.y"
 #include <stdio.h>
 #include <stdarg.h>
 #include <string.h>
 char *MakeString(int, . . .);
 char *getEnamexStrippedMarkup(char *);
 extern char yytext[];
#line 12 "NP2.y"
typedef union {
 char *sval; /* String pointer value */
} YYSTYPE;
#ifndef YYDEBUG
#define YYDEBUG 1
#endif
#include <stdio.h>
#ifndef__cplusplus
```

-continued

```
#ifndef __STDC__
#define const
#endif
#endif
#define YYFINAL          218
#define YYFLAG           -32768
#define YYNTBASE         54
#define YYTRANSLATE(x) ((unsigned)(x) <= 308 ? yytranslate[x]: 66)
static const char yytranslate[] = {     0,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 2, 2, 2, 2, 2,
     2, 2, 2, 2, 2, 1, 2, 3, 4, 5,
     6, 7, 8, 9, 10, 11, 12, 13, 14, 15,
    16, 17, 18, 19, 20, 21, 22, 23, 24, 25,
    26, 27, 28, 29, 30, 31, 32, 33, 34, 35,
    36, 37, 38, 39, 40, 41, 42, 43, 44, 45,
    46, 47, 48, 49, 50, 51, 52, 53
};
#if YYDEBUG != 0
static const short yyprhs[]= {    0,
     0, 2, 5, 8, 11, 14, 17, 20, 23, 26,
    29, 31, 42, 53, 64, 75, 86, 100, 114, 128,
   142, 156, 170, 184, 198, 200, 202, 213, 224, 235,
   246, 257, 268, 279, 290, 301, 312, 323, 334, 345,
   356, 358, 360, 362, 364, 375
};
static const short yyrhs[] = {    55,    55,
     0, 54, 63, 0, 54, 55, 0, 55, 60, 0,
    56, 55, 0, 55, 56, 0, 62, 55, 0, 62,
    64, 0, 55, 62, 0, 57, 55, 0, 60, 0,
    11, 4, 5, 52, 13, 12, 65, 11, 8, 12,
     0, 11, 4, 5, 52, 14, 12, 65, 11, 8,
    12, 0, 11, 4, 5, 52, 15, 12, 65, 11,
     8, 12, 0, 11, 4, 5, 52, 21, 12, 65,
    11, 8, 12, 0, 11, 4, 5, 52, 19, 12,
    65, 11, 8, 12, 0, 11, 4, 7, 52, 65,
     5, 52, 30, 12, 65, 11, 8, 12, 0, 11,
     4, 7, 52, 65, 5, 52, 31, 12, 65, 11,
     8, 12, 0, 11, 4, 7, 52, 65, 5, 52,
    32, 12, 65, 11, 8, 12, 0, 11, 4, 7,
    52, 65, 5, 52, 33, 12, 65, 11, 8, 12,
     0, 11, 4, 6, 52, 65, 5, 52, 30, 12,
    65, 11, 8, 12, 0, 11, 4, 6, 52, 65,
     5, 52, 31, 12, 65, 11, 8, 12, 0, 11,
     4, 6, 52, 65, 5, 52, 32, 12, 65, 11,
     8, 12, 0, 11, 4, 6, 52, 65, 5, 52,
    33, 12, 65, 11, 8, 12, 0, 58, 0, 59,
     0, 11, 4, 5, 52, 30, 12, 65, 11, 8,
    12, 0, 11, 4, 5, 52, 31, 12, 65, 11,
     8, 12, 0, 11, 4, 5, 52, 32, 12, 65,
    11, 8, 12, 0, 11, 4, 5, 52, 33, 12,
    65, 11, 8, 12, 0, 11, 4, 5, 52, 41,
    12, 65, 11, 8, 12, 0, 11, 4, 5, 52,
    42, 12, 65, 11, 8, 12, 0, 11, 4, 5,
    52, 43, 12, 65, 11, 8, 12, 0, 11, 4,
     5, 52, 44, 12, 65, 11, 8, 12, 0, 11,
```

-continued

```
4, 5, 52, 45, 12, 65, 11, 8, 12, 0,
11, 4, 5, 52, 46, 12, 65, 11, 8, 12,
0, 11, 4, 5, 52, 47, 12, 65, 11, 8,
12, 0, 11, 4, 5, 52, 48, 12, 65, 11,
8, 12, 0, 11, 4, 5, 52, 49, 12, 65,
11, 8, 12, 0, 11, 4, 5, 52, 50, 12,
65, 11, 8, 12, 0, 3, 0, 61, 0, 56,
0, 64, 0, 11, 4, 5, 52, 9, 12, 53,
11, 8, 12, 0, 51, 0
};
#endif
#if YYDEBUG != 0
static const short yyrline[] = { 0,
    34, 39, 44, 52, 57, 62, 67, 72, 77, 82,
    87, 94, 95, 96, 97, 106, 115, 116, 117, 118,
    128, 129, 130, 131, 140, 144, 148, 149, 155, 156,
    164, 165, 166, 167, 168, 169, 170, 171, 172, 173,
    181, 189, 190, 191, 199, 207
};
#endif
#if YYDEBUG != 0 || defined (YYERROR_VERBOSE)
static const char * const yytname[] = { "$","error","$undefined.","kEnamex",
"kLex","kPOS","kPOSRole","kPOSPost","kLexEnd","kPunct","kPunctEnd","kSGMLStart",
"kSGMLEnd", "kJJ""kJJR","kJJS", "kRB", "kRBR","kRBS","kDT","kEX","kCD","kCC",
"kWP4","kWDT","kWRB","kUH","kIN","kINDT","kNN","kNNS","kNNP","kNNPS","kFW","kCLs",
"kCLS","kCLR","kPRP","kPP4","kPDT","kVB","kVBZ","kVBD","kVBF","kVBC","kVBI",
"kVBS","kVBG","kVBN","kVBM","kWord","kEq","kComma","top","noun_phrase","adjective",
"determiner","noun_post","noun_role","noun","verb","enamex","not_np","comma",
"word", NULL
};
#endif
static const short yyr1 [] = { 0,
    54, 54, 54, 55, 55, 55, 55, 55, 55, 55,
    55, 56, 56, 56, 56, 57, 58, 58, 58, 58,
    59, 59, 59, 59, 60, 60, 60, 60, 60, 60,
    61, 61, 61, 61, 61, 61, 61, 61, 61, 61,
    62, 63, 63, 63, 64, 65
};
static const short yyr2[] = { 0,
    1, 2, 2, 2, 2, 2, 2, 2, 2,
    1, 10, 10, 10, 10, 13, 13, 13, 13,
    13, 13, 13, 13, 1, 1, 10, 10, 10, 10,
    10, 10, 10, 10, 10, 10, 10, 10, 10, 10
};
static const short yydefact[] = { 0,
    41, 0, 0, 1, 0, 0, 25, 26, 11, 0,
    0, 0, 3, 43, 42, 2, 44, 0, 6, 4,
    9, 5, 10, 0, 7, 8, 0, 0, 0, 0,
    0, 0, 0, 0, 0, 0, 0, 0, 0, 0,
    0, 0, 0, 0, 0, 0, 46, 0, 0,
    0, 0, 0, 0, 0, 0, 0, 0, 0, 0,
    0, 0, 0, 0, 0, 0, 0, 0, 0, 0,
    0, 0, 0, 0, 0, 0, 0, 0, 0, 0,
    0, 0, 0, 0, 0, 0, 0, 0, 0, 0,
    0, 0, 0, 0, 0, 0, 0, 0, 0, 0,
    0, 0, 0, 0, 0, 0, 0, 0, 0, 0,
    0, 0, 0, 0, 0, 0, 0, 0, 0, 0,
    0, 0, 0, 12, 13, 14, 16, 15, 27, 28,
    29, 30, 0, 0, 0, 0, 0, 0, 0, 0,
    0, 0, 0, 0, 0, 0, 0, 0, 0,
    0, 0, 0, 0, 0, 0, 0, 0, 0, 45,
    31, 32, 33, 34, 35, 36, 37, 38, 39, 40,
    0, 0, 0, 0, 0, 0, 0, 21, 22,
    23, 24, 17, 18, 19, 20, 0, 0
};
static const short yydefgoto[] = { 3,
    22, 5, 6, 7, 8, 9, 15, 10, 16, 17,
    49
};
static const short yypact[] = {   -1,
-32768, 7, 1, 4, -1, -1, -32768, -32768, -32768, 5,
24, 10, 4, -1, -32768, -32768, -32768, 13, -32768, -32768,
-32768, 4, 4, 14, 4, -32768, -47, -13, 20, 30,
61, 64, 121, 23, 23, 26, 27, 28, 53, 63,
69, 72, 76, 77, 82, 100, 101, -32768, 71, 85,
78, 142, 19, 23, 23, 23, 23, 23, 23,
```

-continued

```
    23, 23, 62, 65, 103, 104, 106, 118, 119, 120,
    127, 129, 131, 132, 133, 122, 126, 135, 138, 147,
    148, 149, 150, 151, 11, 15, 11, 23, 23, 23,
    23, 23, 23, 23, 23, 23, 23, 157, 158, 159,
    160, 161, 162, 163, 168, 169, 166, 167, 170, 171,
    172, 173, 174, 175, 177, 178, 179, 180, 181, 182,
    183, 184, 185, 186, 187, 188, 189, 190, 191, 192,
    193, 194, 195, 196, 23, 23, 23, 23, 23, 23,
    23, 23, 201, 202, 203, 204, 205, 206, 207, 208,
    209, 210, 211, −32768, −32768, −32768, −32768, −32768, −32768, −32768,
    −32768, −32768, 212, 213, 214, 215, 216, 217, 218, 219,
    220, 221, 222, 223, 224, 225, 226, 227, 228, 229,
    230, 235, 236, 237, 238, 239, 240, 241, 242, −32768,
    −32768, −32768, −32768, −32768, −32768, −32768, −32768, −32768, −32768, −32768,
    243, 244, 245, 246, 247, 248, 249, 250, −32768, −32768,
    −32768, −32768, −32768, −32768, −32768, −32768, 199, −32768
};
static const short yypgoto[] = {−32768,
    3, 60, −32768, −32768, −32768, 73, −32768, 125, −32768, 253,
    −35
};
#define YYLAST    263
static const short yytable[] = {   50,
    217, 1, 4, 1, 33, 13, 1, 1, 23, 2,
    11, 12, 25, 30, 18, 24, 31, 32, 76, 77,
    78, 79, 80, 81, 82, 83, 84, 65, 27, 28,
    29, 39, 40, 41, 36, 28, 29, 42, 34, 43,
    107, 108, 109, 110, 111, 112, 113, 114, 44, 45,
    46, 47, 116, 117, 118, 119, 120, 121, 122, 123,
    124, 125, 14, 19, 54, 37, 28, 29, 38, 28,
    29, 35, 19, 48, 55, 63, 20, 51, 52, 53,
    56, 19, 19, 57, 19, 20, 65, 58, 59, 64,
    39, 40, 41, 60, 20, 20, 42, 20, 43, 163,
    164, 165, 166, 167, 168, 169, 170, 44, 45, 46,
    47, 61, 62, 85, 87, 88, 86, 89, 66, 67,
    68, 69, 70, 7#, 72, 73, 74, 75, 21, 90,
    91, 92, 98, 39, 40, 41, 99, 21, 93, 42,
    94, 43, 95, 96, 97, 100, 21, 21, 101, 21,
    44, 45, 46, 47, 39, 40, 41, 102, 103, 104,
    105, 106, 43, 115, 126, 127, 128, 129, 130, 131,
    132, 44, 45, 46, 47, 133, 134, 135, 136, 0,
    0, 137, 138, 139, 140, 141, 142, 143, 144, 145,
    146, 147, 148, 149, 150, 151, 152, 153, 218, 154,
    155, 156, 157, 158, 159, 160, 161, 162, 171, 172,
    173, 174, 175, 176, 177, 178, 179, 180, 181, 0,
    0, 0, 182, 183, 184, 185, 186, 187, 188, 189,
    0, 190, 191, 192, 193, 194, 195, 196, 197, 198,
    199, 200, 201, 202, 203, 204, 205, 206, 207, 208,
    0, 0, 0, 0, 209, 210, 211, 212, 213, 214,
    215, 216, 26
};
static const short yycheck[] = {   35,
    0, 3, 0, 3, 52, 3, 3, 3, 6, 11,
    4, 11, 10, 4, 11, 11, 4, 4, 54, 55,
    56, 57, 58, 59, 60, 61, 62, 9, 5, 6,
    7, 13, 14, 15, 5, 6, 7, 19, 52, 21,
    30, 31, 32, 33, 30, 31, 32, 33, 30, 31,
    32, 33, 88, 89, 90, 91, 92, 93, 94, 95,
    96, 97, 3, 4, 12, 5, 6, 7, 5, 6,
    7, 52, 13, 51, 12, 5, 4, 52, 52, 52,
    12, 22, 23, 12, 25, 13, 9, 12, 12, 5,
    13, 14, 15, 12, 22, 23, 19, 25, 21, 135,
    136, 137, 138, 139, 140, 141, 142, 30, 31, 32,
    33, 12, 12, 52, 12, 12, 52, 12, 41, 42,
    43, 44, 45, 46, 47, 48, 49, 50, 4, 12,
    12, 12, 11, 13, 14, 15, 11, 13, 12, 19,
    12, 21, 12, 12, 12, 11, 22, 23, 11, 25,
    30, 31, 32, 33, 13, 14, 15, 11, 11, 11,
    11, 11, 21, 53, 8, 8, 8, 8, 8, 8,
    8, 30, 31, 32, 33, 8, 8, 8, 12, 12, −1,
    12, 12, 12, 12, 12, 12, 12, 12, 8, 8,
    8, 8, 8, 8, 8, 8, 8, 8, −1,
    −1, 12, 12, 12, 12, 12, 12, 12, 12, 12,
    12, 12, 8, 8, 8, 8, 8, 8, 8,
    12, 12, 10
};
/* _*_C_*_Note some compilers choke on comments on '#line' lines. */
#line 3 "/usr/local/gnu/share/bison.simple"
/* Skeleton output parser for bison,
```

-continued

Copyright (C) 1984, 1989, 1990 Free Software Foundation, Inc.
This program is free software; you can redistribute it and/or modify
it under the terms of the GNU General Public License as published by
the Free Software Foundation; either version 2, or (at your option)
any later version.
This program is distributed in the hope that it will be useful,
but WITHOUT ANY WARRANTY; without even the implied warranty of
MERCHANTABILITY or FITNESS FOR A PARTICULAR PURPOSE. See the
GNU General Public License for more details.
You should have received a copy of the GNU General Public License
along with this program; if not, write to the Free Software
Foundation, Inc., 675 Mass Ave, Cambridge, MA 02139, USA. */
/* As a special exception, when this file is copied by Bison into a
 Bison output file, you may use that output file without restriction.
 This special exception was added by the Free Software Foundation
 in version 1.24 of Bison. */
ifndef alloca
ifdef__GNUC__
define alloca__builtin__alloca
else /* not GNU C. */
if (!defined (__STDC__) && defined (sparc)) || defined (__sparc__) || defined (__sparc) || defined (__sgi)
include <alloca.h>
else /* not sparc */
if defined (MSDOS) && !defined (__TURBOC__)
include <malloc.h>
else /* not MSDOS, or __TURBOC__*/
if defined(__AIX)
include <malloc.h>
pragma alloca
else /* not MSDOS,__TURBOC__, or __AIX */
ifdef__hpux
ifdef__cplusplus
extern "C" {
void *alloca (unsigned int);
else /* not__cplusplus */
void *alloca ();
endif/* not__cplusplus */
endif/*__hpux */
endif/*not__AIX */
endif/* not MSDOS, or __TURBOC__*/
endif/* not sparc. */
endif/* not GNU C. */
endif/* alloca not defined. */
/* This is the parser code that is written into each bison parser
 when the %semantic_parser declaration is not specified in the grammar.
 It was written by Richard Stallman by simplifying the hairy parser
 used when %semantic_parser is specified. */
/* Note: there must be only one dollar sign in this file.
 It is replaced by the list of actions, each action
 as one case of the switch. */
define yyerrok          (yyerrstatus = 0)
define yyclearin (yychar = YYEMPTY)
define YYEMPTY          -2
define YYEOF            0
define YYACCEPT         return(0)
define YYABORT          return(1)
define YYERROR                  goto yyerrlab1
/* Like YYERROR except do call yyerror.
   This remains here temporarily to ease the
   transition to the new meaning of YYERROR, for GCC.
   Once GCC version 2 has supplanted version 1, this can go. */
define YYFAIL           goto yyerrlab
define YYRECOVERING() (!!yyerrstatus)
define YYBACKUP(token, value)
do
if(yychar == YYEMPTY && yylen == 1)
 {yychar = (token), yylval = (value);
  yycharl = YYTRANSLATE (yychar);
  YYPOPSTACK;
  goto yybackup;
 }
else
 { yyerror ("syntax error: cannot back up"); YYERROR; }
while (0)
define YYTERROR    1
define YYERRCODE   256
ifndef YYPURE
define YYLEX       yylex()
endif -continued

```
#ifdef YYPURE
#ifdef YYLSP_NEEDED
#ifdef YYLEX_PARAM
#define YYLEX        yylex(&yylval, &yylloc, YYLEX_PARAM)
#else
#define YYLEX        yylex(&yylval, &yylloc)
#endif
#else /* not YYLSP_NEEDED */
#ifdef YYLEX_PARAM
#define YYLEX        yylex(&yylval, YYLEX_PARAM)
#else
#define YYLEX        yylex(&yylval)
#endif
#endif/* not YYLSP_NEEDED */
#endif
/* If nonreentrant, generate the variables here */
#ifndef YYPURE
int      yychar;           /* the lookahead symbol       */
YYSTYPE  yylval;                  /* the semantic value of the     */
                           /* lookahead symbol                */
#ifdef YYLSP_NEEDED
YYLTYPE yylloc;                   /* location data for the lookahead  */
                           /* symbol                          */
#endif
int yynerrs;               /* number of parse errors so far  */
#endif /* not YYPURE */
#if YYDEBUG != 0
int yydebug;               /* nonzero means print parse trace */
/* Since this is uninitialized, it does not stop multiple parsers
   from coexisting. */
#endif
/* YYINITDEPTR indicates the initial size of the parser's stacks   */
#ifndef YYINITDEPTR
#define YYINITDEPTH 200
#endif
/* YYMAXDEPTH is the maximum size the stacks can grow to
   (effective only if the built-in stack extension method is used) */
#if YYMAXDEPTH == 0
#undef YYMAXDEPTH
#endif
#ifndef YYMAXDEPTH
#define YYMAXDEPTH 10000
#endif
/* Prevent warning if -Wstrict-prototypes. */
#ifdef__GNUC__
int yyparse (void);
#endif
#if__GNUC__>1                        /* GNU C and GNU C++ define this. */
#define__yy_memcpy(TO, FROM, COUNT)        __builtin_memcpy(TO, FROM, COUNT)
#else                                /* not GNU C or C++ */
#ifndef__cplusplus
/* This is the most reliable way to avoid incompatibilities
   in available built-in functions on various systems. */
static void
__yy_memcpy (to, from, count)
    char *to;
    char *from;
    int count;
{
 register char *f = from;
 register char *t = to;
 register int i = count;
 while (i--> 0)
   *t++ = *f++;
}
#else /*__cplusplus */
/* This is the most reliable way to avoid incompatibilities
   in available built-in functions on various systems. */
   static void
__yy_memcpy (char *to, char *from, int count)
{
 register char *f = from;
 register char *t = to;
 register int i = count;
 while (i--> 0)
    }
#endif
#endif
#line 196 "/usr/local/gnu/share/bison.simple"
```

-continued

```
/* The user can define YYPARSE_PARAM as the name of an argument to be passed
   into yyparse. The argument should have type void *.
   It should actually point to an object.
   Grammar actions can access the variable by casting it
   to the proper pointer type. */
#ifdef YYPARSE_PARAM
#ifdef __cplusplus
#define YYPARSE_PARAM_ARG void *YYPARSE_PARAM
#define YYPARSE_PARAM_DECL
#else /* not __cplusplus */
#define YYPARSE_PARAM_ARG YYPARSE_PARAM
#define YYPARSE_PARAM_DECL void *YYPARSE_PARAM;
#endif/* not __cplusplus */
#else /* not YYPARSE_PARAM */
#define YYPARSE_PARAM_ARG
#define YYPARSE_PARAM_DECL
#endif/* not YYPARSE_PARAM */
int
yyparse(YYPARSE_PARAM_ARG)
    YYPARSE_PARAM_DECL
{
  register int yystate;
  register int yyn;
  register short *yyssp;
  register YYSTYPE *yyvsp;
  int yyerrstatus; /* number of tokens to shift before error messages enabled */
  int yychar1 = 0;    /* lookahead token as an internal (translated) token number */
  short yyssa[YYINITDEPTH];   /* the state stack      */
  YYSTYPE yyvsa[YYINITDEPTH]; /* the semantic value stack  */
  short *yyss = yyssa;         /* refer to the stacks thru separate pointers */
  YYSTYPE *yyvs = yyvsa;       /* to allow yyoverflow to reallocate them elsewhere */
#ifdef YYLSP_NEEDED
  YYLTYPE yylsa[YYINITDEPTH];  /* the location stack         */
  YYLTYPE *yyls = yylsa;
  YYLTYPE *yylsp;
#define YYPOPSTACK (yyvsp--, yyssp--, yylsp--)
#else
#define YYPOPSTACK (yyvsp--, yyssp--)
#endif
  int yystacksize = YYINITDEPTH;
#ifdef YYPURE
  int yychar;
  YYSTYPE yylval;
  int yynerrs;
#ifdef YYLSP_NEEDED
  YYLTYPE yylloc;
#endif
#endif
  YYSTYPE yyval;       /* the variable used to return   */
                       /* semantic values from the action */
                       /* routines                      */
  int yylen;
#if YYDEBUG != 0
  if (yydebug)
    fprintf(stderr, "Starting parse ");
#endif
  yystate = 0;
  yyerrstatus = 0;
  yynerrs = 0;
  yychar = YYEMPTY;    /* Cause a token to be read. */
  /* Initialize stack pointers.
     Waste one element of value and location stack
     so that they stay on the same level as the state stack.
     The wasted elements are never initialized. */
  yyssp = yyss - 1;
  yyvsp = yyvs;
#ifdef YYLSP_NEEDED
  yylsp = yyls;
#endif
/* Push a new state, which is found in yystate. */
/* In all cases, when you get here, the value and location stacks
   have just been pushed. so pushing a state here evens the stacks. */
yynewstate:
  *++yyssp = yystate;
  if (yyssp >= yyss + yystacksize - 1)
  {
    /* Give user a chance to reallocate the stack */
    /* Use copies of these so that the &'s don't force the real ones into memory. */
    YYSTYPE *yyvs1 = yyvs;
```

-continued

```
    short *yyss1 = yyss;
#ifdef YYLSP_NEEDED
    YYLTYPE *yyls1 = yyls;
#endif
    /* Get the current used size of the three stacks, in elements. */
    int size = yyssp - yyss + 1;
#ifdef yyoverflow
    /* Each stack pointer address is followed by the size of
       the data in use in that stack, in bytes. */
#ifdef YYLSP_NEEDED
    /* This used to be a conditional around just the two extra args,
       but that might be undefined if yyoverflow is a macro. */
    yyoverflow("parser stack overflow",
               &yyss1, size * sizeof(*yyssp),
               &yyvs1, size * sizeof(*yyvsp),
               &yyls1, size * sizeof(*yylsp),
               &yystacksize);
#else
    yyoverflow("parser stack overflow",
               &yyssl, size * sizeof(*yyssp),
               &yyvsl, size * sizeof(*yyvsp),
               &yystacksize);
#endif
    yyss = yyss1; yyvs = yyvs1;
#ifdef YYLSP_NEEDED
    yyls = yyls1;
#endif
#else /* no yyoverflow */
    /* Extend the stack our own way. */
    if(yystacksize >= YYMAXDEPTH)
        {
        yyerror("parser stack overflow");
        return 2;
        }
    yystacksize *= 2;
    if(yystacksize> YYMAXDEPTH)
        yystacksize = YYMAXDEPTH;
    yyss = (short *) alloca (yystacksize * sizeof (*yyssp));
    _yy_memcpy ((char *)yyss, (char *)yyss1, size * sizeof(*yyssp));
    yyvs = (YYSTYPE *) alloca (yystacksize * sizeof (*yyvsp));
    _yy_memcpy ((char *)yyvs, (char *)yyvs1, size * sizeof(*yyvsp));
#ifdef YYLSP_NEEDED
    yyls = (YYLTYPE *) alloca (yystacksize * sizeof (*yylsp));
    _yy_memcpy ((char *)yyls, (char *)yyls1, size * sizeof(*yylsp));
#endif
#endif/* no yyoverflow */
    yyssp = yyss + size - 1;
    yyvsp = yyvs + size -1;
#ifdef YYLSP_NEEDED
    yylsp = yyls + size -1;
#endif
#if YYDEBUG != 0
    if (yydebug)
        fprintf(stderr, "Stack size increased to %d ", yystacksize);
#endif
    if (yyssp >= yyss + yystacksize - 1)
        YYABORT;
    }
#if YYDEBUG != 0
    if (yydebug)
        fprintf(stderr, "Entering state %d ", yystate);
#endif
    goto yybackup;
 yybackup:
/* Do appropriate processing given the current state. */
/* Read a lookahead token if we need one and don't already have one. */
/* yyresume: */
 /* First try to decide what to do without reference to lookahead token. */
 yyn = yypact[yystate];
 if (yyn == YYFLAG)
     goto yydefault;
 /* Not known => get a lookahead token if don't already have one. */
 /* yychar is either YYEMPTY or YYEOF
    or a valid token in external form. */
 if (yychar == YYEMPTY)
     {
#if YYDEBUG != 0
    if (yydebug)
        fprintf(stderr, "Reading a token:");
```

-continued

```
#endif
    yychar = YYLEX;
   }
/* Convert token to internal form (in yychar1) for indexing tables with */
if(yychar <= 0)          /* This means end of input. */
   {
yychar1 = 0;
    yychar YYEOF;         /* Don't call YYLEX any more */
#if YYDEBUG != 0
   if (yydebug)
        fprintf(stderr, "Now at end of input. ");
#endif
   }
   else
   {
   yychar1 = YYTRANSLATE(yychar);
#if YYDEBUG != 0
   if (yydebug)
       {
        fprintf(stderr, "Next token is %d (%s", yychar, yytname[yychar1]);
        /* Give the individual parser a way to print the precise meaning
        of a token, for further debugging info. */
#ifdef YYPRINT
        YYPRINT (stderr, yychar, yylval);
#endif
        fprintf (stderr, ") ");
        }
#endif
   }
yyn += yychar1;
if(yyn < 0 || yyn > YYLAST || yycheck[yyn] != yychar1)
    goto yydefault;
yyn = yytable[yyn];
/* yyn is what to do for this token type in this state.
  Negative => reduce, -yyn is rule number.
  Positive => shift, yyn is new state.
  New state is final state => don't bother to shift,
  just return success.
  0, or most negative number => error. */
if(yyn < 0)
   {
   if (yyn == YYFLAG)
        goto yyerrlab;
   yyn = -yyn;
   goto yyreduce;
   }
else if(yyn == 0)
   goto yyerrlab;
if(yyn == YYFINAL)
   YYACCEPT;
/* Shift the lookahead token. */
#if YYDEBUG != 0
   if (yydebug)
    fprintf(stderr, "Shifting token %d (%s), ", yychar, yytname[yychar1]);
#endif
   /* Discard the token being shifted unless it is eof. */
   if(yychar != YYEOF)
    yychar = YYEMPTY;
   *++yyvsp = yylval;
#ifdef YYLSP_NEEDED
   *++yylsp = yylloc;
#endif
   /* count tokens shifted since error; after three, turn off error status. */
   if (yyerrstatus) yyerrstatus--;
   yystate = yyn;
   goto yynewstate;
   /* Do the default action for the current state. */
   yydefault:
   yyn = yydefact[yystate];
   if(yyn == 0)
    goto yyerrlab;
/* Do a reduction. yyn is the number of a rule to reduce with. */
   yyreduce:
   yylen = yyr2[yyn];
   if (yylen > 0)
    yyval = yyvsp[1 -yylen]; /* implement default value of the action */
#if YYDEBUG != 0
   if (yydebug)
    {
```

-continued

```
    int i;
    fprintf (stderr, "Reducing via rule %d (line %d), ",
             yyn, yyrline[yyn]);
    /* Print the symbols being reduced, and their result. */
    for (i = yyprhs[yyn]; yyrhs[i] > 0; i++)
            fprintf(stderr, "%s", yytname[yyrhs[i]]);
    fprintf(stderr, "-> %s ", yytname[yyr1[yyn]]);
    }
#endif
 switch (yyn) {
case 1:
#line 35 "NP2.y"
{
        printf("top: %s[|]P', yyvsp[0].sval);
        yyval.sval = yyvsp[0].sval;
    ;
  break;}
case 2:
#line 40 "NP2.y"
{
        yyval.sval = MakeString(2, yyvsp[-1]. sval, yyvsp[0].sval);
        printf("top: %s ", yyval.sval);
    ;
  break; }
case 3:
#line 45 "NP2.y"
{
        yyval.sval = MakeString(2, yyvsp[-1].sval, yyvsp[0].sval);
        printf("top: %s ", yyval.sval);
    ;
  break;}
case 4:
#line 53 "NP2.y"
{
        yyval.sval = MakeString(2, yyvsp[-1].sval, yyvsp[0].sval);
        printf("NP N %s ", yyval.sval);
    ;
  break;}
case 5:
#line 58 "NP2.y"
{
        yyval.sval = MakeString(2, yyvsp[-1].sval, yyvsp[0].sval);
        printf("ADJ NP %s ", yyval.sval);
    ;
  break;}
case 6:
#line 63 "NP2.y"
{
        yyval.sval = MakeString(2, yyvsp[-1].sval, yyvsp[0].sval);
        printf("NP ADJ %s ", yyval.sval);
    ;
  break; }
case 7:
#line 68 "NP2.y"
{
        yyval.sval = MakeString(2, yyvsp[-1].sval, yyvsp[0].sval);
        printf("EN NP %s ", yyval.sval);
    ;
  break; }
case 8:
#line 73 "NP2.y"
{
        yyval.sval = MakeString(2, yyvsp[-1].sval, yyvsp[0].sval);
        printf("EN, %s ", yyval.sval);
    ;
  break;}
case 9:
#line 78 "NP2.y"
{
        yyval.sval = MakeString(2, yyvsp[-1].sval, yyvsp[0].sval);
        printf("NP EN %s ", yyval.sval);
    ;
  break;}
case 10:
#line 83 "NP2.y"
{
        yyval.sval = MakeString(2, yyvsp[-1].sval, yyvsp[0].sval);
        printf("DT NP %s ", yyval.sval);
    ;
```

```
    break;}
case 11:
#line 88 "NP2.y"
{
        yyval.sval = yyvsp[0].sval;
    ;
    break;}
case 15:
#line 98 "NP2.y"
{
        printf("ADJ ");
        yyval.svl = MakeString(1, yyvsp[-3].sval);
        printf("adj %s ", yyval.sval);
    ;
    break;}
case 16:
#line 107 "NP2.y"
{
        /* <lex pos=DT>the<lex>*/
        yyval.sval = MakeString(1, yyvsp[-3].sval);
        printf("det %s ", yyval.sval);
    ;
    break;}
case 20:
#line 119 "NP2.y"
{
        printf("noun_post ");
        yyval.sval = MakeString(4, yyvsp[-3].sval, &"(", yyvsp[-8].sval, &")");
        printf("NNpost %s ", yyval.sval);
    ;
    break;}
case 24:
#line 132 "NP2.y"
{
        printf("noun_role ");
        yyval.sval = MakeString(4, yyvsp[-3].sval, &"(", yyvsp[-8].sval, &")");
        printf("NNrole %s ", yyval.sval);
    ;
    break;}
case 25:
#line 141 "NP2.y"
{
        yyval.sval = yyvsp[0].sval;
    ;
    break;}
case 26:
#line 145 "NP2.y"
{
        yyval.sval = yyvsp[0].sval;
    ;
    break;}
case 28:
#line 150 "NP2.y"
{
        /* <lex pos=NNS>years</lex>*/
        yyval.sval = MakeString(1, yyvsp[-3].sval);
        printf("noun %s ", yyval.sval);
    ;
    break;}
case 30:
#line 157 "NP2.y"
{
        yyval.sval = MakeString(1, yyvsp[-3].sval);
        printf("noun %s ", yyval.sval);
    ;
    break;}
case 40:
#line 174 "NP2.y"
{
        yyval.sval = MakeString(1, yyvsp[-3].sval);
        printf("verb %s ", yyval.sval);
    ;
    break;}
case 41:
#line 182 "NP2.y"
{
        yyval.sval = getEnamexStrippedMarkup(yytext);
        printf("Enamex %s ", yyval.sval);
    ;
```

-continued

```
  break;}
case 44:
#line 192 "NP2.y"
{
      yyval.sval = yyvsp[0].sval;
      printf("not np %s ", yyval.sval);
    ;
  break;}
case 45:
#line 200 "NP2.y"
{
      printf(",");
      yyval.sval = (char *)malloc(3);
      strcpy(yyval.sval, ",");
    ;
  break;}
case 46:
#line 208 "NP2.y"
{
      yyval.sval = (char *) malloc(strlen(yytext) + 1);
      strcpy(yyval.sval, yytext);
      /* printf("w %s",$$); */
    ;
  break;}
}
   /* the action file gets copied in in place of this dollarsign */
#line 498 "/usr/local/gnu/share/bison.simple"
  yyvsp -= yylen;
  yyssp -= yylen;
#ifdef YYLSP_NEEDED
  yylsp -= yylen;
#endif
#if YYDEBUG != 0
  if (yydebug)
    {
      short *ssp1 = yyss - 1;
      fprintf (stderr, "state stack now");
      while (ssp1 != yyssp)
        fprintf(stderr, "%d", *++ssp1);
      fprintf (stderr, " ");
    }
#endif
  *++YYVSP = yyval;
#ifdef YYLSP_NEEDED
  yylsp++;
  if (yylen == 0)
    {
      yylsp->first_line = yylloc.first_line
      yylsp->first_column = yylloc.first_column;
      yylsp->last_line = (yylsp-1)->last_line;
      yylsp->last_column = (yylsp-1)->last_column
      yylsp->text = 0;
    }
  else
    {
      yylsp->last_line = (yylsp+yylen-1)->last_line
      yylsp->last_column = (yylsp+yylen-1 )->last_column;
    }
#endif
  /* Now "shift" the result of the reduction.
    Determine what state that goes to,
    based on the state we popped back to
    and the rule number reduced by. */
  yyn = yyr1[yyn];
  yystate = yypgoto[yyn - YYNTBASE] + *yyssp;
  if (yystate >= 0 && yystate <= YYLAST && yycheck[yystate] == *yyssp)
    yystate = yytable[yystate];
  else
    yystate = yydefgoto[yyn - YYNTBASE];
  goto yynewstate;
yyerrlab:  /* here on detecting error */
  if (!yyerrstatus)
    /* If not already recovering from an error, report this error. */
    {
      ++yynerrs;
#ifdef YYERROR_VERBOSE
      yyn = yypact[yystate];
      if (yyn > YYFLAG && yyn < YYLAST)
        {
```

-continued

```
    int size = 0;
    char *msg;
    int x, count;
    count = 0;
    /* Start X at -yyn if nec to avoid negative indexes in yycheck. */
    for(x = (yyn < 0 ? -yyn: 0;
      x < (sizeof(yytname)/ sizeof(char *)); x++)
    if(yycheck[x + yyn] == x)
      size += strlen(yytname[x]) + 15, count++;
    msg = (char *) malloc(size + 15);
    if(msg != 0)
    {
    strcpy(msg, "parse error");
    if(count < 5)
    {
    count = 0;
    for (x = (yyn < 0 ? -yyn: 0);
      x < (sizeof(yytname) / sizeof(char *)); x++)
      if (yycheck[x + yyn] == x)
        {
            strcat(msg, count == 0 ?", expecting "":" or "");
            strcat(msg, yytname[x]);
            strcat(msg, "");
            count++;
        }
    }
    yyerror(msg);
    free(msg);
    }
    else
      yyerror ("parse error; also virtual memory exceeded");
    }
  else
#endif/* YYERROR_VERBOSE */
    yyerror("parse error");
  }
  goto yyerrlab 1;
yyerrlab1: /* here on error raised explicitly by an action */
  if (yyerrstatus == 3)
    {
    /* if just tried and failed to reuse lookahead token after an error, discard it. */
    /* return failure if at end of input */
    if (yychar == YYEOF)
        YYABORT;
#if YYDEBUG != 0
    if (yydebug)
      fprintf(stderr, "Discarding token %d (%s). ", yychar, yytname[yychar1]);
#endif
    yychar = YYEMPTY;
    }
  /* Else will try to reuse lookahead token
    after shifting the error token. */
  yyerrstatus = 3;          /* Each real token shifted decrements this */
  goto yyerrhandle;
yyerrdefault: /* current state does not do anything special for the error token. */
#if 0
  /* This is wrong; only states that explicitly want error tokens
    should shift them. */
  yyn = yydefact[yystate]; /* If its default is to accept any token, ok. Otherwise pop it.*/
  if (yyn) goto yydefault;
#endif
yyerrpop: /* pop the current state because it cannot handle the error token */
  if(yyssp == yyss) YYABORT;
  yyvsp--;
  yystate = *--yyssp;
#ifdef YYLSP_NEEDED
  yylsp--;
#endif
#if YYDEBUG != 0
  if (yydebug)
    {
    short*ssp1 = yyss - 1;
    fprintf (stderr, "Error: state stack now");
    while (ssp1 != yyssp)
      fprintf (stderr, "%d", *++ssp1);
    fprintf (stderr, " ");
    }
#endif
yyerrhandle:
```

-continued

```
yyn = yypact[yystate];
if (yyn == YYFLAG)
 goto yyerrdefault;
yyn += YYTERROR;
if(yyn < 0 || yyn > YYLAST || yycheck[yyn] != YYTERROR)
 goto yyerrdefault;
yyn = yytable[yyn];
if(yyn <0)
 {
 if(yyn == YYFLAG)
    goto yyerrpop;
 yyn = -yyn;
 goto yyreduce;
 }
 else if (yyn == 0)
 goto yyerrpop;
 if(yyn == YYFINAL)
 YYACCEPT;
#if YYDEBUG != 0
if (yydebug)
 iprintf(stderr, "Shifting error token,");
#endif
*++yyvsp = yylval;
#ifdef YYLSP_NEEDED
*++yylsp = yylloc;
#endif
yystate = yyn;
goto yynewstate;
}
#line 215 "NP2.y"
/* Straight C code */
char *MakeString(int num, . . .) {
 va_list ap;
 char *temp, *arg, *str;
 int i, len=0;
 str = (char *)malloc(1);
 strcpy(str,"");
 va_start(ap, num);
 for (i=0; i < num; ++i) {
 arg = va_arg(ap, char *);
 if(arg != NULL) {
 temp = (char *) malloc(strlen(str) + strlen(arg) + 1);
 strcpy(temp, str);
 strcat(temp, arg);
 free(str);
 free(arg);
 str = temp;
 }
 }
 va_end(ap);
 return str;
}
int yyerror(char * msg)
{
printf("EE");
fflush(stdout);
}
```

FILENAME: WordInfo.h (contains word structure and related definitions)
```
/* WordInfo.h
 * Header file for WordInfo.c module.
 * This module will take a word, hash it, and store
 * a pointer to the Word structure for that word.
 * Off of the hash entry for each word will be a list
 * of the different Word structures, essentially
 * giving us a way to quickly look up a word
 * and all the structures it is in.
 */
#ifndef _WordInfo_
#define _WordInfo_
#include "LinkIT.h"
#include "NPDict.h" /* Use the hash() function from NPDict.c */
#define kWordInfoHashSize 10001
/* The array that we hash into will be
```

-continued

```
 * kWordInfoHashSize big. The array consists of
 * pointers to WordInfoList structures. If the word
 * has not been seen yet, a new WordInfoList will
 * be created, and a WordInfoNode will be inserted into
 * that list.
 *
 * We have WordInfoLists because if there is a collision
 * we want to keep a list for the first word, the second
 * word, etc, and not just chain together WordInfoNode
 * structures for different words.
 */
/* Define the structure that keeps a list of
 * WordInfoNodes
 */
typedef struct WordInfoList {
struct WordInfoNode *head; /* Head of the Word Occurrence list for this word */
struct WordInfoList *next; /* Pointer to the list for another word, if there
                            * was a collision this will point to the list
                            * for the word that collided with this word
                            */
} WordInfoList;
/* Define the structure that keeps a pointer to the
 * word occurrence
 */
typedef struct WordInfoNode {
Word *occurrence; /* The pointer to the Word structure of
                   * this occurrence of the word
                   */
 struct WordInfoNode *next; /* Pointer to the next node */
} WordInfoNode;
/* struct WordListArr
 * Used to sort the final WordLists
 */
typedef struct WordListArr {
WordInfoNode *node;
int head;
int mod;
float weight;
} WordListArr;
/* Define the function prototypes */
WordInfoNode *WI_Lookup(char *);
/* Lookup the string and return a pointer to the
 * WordInfoNode at the head of it's list, or
 * NULL if it is not in the hash
 */
WordInfoNode *WI_Install(char *, Word *);
/* Install the string into the hash
 * set the WordInfoNode occurrence field
 * to the Word *, and return the new
 * WordInfoList pointer. It will be
 * inserted at the head of the list
 */
void WI_Free();
/* Free all the memory used by the WordInfo module —
 * reset all values in the hash table to NULL
 */
WordInfoList *WI_ListWords();
/* Return a WordInfoList that has the WordInfoNode
 * head pointers for each of the words in the hash.
 * Do not free this structure — it will be freed
 * from WI_Free()
 */
void WI_FreeList(WordInfoList *toFree);
/* Internal use only.
 * Free the WordInfoList pointed to by toFree
 */
void WI_FreeNode(WordInfoNode *toFree);
/* Internal use only.
 * Free the WordInfoNode and it's list
 * pointed to by toFree
 */
WordInfoList *WI_LookupListInternal(char *s);
/* Look up the word s, return the
 * WordInfoList the WordInfoNode starts
 * in or NULL if the word is not in the hash
 */
unsigned WI_hash(char *s); /* Hash function */
void WI_FreeListWordsList(WordInfoList *);
/* For the WordInfoList * returned by
```

-continued

```
 * WI_ListWords() that enumerates all
 * of the words and occurrences in the
 * doc, free just that list. Can't use
 * the normal WI_FreeList() on this because
 * we might not really want to free up
 * recursively the WordInfoNode structures.
 */
void WI_Init(); /* Initialize the WordInfo structures. NULL out the hash */
void WI_PrintWordList(enum weightTypes weight);
/* Print the lists that show a word, and which
 * NPs it is in as a head, then as a modifier
 * weight is the type of weighting to use
 * 0: Just put words first based on number
 * of times they occurr in an NP, then
 * look at number of heads
 * 1: Weight 1 for occurrence as head,
 * .5 for occurrence as mod
 */
void WI_PrintWLArr(WordListArr *WLArr, int size, int weight);
/* int size is the length of the array
 * Print out the Words in the WordListArr array
 * weight is the sorting method used. If it is 1, we
 * will print the weight each word had when sorted
 */
int WordListArrCmp(const WordListArr *a, const WordListArr *b);
/* comparision fn for quicksort */
int WordListArrCmp2(const WordListArr *a, const WordListArr *b);
/* comparision fn for quicksort */
void InitWLArr(WordListArr *WLArr);
/* Set to default values */
#endif
```

---

```
FILENAME: WordInfo.c (routines that apply to word units such as tags and structures, contains
subroutines for storing information about words compactly and efficiently)
/* WordInfo.c
 * This file implements a module that stores words and their
 * occurrences in a hash. For each word we keep a list of
 * WordInfoNode structures that corresspond to an occurrence
 * of a word. Each WordInfoNode points to a Word structure for
 * that occurrence of a word. Since it is possible to have
 * collisions we keep a list of WordInfoNode (lists) at each
 * hash location.
 */
#include "WordInfo.h"
#include "NPDict.h"
#include <stdio.h>
/* The static hashtable
 */
static WordInfoList *WI_Hashtable[kWordInfoHashSize];
/*
 * the functions
 *
 */
/* void WI_Free()
 *
 * Free the memory used by the hashtable structure
 */
void WI_Free() {
 int i;
 for (i=0; i<kWordInfoHashSize; i++) {
 /* Free the WordInfoList for this entry in the table
  */
  WI_FreeList(WI_Hashtable[i]);
  WI_Hashtable[i] = NULL; /* Set this to NULL */
 }
 if (gVerbosity > 9 && !gNoPrint)
  printf("WI_Free() done\n");
}
/* void WI_FreeList(WordInfoList *toFree)
 * Free the list pointed to by toFree.
 * If the pointer is NULL, do nothing.
 */
void WI_FreeList(WordInfoList *toFree) {
 WordInfoList *walker;
```

-continued

```
if (toFree == NULL)
 return;
walker = toFree—>next;
while (toFree) {
 /* Free the Node list */
 WI_FreeNode(toFree—>head);
 /* Free the WordInfoList node */
 free(toFree);
 /* Advance the pointers */
 toFree = walker;
 if (toFree != NULL)
  walker = toFree—>next;
}
/* Done */
}
void WI_FreeNode(WordInfoNode *toFree) {
WordInfoNode *walker;
if (toFree == NULL)
 return;
walker = toFree—>next;
while (toFree) {
 if (gVerbosity > 9 && !gNoPrint)
  printf("freeing %s\n",toFree—>occurrence—>str);
 free(toFree);
 toFree = walker;
 if (toFree != NULL)
  walker = toFree—>next;
}
/* Done */
}
/* WI_Install(char *, Word *)
 * Put the string word in the hash pointing
 * to the Word structure. If the word already
 * exists, add it to the head of that word's
 * WordInfoNode list, if the word does not exist,
 * create a new WordInfoList and WordInfoNode for
 * it.
 */
WordInfoNode *WI_Install(char *s, Word *word) {
WordInfoList *tempList;
WordInfoNode *tempNode;
unsigned hashValue;
if (s == NULL || word == NULL)
 return NULL;
/* Look up the word, if it exists, insert into
 * existing list
 */
if (gVerbosity > 9 && !gNoPrint)
 printf("Installing %s\n",s);
if ((tempList = WI_LookupListInternal(s)) == NULL) {
 /* The word does not exist, we need to create a new
  * WordInfoList and WordInfoNode
  */
 tempList = (WordInfoList *) malloc(sizeof(WordInfoList));
 assert(tempList);
 tempList—>next = NULL; /* This is the first List so far */
 tempNode = (WordInfoNode *) malloc(sizeof(WordInfoNode));
 assert(tempNode);
 tempNode—>next = NULL; /* No other occurrences of this word */
 tempNode—>occurrence = word; /* Insert the word */
 tempList—>head = tempNode; /* Insert the node list into the WordInfoList */
 /* Now we have to find out where to place the WordInfoList */
 hashValue = WI_hash(s);
 /* We will go into hashVal, but have to check for collisions
  * We know this is a new word, because we didn't find it before
  * so we will place this list at the front of the lists of words
  */
 tempList—>next = WI_Hashtable[hashValue]; /* Point the next of us to head of list */
 WI_Hashtable[hashValue] = tempList; /* Make this the new head */
 return tempNode;
} else {
 /* The Word Exists, and we have a handle to the
  * WordInfoList that it is in. Place it in the
  * front of the WordInfoNode list
  */
 tempNode = (WordInfoNode *) malloc(sizeof(WordInfoNode));
 assert(tempNode);
 tempNode—>occurrence = word; /* Insert the word */
 tempNode—>next = tempList—>head; /* Point next to current start of list */
```

-continued

```
tempList—>head = tempNode; /* Point head of list to new node */
return tempNode; /* Return this pointer */
}
/* Should never reach here */
fprintf(stderr, "WI_Install: I should not have reached this point!\n");
return NULL;
}
/* WI_hash: make a hash value for a string */
unsigned WI_hash(char *s) {
unsigned hashval;
char localw[256]; /* Array to hold the local copy of the word. */
int len, i;
dlist *dictW;
/* Since we want all the related words to map into
 * the same slot, we will stem the words here
 * in the same way that we do in the
 * CommonStringCompare() function.
 */
/* Make a local copy of the word, lower case */
len = strlen(s)-1;
for (i=0; i<=len; i++) {
 localw[i]=tolower(s[i]);
 }
localw[i] = '\0';
/* Lookup in the irregular plural dictionary, and if
 * there, use that form of the word — otherwise,
 * send ies—>y, get rid of es and s
 */
if ((dictW = NPD_Lookup(localw)) != NULL && dictW—>type == kIrrPlural) {
char *tempChar;
/* hash the singular form of the word */
free(localw);
tempChar = dictW—>word;
for (hashval = 0; *tempChar != '\0'; tempChar++)
 hashval = *tempChar + 31 * hashval;
return (hashval % kWordInfoHashSize);
} else {
/* Not in the dictionary as irregular plural so
 * make ies —> y, remove es, remove s
 * Now make ies —> y */
if (len > 2 && localw[len] == 's' && localw[len-1] == 'e'
  && localw[len-2] == 'i') {
 localw[len-2] = 'y';
 localw[len-1] = '\0';
 len —= 2;
} else if (len > 1 && localw[len] == 's' && localw[len-1] == 'e') {
 /* strip off es */
 localw[len-1] = '\0';
 len —= 2;
} else if (len > 0 && localw[len] == 's') {
 /* strip off s */
 localw[len] = '\0';
 len--;
 }
}
for (hashval = 0, i=0; localw[i] != '\0'; i++)
 hashval = localw[i] + 31 * hashval;
return (hashval % kWordInfoHashSize);
}
/* WI_LookupListInternal(char *s)
 * Lookup the word s, and return the
 * WordInfoList the WordInfoNode starts in
 * or NULL if the word is not in the hash
 * This is an internal function
 */
WordInfoList *WI_LookupListInternal(char *s) {
unsigned hashValue;
WordInfoList *tempList;
/* Check for the NULL word case */
if (s == NULL)
 return NULL;
hashValue = WI_hash(s);
tempList = WI_Hashtable[hashValue];
if (tempList == NULL)
 return NULL;
else {
/* We have a list to check out
 * See if any of the lists point to
 * the same word that we are looking at
```

-continued

```
 */
/* to use the CommonStringCompare function
 * we need to have the thigns in word structures.
 * So make a dummy one
 */
Word ourWord;
ourWord.str = s;
/* For as long as the words are not the same, and we have a new
 * list of words to check against, keep checking
 */
while ( (tempList != NULL)
    && (CommonStringCompare(&ourWord, tempList—>head—>occurrence) == 0) ) {
  tempList = tempList—>next; /* Check the next one */
}
/* If tempList == NULL, we didn't find the word
 * If tempList is not NULL, that is the word
 * So just return tempList
 */
 return tempList;
}
}
/* WI_Lookup(char *s)
 * Lookup the string and return a pointer to the
 * WordInfoNode at the head of it's list, or
 * NULL if it is not in the hash
 */
WordInfoNode *WI_Lookup(char *s) {
WordInfoList *temp;
temp = WI_LookupListInternal(s);
if (temp == NULL)
 return NULL;
else
 return temp—>head;
}
/* WI_ListWords()
 * Return a WordInfoList that has the WordInfoNode
 * head pointers for each of the words in the hash.
 * Do not free this structure — it will be freed
 * from WI_Free()
 */
WordInfoList *WI_ListWords() {
 int i;
WordInfoList *tempList, *head=NULL, *newList;
/* Brute force: run through all of the slots in the
 * hash table, if there is something there, add it to
 * the list
 */
for (i=0; i<kWordInfoHashSize; i++) {
 if (WI_Hashtable[i] != NULL) {
  /* There is something here, add it to the list */
  tempList = WI_Hashtable[i];
  /* Copy each of the lists to our list */
  while (tempList) {
   newList = (WordInfoList *)malloc(sizeof(WordInfoList));
   assert(newList);
   newList—>next = head;
   head = newList;
   newList—>head = tempList—>head;
   tempList = tempList—>next;
  }
 } /* if */
}
if (gVerbosity > 9 && !gNoPrint)
 printf("WI_ListWords done \n");
return head;
}
/* WI_FreeListWordsList()
 * For the WordInfoList * returned by
 * WI_ListWords() that enumerates all
 * of the words and occurrences in the
 * doc, free just that list. Can't use
 * the normal WI_FreeList() on this because
 * we might not really want to free up
 * recursively the WordInfoNode structures.
 */
void WI_FreeListWordsList(WordInfoList *toFree) {
WordInfoList *temp;
/* Just free up the WordInfoList nodes, do not
 * recursively go and free up the WordInfoNode
```

-continued

```
 * structures!!
 */
if (toFree == NULL)
 return;
temp = toFree—>next;
while (toFree) {
 free(toFree);
 toFree = temp;
 if (toFree != NULL)
  temp = toFree—>next;
}
/* Done */
if (gVerbosity > 9 && !gNoPrint)
 printf("WI_FreeListWordList done\n");
}
/* WI_Init()
 * NULL out the WI hashtable. Assume it has been
 * WI_Free() 'd before this, or that no mem has been
 * malloc'd up.
 */
void WI_Init() {
 int i;
 for (i=0; i<kWordInfoHashSize; i++)
  WI_Hashtable[i] = NULL;
 if (gVerbosity > 9 && !gNoPrint)
  printf("WordInfo Init done\n");
}
/* WI_PrintWordList()
 * Print the lists that show a word, and which
 * NPs it is in as a head, then as a modifier
 * weight is the type of weighting to use
 * 0: Just put words first based on number
 * of times they occurr in an NP, then
 * look at number of heads
 * 1: Weight 1 for occurrence as head,
 * .5 for occurrence as mod
 */
void WI_PrintWordList(enum weightTypes weight) {
 WordListArr *WLArr; /* Dynamically size the array when we know how many there are */
 /* Get a WordInfoList with all the different WordInfoNode s in it
  */
 WordInfoList *theList, *listWalker;
 WordInfoNode *tempNode;
 int ArrSize=0; /* Use to find the size we need for the array */
 int i; /* Used as index into WLArr */
 theList = WI_ListWords();
 /* Get the size of the Array by walking the list and counting
  */
 listWalker = theList;
 while (listWalker) {
  tempNode = listWalker—>head;
  /* If this word is only in one NP, ie it is either only a
   * head or only a mod once, reserve space for it
   *
   * Don't reserve space if it is a pronoun either!!
   */
  if (tempNode—>next != NULL && (tempNode—>occurrence—>tag != kCL
                                 && tempNode—>occurrence—>tag != kCLS
                                 && tempNode—>occurrence—>tag != kCLR
                                 && tempNode—>occurrence—>tag != kPRP
                                 && tempNode—>occurrence—>tag != kPRPPoss) ) {
   ArrSize++;
  }
  listWalker = listWalker—>next;
 }
 /* Allocate the array */
 WLArr = (WordListArr *) calloc( ArrSize, sizeof(WordListArr) );
 assert(WLArr);
 InitWLArr( WLArr );
 /* For each word (each WordInfoNode) we want to print two lists:
  * Word
  * head:
  * (the NP)
  * . . .
  * mod:
  * (the NP)
  * . . .
  *
  *
```

-continued

```
* We also want this list to be sorted such that the words that
* occurr in the most NPs are printed first. We will place
* all the word lists in an array first, and then sort
* that array. The array we will make is a special one
* to this group, a pointer to the Word list, and
* two ints for the number of times the word is a head
* and the number of times the word is a modifier. We
* set those values as we place the word lists into the
* array, and then quicksort that array.
* Since we set the values in the struct, we don't have to
* repeatedly scan the length of the list to determine the
* length of it.
*/
listWalker = theList;
i = 0;
while (listWalker) {
 tempNode = listWalker—>head;
 /* If this word is only in on NP, ie it is either only a
 * head or only a mod once, do not add to array
 *
 * don't add it if this word is a pronoun either
 */
 if (tempNode—>next != NULL && (tempNode—>occurrence—>tag != kCL
                                && tempNode—>occurrence—>tag != kCLS
                                && tempNode—>occurrence—>tag != kCLR
                                && tempNode—>occurrence—>tag != kPRP
                                && tempNode—>occurrence—>tag != kPRPPoss)) {
   /* Add to the array */
   WLArr[i].node = tempNode;
   while (tempNode) {
     /* Increment count for head or mod in array */
     if (tempNode—>occurrence—>wordNP—>head == tempNode—>occurrence) {
      WLArr[i].head++;
     } else {
      WLArr[i].mod++;
     }
     tempNode = tempNode—>next;
   }
   /* Make the weight depending on the type of weighting
   */
   if (weight == kHeadAndMod)
     WLArr[i].weight = WLArr[i].head + WLArr[i].mod * 0.5;
   else
     WLArr[i].weight = WLArr[i].head;
   i++; /* Go on to the next slot */
 } /* If there was only one word, skip down to here */
 /* Get the next "word" */
 listWalker = listWalker—>next;
}
/* Now we have all the wordlists we are interested in the array.
* Sort the array and print it out
*
* Use a different sort procedure based on the weight argument
*/
if (weight == kNoWeight) {
 qsort (WLArr, (size_t) ArrSize, sizeof(WordListArr),
    (int (*)(void *, void*))(WordListArrCmp));
} else if (weight == kHeadOnly || weight = kHeadAndMod) {
 qsort (WLArr, (size_t) ArrSize, sizeof(WordListArr),
    (int (*)(void *, void*))(WordListArrCmp2));
}
WL_PrintWLArr(WLArr, ArrSize, weight);
/* Free the array */
free(WLArr);
/* Free the list of words */
WL_FreeListWordsList(theList);
}
/* WL_PrintWLArr(WordListArr *WLArr)
* int size is the length of the array
* Print out the Words in the WordListArr array in
* the following format:
* For each word (each WordInfoNode) we want to print two lists:
* Word
* head:
* (the NP)
* . . .
* mod:
* (the NP)
* . . .
```

-continued

```
*
 * Weight is the sorting type used, if it is 1 we will
 * print the weight each word had
 */
void WL_PrintWLArr(WordListArr *WLArr, int size, int weight) {
 WordInfoNode *tempNode;
 int i=0, firstTime, printedHead;
 for (i=0; i<size; i++) {
  /* Get the WordInfoNode list to print */
  tempNode = WLArr[i].node;
  /* Print the word */
  if (weight == kNoWeight)
   Print("\n\n%s:\n", tempNode—>occurrence—>str);
  else if (weight == kHeadOnly || weight == kHeadAndMod) {
   /* Don't print the word if it is weighted 0
   */
   if (WLArr[i].weight > 0)
    Print("%f\t%s\n", WLArr[i].weight, tempNode—>occurrence—>str);
   continue;
  }
  firstTime = 1; /* Should we print out "head:" or not? */
  printedHead = 0; /* Flag if we printed head, print \n before mod: */
  while (tempNode) {
   /* Print out all NPs that have this word as a head */
   if (tempNode—>occurrence—>wordNP—>head == tempNode—>occurrence) {
    if (firstTime == 1) {
     Print(" head:");
     firstTime = 0;
     printedHead = 1;
    }
    printNP(tempNode—>occurrence—>wordNP);
   }
   tempNode = tempNode—>next;
  }
  /* Re-set and print again only the modifiers this time
  */
  tempNode = WLArr[i].node;
  firstTime = 1;
  while (tempNode) {
   if (tempNode—>occurrence—>wordNP—>head != tempNode—>occurrence) {
    if (firstTime == 1) {
     Print("%s mod:", printedHead == 1 ? "\n" : "");
     firstTime = 0;
    }
    printNP(tempNode—>occurrence—>wordNP);
   }
   tempNode = tempNode—>next;
  }
  /* Get the next "word" */
 }
}
/* WordListArrCmp
 * compare two WordListArr nodes and return the value that
 * is "bigger" (that we want to be first in the sorted
 * output list
 *
 * This is based on the number of times the word is a head
 * in an NP and the number of times the word is a mod.
 */
int WordListArrCmp(const WordListArr *a, const WordListArr *b) {
 if ((a—>head + a—>mod) > (b—>head + b—>mod))
  return -1;
 else if ((a—>head + a—>mod) < (b—>head + b—>mod))
  return 1;
 else if (a—>head > b—>head)
  return -1;
 else if (a—>head < b—>head)
  return 1;
 else return (b—>mod - a—>mod);
}
/* Create a weight for each of the nodes, sort based on weight.
 * The weight is simply the number of times the word is a head,
 * plus one half the number of times the word is a mod.
 */
int WordListArrCmp2(const WordListArr *a, const WordListArr *b) {
 if (a—>weight < b—>weight)
  return 1;
 else if (a—>weight > b—>weight)
  return -1;
```

```
else return 0;
}
void InitWLArr(WordListArr *WLArr) {
 if (WLArr != NULL) {
  WLArr—>head = 0;
  WLArr—>mod = 0;
  WLArr—>weight = 0;
  WLArr—>node = NULL;
 }
}
```

FILENAME: Makefile for LinkIT (for automating compilation of LinkIT program)

```
# Makefile for LinkIT
CFLAGS=-g -Wall
CC=gcc
LinkIT : lex.yy.c LinkIT.h LinkIT.o NPList.o NPDict.o WordInfo.o
        $(CC) $(CFLAGS) LinkIT.o NPList.o NPDict.o WordInfo.o
        -o LinkIT
NPList.o : NPList.c
        $(CC) $(CFLAGS) -c NPList.c
NPDict.o : NPDict.c NPDict.h
        $(CC) $(CFLAGS) -c NPDict.c
LinkIT.o : LinkIT.c LinkIT.h lex.yy.c
        $(CC) $(CFLAGS) -c LinkIT.c
WordInfo.o : WordInfo.c WordInfo.h
        $(CC) $(CFLAGS) -c WordInfo.c
lex.yy.c : NP.lex LinkIT.h
        lex -v NP.lex
```

SAMPLE DOCUMENT INPUT TO ALBEMIC WORKBENCH

A form of asbestos once used to make Kent cigarette filters has caused a high percentage of cancer deaths among a group of workers exposed to it more than 30 years ago, researchers reported.

The asbestos fiber, crocidolite, is unusually resilient once it enters the lung, with even brief exposures to it causing symptoms that show up decades later, researchers said. Lorillard Inc., the unit of New York-based Loews Corp. that makes Kent cigarettes, stopped using crocidolite in its Micronite cigarette filters in 1956.

Although preliminary findings were reported more than a year ago, the latest results appear in today's New England Journal of Medicine, a forum likely to bring new attention to the problem.

A Lorillard spokeswoman said, "This is an old story. Were talking about years ago before anyone heard of asbestos having any questionable properties. There is no asbestos in our products now."

Neither Lorillard nor the researchers who studied the workers were aware of any research on smokers of the Kent cigarettes. "We have no useful information on whether users are at risk," said James A. Talcott of Boston's Dana-Farber Cancer Institute. Dr. Talcott led a team of researchers from the National Cancer Institute and the medical schools of Harvard University and Boston University.

The Lorillard spokeswoman said asbestos was used in "very modest amounts" in making paper for the filters in the early 1950s and replaced with a different type of filter in 1956. From 1953 to 1955, 9.8 billion Kent cigarettes with the filters were sold, the company said.

Among 33 men who worked closely with the substance, 28 have died - more than three times the expected number. Four of the five surviving workers have asbestos-related diseases, including three with recently diagnosed cancer. The total of 18 deaths from malignant mesothelioma, lung cancer and asbestosis was far higher than expected, the researchers said.

"The morbidity rate is a striking finding among those of us who study asbestos-related diseases," said Dr. Talcott. The percentage of lung cancer deaths among the workers at the West Groton Mass., paper factory appears to be the highest for any asbestos workers studied in Western industrialized countries, he said.

The finding probably will support those who argue that the U.S. should regulate the class of asbestos including crocidolite more stringently than the common kind of asbestos, chrysotile, found in most schools and other buildings, Dr. Talcott said.

The U.S. is one of the few industrialized nations that doesn't have a higher standard of regulation for the smooth, needle-like fibers such as crocidolite that are classified as amphobiles, according to Brooke T. Mossman, a professor of pathlogy at the University of Vermont College of Medicine. More common chrysotile fibers are curly and are more easily rejected by the body, Dr. Mossman explained.

In July, the Environmental Protection Agency imposed a gradual ban on virtually all uses of asbestos. By 1997, almost all remaining uses of cancer-causing asbestos will be outlawed.

About 160 workers at a factory that made paper for the Kent filters were exposed to asbestos in the 1950s. Areas of the factory were particularly dusty where the crocidolite was used.

Workers dumped large burlap sacks of the imported material into a huge bin, poured in cotton and acetate fibers and mechanically mixed the dry fibers in a process used to make filters. Workers described "clouds of blue dust" that hung over parts of the factory, even though exhaust fans ventilated the area.

"There's no question that some of those workers and managers contracted asbestos-related diseases," said Darrell Phillips, vice president of human resources for Hollingsworth & Vose. "But you have to recognize that these events took place 35 years ago. It has no bearing on our work force today."

SAMPLE OUTPUT FILE FROM ALEMBIC WORKBENCH (INPUT TO NP.LEX)

<s><lex pos=DT>A</lex><lex pos=NN>form</lex><lex pos=IN>of</lex><lex pos=NN>asbestos</lex><lex pos=RB>once</lex><lex pos=VBD>used</lex><lex pos=TO>to</lex><lex pos=VB>make</lex><ENAMEX TYPE=LOCATION><lex pos=NNP>Kent</lex></ENAMEX><lex pos=NN>cigarette</lex><lex pos=NNS>filters</lex><lex pos=VBZ>has</lex><lex pos=VBN>caused</lex><lex pos=DT>a</lex><lex pos=JJ>high</lex><lex pos=NN>percentage</lex><lex pos=IN>of</lex><lex pos=NN>cancer</lex><lex pos=NNS>deaths</lex><lex pos=IN>among</lex><lex pos=DT>a</lex><lex pos=NN>group</lex><lex pos=IN>of</lex><lex pos=NNS>workers</lex><lex pos=VBN>exposed</lex><lex pos=TO>to</lex><lex pos=PRP>it</lex><lex pos=JJR>more</lex><lex pos=IN>than</lex><lex pos=CD>30</lex><lex pos=NNS>years</lex><lex pos=RB>ago</lex><lex pos=",">,</lex><lex pos=NNS>researchers</lex><lex pos=VBD>reported</lex><lex pos=".">.</lex></s>
<s><lex pos=DT>The</lex><lex pos=NN>asbestos</lex><lex pos=NN>fiber</lex><lex pos=",">,</lex><lex pos=NN>crocidolite</lex><lex pos=",">, </lex><lex pos=VBZ>is</lex><lex pos=RB>unusually</lex><lex pos=JJ>resilient</lex><lex pos=IN>once</lex><lex pos=PRP>it</lex><lex pos=VBZ>enters</lex><lex pos=DT>the</lex><lex pos=NNS>lungs</lex><lex pos=",">,</lex><lex pos=IN>with</lex><lex pos=RB>even</lex><lex pos=JJ>brief</lex><lex pos=NNS>exposures</lex><lex pos=TO>to</lex><lex pos=PRP>it</lex><lex pos=VBG>causing</lex><lex pos=NNS>symptoms</lex><lex pos=IN>that</lex><lex pos=NN>show</lex><lex pos=RP>up</lex><lex pos=NNS>decades</lex><lex pos=RB>later</lex><lex pos=",">,</lex><lex pos=NNS>researchers</lex><lex pos=VBD>said</lex><lex pos=".">.</lex></s><s><ENAMEX TYPE=ORGANIZATION><lex pos=NNP>Lorillard</lex><lex pos=NNP>Inc.</lex></ENAMEX><lex pos=",">,</lex><lex pos=DT>the</lex><lex pos=NN>unit</lex><lex pos=IN>of</lex><ENAMEX TYPE=LOCATION><lex pos=NNP>New</lex><lex pos=NNP>York</lex></ENAMEX><lex pos=JJ>-based</lex><ENAMEX TYPE=ORGANIZATION><lex pos=NNP>Loews</lex><lex pos=NNP>Corp.</lex></ENAMEX><lex pos=WDT>that</lex><lex pos=VBZ>makes</lex><ENAMEX TYPE=LOCATION><lex pos=NNP>Kent</lex></ENAMEX><lex pos=NNS>cigarettes</lex><lex pos=",">,</lex><lex pos=VBD>stopped</lex><lex pos=VBG>using</lex><lex pos=NN>crocidolite</lex><lex pos=IN>in</lex><lex pos="PRP$">its</lex><lex pos=NN>Micronite</lex><lex pos=NN>cigarette</lex><lex pos=NNS>filters</lex><lex pos=IN>in</lex>1956<lex pos=".">.</lex></s><s><lex pos=IN>Although</lex><lex pos=JJ>preliminary</lex><lex pos=NNS>findings</lex><lex pos=VBD>were</lex><lex pos=VBN>reported</lex><lex pos=JJR>more</lex><lex pos=IN>than</lex><lex pos=DT>a</lex><lex pos=NN>year</lex><lex pos=RB>ago</lex><lex pos=",">,</lex><lex pos=DT>the</lex><lex pos=JJS>latest</lex><lex pos=NNS>results</lex><lex pos=VBP>appear</lex><lex pos=IN>in</lex><lex pos=NN>today</lex><lex pos=POS>'s</lex><ENAMEX TYPE=ORGANIZATION><lex pos=NNP>New</lex><lex pos=NNP>England</lex><lex pos=NNP>Journal</lex><lex pos=IN>of</lex><lex pos=NNP>Medicine</lex></ENAMEX><lex pos=",">,</lex><lex pos=DT>a</lex><lex pos=NN>forum</lex><lex pos=JJ>likely</lex><lex pos=TO>to</lex><lex pos=VB>bring</lex><lex pos=JJ>new</lex><lex pos=NN>attention</lex><lex pos=TO>to</lex><lex pos=DT>the</lex><lex pos=NN>problem</lex><lex pos=".">.</lex></s>
<s><lex pos=DT>A</lex><ENAMEX TYPE=ORGANIZATION><lex pos=NNP>Lorillard</lex></ENAMEX><lex pos=NN>spokewoman</lex><lex pos=VBD>said</lex><lex pos=",">,</lex><lex pos="""">"</lex><lex pos=DT>This</lex><pos=VBZ>is</lex><lex pos=DT>an</lex><lex pos=JJ>old</lex><lex pos=NN>story</lex><lex pos=".">.</lex></s><s><lex pos=PRP>We</lex><lex pos=VBP>'re</lex><lex pos=VBG>talking</lex><lex pos=IN>about</lex><lex pos=NNS>years</lex><lex pos=RB>ago</lex><lex pos=IN>before</lex><lex pos=NN>anyone</lex><lex pos=VBN>heard</lex><lex pos=IN>of</lex><lex pos=NN>asbestos</lex><lex pos=VBG>having</lex><lex pos=DT>any</lex><lex pos=JJ>questionable</lex><lex pos=NN S>properties</lex><lex pos=".">.</lex></s><s><lex pos=EX>There</lex><lex pos=VBZ>is</lex><lex pos=DT>no</lex><lex pos=NN>asbestos</lex><lex pos=IN>in</lex><lex pos="PRP$">our</lex><lex pos=NNS>products</lex><lex pos=RB>now</lex><lex pos=".">.</lex><lex pos="""">"</lex></s>
<s><lex pos=DT>Neither</lex><ENAMEX TYPE=ORGANIZATION><lex pos=NNP>Lorillard</lex></ENAMEX><lex pos=CC>nor</lex><lex pos=DT>the</lex><lex pos=NNS>researchers</lex><lex pos=WP>who</lex><lex pos=VBD>studied</lex><lex pos=DT>the</lex><lex pos=NNS>workers</lex><lex pos=VBD>were</lex><lex pos=JJ>aware</lex><lex pos=IN>of</lex><lex pos=DT>any</lex><lex pos=NN>research</lex><lex pos=IN>on</lex><lex pos=NNS>smokers</lex><lex pos=IN>of</lex><lex pos=DT>the</lex><ENAMEX TYPE=LOCATION><lex pos=NNP>Kent</lex></ENAMEX><lex pos=NNS>cigarettes</lex><lex pos=".">.</lex></s><s><lex pos="""">"</lex><lex pos=PRP>We</lex><lex pos=VBP>have</lex><lex pos=DT>no</lex><lex pos=JJ>useful</lex><lex pos=NN>information</lex><lex pos=IN>on</lex><lex pos=IN>whether</lex><lex pos=NNS>users</lex><lex pos=VBP>are</lex><lex pos=IN>at</lex><lex pos=NN>risk</lex><lex pos=",">,</lex><lex pos="""">"</lex><lex pos=VBD>said</lex><ENAMEX TYPE=PERSON><lex pos=NNP>James</lex><lex pos=NNP!>A.</lex><lex pos=NNP>Talcott</lex></ENAMEX><lex pos=IN>of</lex><ENAMEX TYPE=LOCATION><lex pos=NNP>Boston</lex></ENAMEX><ENAMEX TYPE=ORGANIZATION><lex pos=POS>'s</lex><ENAMEX TYPE=ORGANIZATION><lex pos=NNP>Dana-Farber</lex><lex pos=NNP>Cancer</lex><lex pos=NNP>Institute</lex></ENAMEX><lex pos=".">.</lex></s><s><TTL><LEX pos=NNP nl=WHOLE>Dr.</LEX></TTL><ENAMEX TYPE=PERSON><lex pos=NNP>Talcott</lex></ENAMEX><lex pos=VBD>led</lex><lex pos=DT>a</lex><lex pos=NN>team</lex><lex pos=IN>of</lex><lex pos=NNS>researchers</lex><lex pos=IN>from</lex>
<lex pos=DT>the</lex><ENAMEX TYPE=ORGANIZATION><lex pos=NNP>National</lex><lex pos=NNP>Cancer</lex><lex pos=NNP>Institute</lex></ENAMEX><lex pos=CC>and</lex><lex pos=DT>the</lex><lex pos=JJ>medical</lex><lex pos=NNS>schools</lex><lex pos=IN>of</lex><ENAMEX TYPE=ORGANIZATION><lex pos=NNP>Harvard</lex><lex pos=NNP>University</lex></ENAMEX><lex pos=CC>and</lex><ENAMEX TYPE=ORGANIZATION><lex pos=NNP>Boston</lex><lex pos=NNP>University</lex></ENAMEX><lex pos=".">.</lex></s>
<s><lex pos=DT>The</lex><ENAMEX TYPE=ORGANIZATION><lex pos=NNP>Lorillard</lex></ENAMEX><LEX role=WHOLE pos=NN>spokeswoman</LEX><lex pos=VBD>said</lex><lex pos=NN>asbestos</lex><lex pos=VBD>was</lex><lex pos=VBN>used</lex><lex pos=IN>in</lex><lex pos="""">"</lex><lex pos=RB>very</lex><lex pos=JJ>modest</lex><lex pos=

NNS>amounts</lex><lex pos=""">"</lex><lex pos=IN>in</lex><lex pos=VBG>making</lex><lex pos=NN>paper</lex><lex pos=IN>for</lex><lex pos=DT>the</lex><lex pos=NNS>filters</lex><lex pos=IN>in</lex><lex pos=DT>the</lex><lex pos=JJ>early</lex>1950s<lex pos=CC>and</lex><lex pos=VBD>replaced</lex><lex pos=IN>with</lex><lex pos=DT>a</lex><lex pos=JJ>different</lex><lex pos=NN>type</lex><lex pos=IN>of</lex><lex pos=NN>filter</lex><lex pos=IN>in</lex>1956<lex pos=".">.</lex><lex pos=IN>From</lex>1953<lex pos=TO>to</lex>1955<lex pos=",">,</lex><lex pos=CD>9.8</lex><lex pos=CD>billion</lex><ENAMEX TYPE=LOCATION><lex pos=NNP>Kent</lex></ENAMEX><lex pos=NNS>cigarettes</lex><lex pos=IN>with</lex><lex pos=DT>the</lex><lex pos=NNS>filters</lex><lex pos=VBD>were</lex><lex pos=VBN>sold</lex><lex pos=",">,</lex><lex pos=DT>the</lex><lex pos=NN>company</lex><lex pos=VBD>said</lex><lex pos=".">.</lex></s><s><lex pos=IN>Among</lex><lex pos=CD>x</lex><lex pos=NNS>men</lex><lex pos=WP>who</lex><lex pos=VBD>worked</lex><lex pos=RB>closely</lex><lex pos=IN>with</lex><lex pos=DT>the</lex><lex pos=NN>substance</lex><lex pos=",">,</lex><lex pos=CD>28<lex><lex pos=VBP>have</lex><lex pos=VBN>died</lex><lex pos=":">—</lex><lex pos=JJR>more</lex<>lex pos=IN>than</lex><lex pos=CD>three</lex><lex pos=NNS>times</lex><lex pos=DT>the</lex><lex pos=VBN>expected</lex><lex pos=NN>number</lex><lex pos=".">.</lex></s><s><lex pos=CD>Four</lex><lex pos=IN>of</lex><lex pos=DT>the</lex><lex pos=CD>five</lex><lex pos=VBG>surviving</lex><lex pos=NNS>workers</lex><lex pos=VBP>have</lex><lex pos=JJ>asbestos-related</lex><lex pos=NNS>diseases</lex><lex pos=",">,</lex><lex pos=VBG>including</lex><lex pos=CD>three</lex><lex pos=IN>with</lex><lex pos=RB>recently</lex><lex pos=VBN>diagnosed</lex><lex pos=NN>cancer</lex><lex pos=".">.</lex></s><s><lex pos=DT>The</lex><lex pos=NN>total</lex><lex pos=IN>of</lex><lex pos=CD>18</lex><lex pos=NNS>deaths</lex><lex pos=IN>from</lex><lex pos=JJ>malignant</lex><lex pos=NN>mesothelioma</lex><lex pos=",">,</lex><lex pos=NN>lung</lex><lex pos=NN>cancer</lex><lex pos=CC>and</lex><lex pos=NN>asbestosis</lex><lex pos=VBD>was</lex><lex pos=RB>far</lex><lex pos=JJR>higher</lex><lex pos=IN>than</lex><lex pos=VBN>expected</lex><lex pos=",">,</lex><lex pos=DT>the</lex><lex pos=NNS>researchers</lex><lex pos=VBD>said</lex><lex pos=".">.</lex></s><s><lex pos="'">"</lex><lex pos=DT>The</lex><lex pos=NN>morbidity</lex><lex pos=NN>rate</lex><lex pos=VBZ>is</lex><lex pos=DT>a</lex><lex pos=JJ>striking</lex><lex pos=NN>finding</lex><lex pos=IN>among</lex><lex pos=DT>those</lex><lex pos=IN>of</lex><lex pos=PRP>us</lex><lex pos=WP>who</lex><lex pos=VBP>study</lex><lex pos=JJ>asbestos-related</lex><lex pos=NNS>diseases</lex><lex pos=",">,</lex><lex pos=""">"</lex><lex pos=VBD>said</lex><lex><TTL><LEX pos=NNP ttl=WHOLE>Dr.</LEX></TTL><ENAMEX TYPE=PERSON><lex pos=NNP>Talcott</lex></ENAMEX><lex pos=".">.</lex></s><s><lex pos=DT>The</lex><lex pos=NN>percentage</lex><lex pos=IN>of</lex><lex pos=NN>lung</lex><lex pos=NN>cancer</lex><lex pos=NNS>deaths</lex><lex pos=IN>among</lex><lex pos=DT>the</lex><lex pos=NNS>workers</lex><lex pos=IN>at</lex><lex pos=DT>the</lex><ENAMEX TYPE=LOCATION><lex pos=NNP>West</lex><lex pos=NNP>Groton</lex></ENAMEX><lex pos=",">,</lex><ENAMEX TYPE=LOCATION><lex pos=NNP>Mass.</lex></ENAMEX><lex pos=",">,</lex><lex pos=NN>paper</lex><lex pos=NN>factory</lex><lex pos=VBZ>appears</lex><lex pos=TO>to</lex><lex pos=VB>be</lex><lex pos=DT>the</lex><lex pos=JJS>highest</lex><lex pos=IN>for</lex><lex pos=DT>any</lex><lex pos=NN>asbestos</lex><lex pos=NNS>workers</lex><lex pos=VBN>studied</lex><lex pos=IN>in</lex><ENAMEX TYPE=LOCATION><lex pos=NNP>Western</lex></ENAMEX><lex pos=VBN>industrialized</lex><lex pos=NNS>countries</lex><lex pos=",">,</lex><lex pos=PRP>he</lex><lex pos=VBD>said</lex><lex pos=".">.</lex></s><s><lex pos=DT>The</lex><lex pos=NN>plant</lex><lex pos=",">,</lex><lex pos=WDT>which</lex><lex pos=VBZ>is</lex><lex pos=VBN>owned</lex><lex pos=IN>by</lex><ENAMEX TYPE=ORGANIZATION><lex pos=NNP>Hollingsworth</lex><lex pos=CC>&</lex><lex pos=NNP>Vose</lex><lex pos=NNP>Co.</lex></ENAMEX><lex pos=",">,</lex><lex pos=VBD>was</lex><lex pos=IN>under</lex><lex pos=NN>contract</lex><lex pos=IN>with</lex><ENAMEX TYPE=ORGANIZATION><lex pos=NNP>Lorillard</lex></ENAMEX><lex pos=TO>to</lex><lex pos=VB>make</lex><lex pos=DT>the</lex><lex pos=NN>cigarette</lex><lex pos=NN S>filters</lex><lex pos=".">.</lex></s><s><lex pos=DT>The</lex><lex pos=VBG>finding</lex><lex pos=RB>probably</lex>pos=MD>will</lex><lex pos=VB>support</lex><lex pos=DT>those</lex><lex pos=WP>who</lex><lex pos=VBP>argue</lex><lex pos=IN>that</lex><lex pos=DT>the</lex><ENAMEX TYPE=LOCATION><lex pos=NNP>U.S.</lex><ENAMEX><lex pos=MD>should</lex><lex pos=VB>regulate</lex><lex pos=DT>the</lex><lex pos=NN>class</lex><lex pos=IN>of</lex><lex pos=NN>asbestos</lex><lex pos=VBG>including</lex><lex pos=NN>crocidolite</lex><lex pos=RBR>more</lex><lex pos=RB>stringently</lex><lex pos=IN>than</lex><lex pos=DT>the</lex><lex pos=JJ>common</lex><lex pos=NN>kind</lex><lex pos=IN>of</lex><lex pos=NN>asbestos</lex><lex pos=",">,</lex><lex pos=NN>chrysotile</lex><lex pos=",">,</lex><lex pos=VBD>found</lex><lex pos=FW>in</lex><lex pos=JJS>most</lex><lex pos=NNS>schools</lex><lex pos=CC>and</lex><lex pos=JJ>other</lex><lex pos=NNS>buildings</lex><lex pos=",">,</lex><TTL><LEX pos=NNP ttl=WHOLE>Dr.! </LEX></TTL><ENAMEX TYPE=PERSON><lex pos=NNP>Talcott</lex></ENAMEX><lex pos=VBD>said</lex><lex pos=".">.</lex></s>
<s><lex pos=DT>The</lex><ENAMEX TYPE=LOCATION><lex pos=NNP>U.S.</lex></ENAMEX><lex pos=VBZ>is</lex><lex pos=CD>one</lex><lex pos=IN>of</lex><lex pos=DT>the</lex><lex pos=JJ>few</lex><lex pos=VBN>industrialized</lex><lex pos=NNS>nations</lex><lex pos=WDT>that</lex><lex pos=VBZ>does</lex><lex pos=RB>n't</lex><lex pos=VB>have</lex>pos=DT>a</lex><lex pos=JJR>higher</lex><lex pos=NN>standard</lex><lex pos=IN>of</lex><lex pos=NN>regulation</lex><lex pos=IN>for</lex><lex pos=DT>the</lex><lex pos=JJ>smooth</lex><lex pos=",">,</lex><lex pos=JJ>needle-like</lex><lex pos=NNS>fibers</lex><lex pos=JJ>such</lex><lex pos=IN>as</lex><lex pos=NN>crocidolite</lex><lex pos=WDT>that</lex><lex pos=VBP>are</lex><lex pos=VBN>classified</lex><lex pos=IN>as</lex><lex pos=

NNS>amphobiles</lex><lex pos=",">,</lex><lex pos=VBG>according</lex><lex pos=TO>to</lex><ENAMEX TYPE=PERSON><lex pos=NNP>Brooke</lex><lex pos=NNP>T.</lex><lex pos=NNP>Mossman</lex></ENAMEX><lex p os=",">,</lex><lex pos=DT>a</lex><lex pos=NN>professor</lex><lex pos=IN>of</lex><lex pos=NN>pathlogy</lex><lex pos=IN>at</lex><lex pos=DT>the</lex><ENAMEX TYPE=ORGANIZATION><lex pos=NNP>University</lex><lex pos=IN>of</lex><lex pos=NNP>Vermont</lex><lex pos=NNP>College</lex><lex pos=IN>of</lex><lex pos=NNP>Medicine</lex></ENAMEX><lex pos=".">.</lex></s><s><lex pos=RBR>More</lex><lex pos=JJ>common</lex><lex pos=NN>chrysotile</lex><lex pos=NNS>fibers</lex><lex pos=VBP>are</lex><lex pos=JJ>curly</lex><lex pos=CC>and</lex><lex pos=VBP>are</lex><lex pos=RBR>more</lex><lex pos=RB>easily</lex><lex pos=VBN>rejected</lex><lex pos=IN>by</lex><lex pos=DT>the</lex><lex pos=NN>body</lex><lex pos=",">,</lex><TTL><LEX pos=NNP ttl=WHOLE>Dr.</LEX></TTL><ENAMEX TYPE=PERSON><lex pos=NNP>Mossman</lex><lENAMEX><lex pos=VBD>explained</lex><lex pos=".">.</lex></s>
<s><lex pos=IN>ln</lex>July<lex pos=",">,</lex><lex pos=DT>the</lex><ENAMEX TYPE=ORGANIZATION><lex pos=NNP>Environmental</lex><lex pos=NNP>Protection</lex><lex pos=NNP>Agency</lex></ENAMEX><lex pos=VBD>imposed</lex><lex pos=DT>a</lex><lex pos=JJ>gradual</lex><lex pos=NN>ban</lex><lex pos=IN>on</lex><lex pos=RB>virtually</lex><lex pos=DT>all</lex><lex pos=NNS>uses</lex><lex pos=IN>of</lex><lex pos=NN>asbestos</lex><lex pos=".">.</lex></s><s><lex pos=IN>By</lex>1997<lex pos=",">,</lex><lex pos=RB>almost</lex><lex pos=DT>all</lex><lex pos=VBG>remaining</lex><lex pos=NNS>uses</lex><lex pos=IN>of</lex><lex pos=JJ>cancer-causing</lex><lex pos=NN>asbestos</lex><lex pos=MD>will</lex><lex pos=VB>be</lex><lex pos=VBN>outlawed</lex><lex pos=".">.</lex></s>
<s><lex pos=IN>About</lex><lex pos=CD>l60</lex><lex pos=NNS>workers</lex><lex pos=lN>at<llex><lex pos=DT>a</lex><lex pos=NN>factory</lex><lex pos=WDT>that</lex><lex pos=VBD>made</lex><lex pos=NN>paper</lex><lex pos=IN>for</lex><lex pos=DT>the</lex><ENAMEX TYPE=-LOCATION><lex pos=NNP>Kent</lex></ENAMEX><lex pos=NNS>filters</lex><lex pos=VBD>were</lex><lex pos=VBN>exposed</lex><lex pos=TO>to</lex><lex pos=NN>asbestos</lex><lex pos=IN>in</lex><lex pos=DT>the</lex>1950s<lex pos=".">.</lex><lex pos=NNP>Areas</lex><lex pos=IN>of</lex><lex pos=DT>the</lex><lex pos=NN>factory</lex><lex pos=VBD>were</lex><lex pos=RB>particularly</lex><lex pos=JJ>dusty</lex><lex pos=WRB>where<llex><lex pos=DT>the</lex><lex pos=NN>crocidolite</lex><lex pos=VBD>was</lex><lex pos=VBN>used</lex><lex pos=".">.</lex></s><s><lex pos=NNS>Workers</lex><lex pos=VBD>dumped</lex><lex pos=JJ>large</lex><lex pos=NN>burlap</lex><lex pos=NNS>sacks</lex><lex pos=IN>of</lex><lex pos=DT>the</lex><lex pos=VBN>imported</lex><lex pos=NN>material</lex><lex pos=IN>into</lex><lex pos=DT>a</lex><lex pos=JJ>huge</lex><lex pos=NN>bin</lex><lex pos=",">,</lex><lex pos=VBD>poured</lex><lex pos=FW>in</lex><lex pos=NN>cotton</lex><lex pos=CC>and</lex><lex pos=NN>acetate</lex><lex pos=NNS>fibers</lex><lex pos=CC>and<llex><lex pos=RB>mechanically</lex><lex pos=VBD>mixed</lex><lex pos=DT>the</lex><lex pos=JJ>dry</lex><lex pos=NNS>fibers</lex><lex pos=IN>in</lex><lex pos=DT>a<lex><lex pos=NN>process<llex><lex pos=VBN>used</lex><lex pos=TO>to</lex><lex pos=VB>make</lex><lex pos=NNS>filters</lex><lex pos=".">.</lex></s><s><lex pos=NNS>Workers</lex><lex pos=VBD>described</lex><lex pos="''">"</lex><lex pos=NNS>clouds</lex><lex pos=lN>of</lex><lex pos=JJ>blue</lex><lex pos=NN>dust</lex><lex pos="''">"</lex><lex pos=WD>that</lex><lex pos=VBD>hung</lex><lex pos=IN>over</lex><lex pos=NNS>parts</lex><lex pos=IN>of</lex><lex pos=DT>the</lex><lex pos=NN>factory</lex><lex pos=",">,</lex><lex pos=RB>even</lex><lex pos=IN>though</lex><lex pos=NN>exhaust</lex><lex pos=NNS>fans</lex><lex pos=VBD>ventilated</lex><lex pos=DT>the</lex><lex pos=NN>area</lex><lex pos=".">.</lex></s>
<s><lex pos="''">"</lex><lex pos=EX>There</lex><lex pos=VBZ>'s</lex><lex pos=DT>no</lex><lex pos=NN>question</lex><lex pos=IN>that</lex><lex pos=DT>some</lex><lex pos=IN>of</lex><lex pos=DT>those</lex><lex pos=NNS>workers</lex><lex pos=CC>and</lex><LEX role=WHOLE pos=NNS>managers</LEX><lex pos=VBD>contracted</lex><lex pos=JJ>asbestos-related</lex><lex pos=NNS>diseases</lex><lex pos=",">,</lex><lex pos="''">"</lex><lex pos=VBD>said</lex><ENAMEX TYPE=PERSON><lex pos=NNP>Darrell</lex><lex pos=NNP>Phillips</lex></ENAMEX><lex pos=",">,</lex><POST><LEX post=START pos=NN>vice</LEX><LEX post=END pos=NN>president</LEX></POST><lex pos=IN>of</lex><lex pos=JJ>human</lex><lex pos=NNS>resources</lex><lex pos=IN>for</lex><ENAMEX TYPE=ORGANIZATION><lex pos=NNP>Hollingsworth</lex><lex pos=CC>&</lex><lex pos=NNP>Vose</lex></ENAMEX><lex pos=".">.</lex></s><s><lex pos="''">"</lex><lex pos=CC>But</lex><lex pos=PRP>you</lex><lex pos=VBP>have</lex><lex pos=TO>to</lex><le!x pos=VB>recognize</lex><lex pos=IN>that</lex><lex pos=DT>these</lex><lex pos=NNS>events</lex><lex pos=VBD>took</lex><lex pos=NN>place</lex><lex pos=CD>35</lex><lex pos=NNS>years</lex><lex pos=RB>ago</lex><lex pos=".">.</lex></s><s><iex pos=PRP>lt</lex><lex pos=VBZ>has</lex><lex pos=DT>no</lex><lex pos=NN>bearing</lex><lex pos=IN>on</lex><lex pos="PRP$">our</lex><lex pos=NN>work</lex><lex pos=NN>force</lex><lex pos=NN>today</lex><lex pos=".">.</lex><lex pos="''">"</lex></s>

SAMPLE OUTPUT FILE AFTER LINKIT
PROCESSING

I: In-order Simplex NP Listing:
  S1 1-2 (1) A form
  S1 4-4 (2) asbestos
  S1 9-11 (3) Kent cigarette filters
  S1 14-16 (4) a high percentage
  S1 18-19 (5) cancer deaths
  S1 21-22 (6) a group
  S1 24-24 (7) workers
  S1 27-27 (8) it
  S1 30-31 (9)30 years
  S1 33-33 (10) researchers
  S2 35-37 (11) The asbestos fiber
  S2 38-38 (12) crocidolite S2 43-43 (13) it
S2 45-46 (14) the lungs
S2 48-50 (15) even brief exposures
S2 52-52 (16) it
S2 54-54 (17) symptoms
S2 56-56 (18) show
S2 58-58 (19) decades
S2 60-60 (20) researchers
S3 62-63 (21) Lorillard Inc.
S3 64-65 (22) the unit
S3 67-71 (23) New York -based Loews Corp.
S3 74-75 (24) Kent cigarettes
S3 78-78 (25) crocidolite
S3 80-80 (26) its
S3 81-83 (27) Micronite cigarette filters
S3 87-88 (28) preliminary findings
S3 93-94 (29) a year
S3 96-98 (30) the latest results
S3 101-101 (31) today's
S3 102-106 (32) New England Journal of Medicine
S3 107-108 (33) a forum
S3 112-113 (34) new attention
S3 115-116 (35) the problem
S4 117-119 (36) A Lorillard spokewoman
S4 124-126 (37) an old story
S5 127-127 (38) We
S5 131-131 (39) years
S5 134-134 (40) anyone
S5 137-137 (41) asbestos
S5 139-141 (42) any questionable properties
S6 144-145 (43) no asbestos
S6 147-147 (44) our
S6 148-148 (45) products
S7 151-152 (46) Neither Lorillard
S7 154-155 (47) the researchers
S7 158-159 (48) the workers
S7 163-164 (49) any research
S7 166-166 (50) smokers
S7 168-170 (51) the Kent cigarettes
S8 172-172 (52) We
S8 174-176 (53) no useful information
S8 179-179 (54) users
S8 182-182 (55) risk
S8 185-187 (56) James A. Talcott
S8 189-189 (57) Boston's
S8 190-192 (58) Dana-Farber Cancer Institute
S9 193-194 (59) Dr. Talcott
S9 196-197 (60) a team
S9 199-199 (61) researchers
S9 201-204 (62) the National Cancer Institute
S9 206-208 (63) the medical schools
S9 210-211 (64) Harvard University
S9 213-214 (65) Boston University
S10 215-217 (66) The Lorillard spokeswoman
S10 219-219 (67) asbestos
S10 224-226 (68) very modest amounts
S10 230-230 (69) paper
S10 232-233 (70) the filters
S10 241-243 (71) a different type
S10 245-245 (72) filter
S10 252-255 (73) 9.8 billion Kent cigarettes
S10 257-258 (74) the filters
S10 261-262 (75) the company
S11 265-266 (76) 33 men
S11 271-272 (77) the substance
S11 273-273 (78) 28
S11 279-280 (79) three times
S11 283-283 (80) number
S12 284-284 (81) Four
S12 286-287 (82) the five
S12 289-289 (83) workers
S12 291-292 (84) asbestos-related diseases
S12 294-294 (85) three
S12 298-298 (86) cancer
S13 299-300 (87) The total
S13 302-303 (88) 18 deaths
S13 305-306 (89) malignant mesothelioma
S13 307-308 (90) lung cancer
S13 310-310 (91) asbestosis
S13 316-317 (92) the researchers
S14 320-322 (93) The morbidity rate
S14 324-326 (94) a striking finding
S14 330-330 (95) us
S14 333-334 (96) asbestos-related diseases
S14 337-338 (97) Dr. Talcott
S15 339-340 (98) The percentage
S15 342-344 (99) lung cancer deaths
S15 346-347 (100) the workers
S15 349-351 (101) the West Groton
S15 352-352 (102) Mass.
S15 353-354 (103) paper factory
S15 361-363 (104) any asbestos workers
S15 366-366 (105) Western
S15 368-368 (106) countries
S15 369-369 (107) he
S16 371-372 (108) The plant
S16 377-380 (109) Hollingsworth & Vose Co.
S16 383-383 (110) contract
S16 385-385 (111) Lorillard
S16 388-390 (112) the cigarette filters
S17 400-401 (113) the U.S.
S17 404-405 (114) the class
S17 407-407 (115) asbestos
S17 409-409 (116) crocidolite
S17 413-415 (117) the common kind
S17 417-417 (118) asbestos
S17 418-418 (119) chrysotile
S17 421-422 (120) most schools
S17 424-425 (121) other buildings
S17 426-427 (122) Dr. Talcott
S18 429-430 (123) The U.S.
S18 432-432 (124) one S18 437-437 (125) nations
S18 442-444 (126) a higher standard
S18 446-446 (127) regulation
S18 450-451 (128) needle-like fibers
S18 454-454 (129) crocidolite
S18 459-459 (130) amphobiles
S18 462-464 (131) Brooke T. Mossman
S18 465-466 (132) a professor
S18 468-468 (133) pathlogy
S18 470-476 (134) the University of Vermont College of Medicine S19 477-480 (135) More common chrysotile fibers S19 489-490 (136) the body
S19 491-492 (137) Dr. Mossman
S20 496-499 (138) the Environmental Protection Agency S20 501-503 (139) a gradual ban
S20 506-507 (140) all uses
S20 509-509 (141) asbestos
S21 515-515 (142) uses
S21 517-518 (143) cancer-causing asbestos
S22 523-524 (144)160 workers
S22 526-527 (145) a factory
S22 530-530 (146) paper
S22 532-534 (147) the Kent filters
S22 538-538 (148) asbestos
S22 542-542 (149) Areas
S22 544-545 (150) the factory
S22 550-551 (151) the crocidolite
S23 554-554 (152) Workers
S23 556-558 (153) large burlap sacks
S23 562-562 (154) material
S23 564-566 (155) a huge bin
S23 569-569 (156) cotton
S23 571-572 (157) acetate fibers
S23 576-578 (158) the dry fibers
S23 580-581 (159) a process
S23 585-585 (160) filters
S24 586-586 (161) Workers
S24 589-589 (162) clouds
S24 591-592 (163) blue dust
S24 597-597 (164) parts
S24 599-600 (165) the factory
S24 603-604 (166) exhaust fans
S24 606-607 (167) the area
S25 611-612 (168) no question
S25 616-617 (169) those workers
S25 619-619 (170) managers
S25 621-622 (171) asbestos-related diseases
S25 625-626 (172) Darrell Phillips
S25 627-628 (173) vice president
S25 630-631 (174) human resources
S25 633-635 (175) Hollingsworth & Vose
S26 638-638 (176) you
S26 643-644 (177) these events
S26 646-648 (178) place35 years
S27 650-650 (179) It
S27 652-653 (180) no bearing
S27 655-655 (181) our
S27 656-658 (182) work force today II: Noun Phrases Ordered by Heads:
S1 24-24 (7) workers
S7 158-159 (48) the workers
S12 289-289 (83) workers
S15 346-347 (100) the workers
S15 361-363 (104) any asbestos workers
S22 523-524 (144)160 workers
S23 554-554 (152) Workers
S24 586-586 (161) Workers
S25 616-617 (169) those workers
S1 4-4 (2) asbestos
S5 137-137 (41) asbestos
S6 144-145 (43) no asbestos
S10 219-219 (67) asbestos
S17 407-407 (115) asbestos
S17 417-417 (118) asbestos
S20 509-509 (141) asbestos
S21 517-518 (143) cancer-causing asbestos
S22 538-538 (148) asbestos
S1 9-11 (3) Kent cigarette filters
S3 81-83 (27) Micronite cigarette filters
S10 232-233 (70) the filters
S10 245-245 (72) filter
S10 257-258 (74) the filters
S16 388-390 (112) the cigarette filters
S22 532-534 (147) the Kent filters
S23 585-585 (160) filters
S1 27-27 (8) it
S2 43-43 (13) it
S2 52-52 (16) it
S3 80-80 (26) its
S27 650-650 (179) It
S1 33-33 (10) researchers
S2 60-60 (20) researchers
S7 154-155 (47) the researchers
S9 199-199 (61) researchers
S13 316-317 (92) the researchers
S2 35-37 (11) The asbestos fiber
S18 450-451 (128) needle-like fibers
S19 477-480 (135) More common chrysotile fibers
S23 571-572 (157) acetate fibers
S23 576-578 (158) the dry fibers
S2 38-38 (12) crocidolite
S3 78-78 (25) crocidolite
S17 409-409 (116) crocidolite
S18 454-454 (129) crocidolite
S22 550-551 (151) the crocidolite
S15 353-354 (103) paper factory
S22 526-527 (145) a factory
S22 544-545 (150) the factory
S24 599-600 (165) the factory
S1 30-31 (9)30 years
S3 93-94 (29) a year
S5 131-131 (39) years
S26 646-648 (178) place35 years
S8 185-187 (56) James A. Talcott S9 193-194 (59) Dr. Talcott
S14 337-338 (97) Dr. Talcott
S17 426-427 (122) Dr. Talcott
S1 18-19 (5) cancer deaths
S13 302-303 (88)18 deaths
S15 342-344 (99) lung cancer deaths
S12 291-292 (84) asbestos-related diseases
S14 333-334 (96) asbestos-related diseases
S25 621-622 (171) asbestos-related diseases
S3 74-75 (24) Kent cigarettes
S7 168-170 (51) the Kent cigarettes
S10 252-255 (73)9.8 billion Kent cigarettes
S1 14-16 (4) a high percentage
S15 339-340 (98) The percentage
S22 542-542 (149) Areas
S24 606-607 (167) the area
S9 206-208 (63) the medical schools
S17 421-422 (120) most schools
S7 151-152 (46) Neither Lorillard
S16 385-385 (111) Lorillard
S6 147-147 (44) our
S27 655-655 (181) our
S10 230-230 (69) paper
S22 530-530 (146) paper
S5 127-127 (38) We
S8 172-172 (52) We
S17 400-401 (113) the U.S.
S18 429-430 (123) The U.S.
S3 87-88 (28) preliminary findings
S14 324-326 (94) a striking finding
S3 101-101 (31) today's
S27 656-658 (182) work force today
S3 102-106 (32) New England Journal of Medicine
S18 470-476 (134) the University of Vermont College of Medicine
S9 210-211 (64) Harvard University
S9 213-214 (65) Boston University
S18 462-464 (131) Brooke T. Mossman
S19 491-492 (137) Dr. Mossman
S20 506-507 (140) all uses
S21 515-515 (142) uses
S8 190-192 (58) Dana-Farber Cancer Institute
S9 201-204 (62) the National Cancer Institute
S12 298-298 (86) cancer
S13 307-308 (90) lung cancer
S2 54-54 (17) symptoms
S3 96-98 (30) the latest results
S3 107-108 (33)aforum
S3 67-715 (23) New York -based Loews Corp.
S4 124-126 (37) an old story
S3 115-116 (35) the problem
S3 112-113 (34) new attention
S4 117-119 (36) A Lorillard spokewoman
S7 163-164 (49) any research
S7 166-166 (50) smokers
S5 139-141 (42) any questionable properties
S8 179-179 (54) users S8 182-182 (55) risk
S2 48-50 (15) even brief exposures
S8 189-189 (57) Boston's
S5 134-134 (40) anyone
S9 196-197 (60) a team
S3 64-65 (22) the unit
S2 58-58 (19) decades
S10 215-217 (66) The Lorillard spokeswoman
S10 224-226 (68) very modest amounts
S3 62-63 (21) Lorillard Inc.
S6 148-148 (45) products
S10 261-262 (75) the company
S11 265-266 (76)33 men
S2 56-56 (18) show
S11 273-273 (78)28
S8 174-176 (53) no useful information
S11 283-283 (80) number
S12 284-284 (81) Four
S12 286-287 (82) the five
S1 21-22 (6) a group
S12 294-294 (85) three
S2 45-46 (14) the lungs
S13 299-300 (87) The total
S13 305-306 (89) malignant mesothelioma
S13 310-310 (91) asbestosis
S14 320-322 (93) The morbidity rate
S14 330-330 (95) us
S15 349-351 (101) the West Groton
S15 352-352 (102) Mass.
S1 1-2 (1) A form
S15 366-366 (105) Western
S15 368-368 (106) countries
S15 369-369 (107) he
S16 371-372 (108) The plant
S16 377-380 (109) Hollingsworth & Vose Co.
S16 383-383 (110) contract
S11 241-243 (71) a different type
S17 404-405 (114) the class
S17 413-415 (117) the common kind
S17 418-418 (119) chrysotile
S17 424-425 (121) other buildings
S18 432-432 (124) one
S18 437-437 (125) nations
S18 442-444 (126) a higher standard
S18 446-446 (127) regulation
S18 459-459 (130) amphobiles
S11 271-272 (77) the substance
S18 465-466 (132) a professor
S18 468-468 (133) pathlogy
S19 489-490 (136) the body
S20 496-499 (138) the Environmental Protection Agency
S20 501-503 (139) a gradual ban
SI1 279-280 (79) three times
S24 603-604 (166) exhaust fans
S23 556-558 (153) large burlap sacks
S23 562-562 (154) material S23 564-566 (155) a huge bin
S23 569-569 (156) cotton
S23 580-581 (159) a process
S24 589-589 (162) clouds
S24 591-592 (163) blue dust
S24 597-597 (164) parts
S25 611-612 (168) no question
S25 619-619 (170) managers
S25 625-626 (172) Darrell Phillips
S25 627-628 (173) vice president
S25 630-631 (174) human resources
S25 633-635 (175) Hollingsworth & Vose
S26 638-638 (176) you
S26 643-644 (177) these events
S27 652-653 (180) no bearing This is an unpublished work in which copyright subsists and is owned by The Trustees of Columbia University in the City of New York. All rights reserved.

What is claimed is:

1. A method for identifying significant topics in a document comprising the steps of:
    extracting from said document a complete list of simplex noun phrases and corresponding heads that represent candidate significant topics of said document;
    clustering said simplex noun phrases into groups by said heads; and
    ranking said clustered simplex noun phrases by said heads in accordance with a significance measure to identify said significant topics of said document from said candidate significant topics.

2. A method for identifying significant topics in a document comprising the steps of:
    extracting from said document a complete list of simplex noun phrases and corresponding heads that represent candidate significant topics of said document, said simplex noun phrases being described by a user-specified pattern having a determiner preceding an adjective preceding a noun;
    clustering said simplex noun phrases into groups by said heads; and
    ranking said clustered simplex noun phrases by said heads in accordance with a significance measure to identify said significant topics of said document from said candidate significant topics.

3. The method according to claim 1 or 2, further comprising the step of pre-processing said document to provide parsing information for extracting said simplex noun phrases.

4. The method according to claim 1 or 2, further comprising the step of post-processing said ranked simplex noun phrases to remove duplicates of said identified significant topics.

5. The method according to claim 1 or 2, further comprising the step of post-processing said ranked simplex noun phrases to remove near-duplicates of said identified significant topics.

6. The method according to claim 1 or 2, further comprising the step of post-processing said ranked simplex noun phrases to remove pronouns from said identified significant topics.

7. The method according to claim 1 or 2, further comprising the step of post-processing said ranked simplex noun phrases to exclude all of said ranked simplex noun phrases except those having a content-bearing modifier.

8. The method according to claim 1 or 2, wherein said significance measure is based at least in part on a frequency of said heads in said simplex noun phrases.

9. The method according to claim 1 or 2, wherein said significance measure is based at least in part on a frequency of said heads occurring as modifiers within said simplex noun phrases.

10. The method according to claim 1 or 2, wherein said significance measure is based at least in part on the location of said heads within said document.

11. The method according to claim 1, wherein said simplex noun phrases are described by a user-specified pattern.

12. The method according to claim 10, wherein said user-specified pattern includes a determiner preceded by an adjective preceded by a noun.

13. A system for identifying significant topics in a document comprising:
    a general purpose computer having a computer usable media;
    computer readable program code means embodied in said computer usable media, said program code means comprising:
        means for extracting from said document a complete list of simplex noun phrases and corresponding heads that represent candidate significant topics of said document;
        means for clustering said simplex noun phrases into groups by said heads; and
        means for ranking said clustered simplex noun phrases by said heads in accordance with a significance measure to identify significant topics of said document from said candidate significant topics.

14. The system according to claim 13, further comprising means for pre-processing said document to provide parsing information for extracting said simplex noun phrases.

15. The system according to claim 13, further comprising means for post-processing said ranked simplex noun phrases to remove duplicates of said identified significant topics.

16. The system according to claim 13, further comprising means for post-processing said ranked simplex noun phrases to remove near-duplicates of said identified significant topics.

17. The system according to claim 13, further comprising means for post-processing said ranked simplex noun phrases to exclude all of said ranked simplex noun phrases except those having a content-bearing modifier.

18. The system according to claim 13, wherein said significance measure is based at least in part on a frequency of said heads in said simplex noun phrases.

19. The system according to claim 13, wherein said significance measure is based at least in part on a frequency of said heads occurring as modifiers within said simplex noun phrases.

20. The system according to claim 13, wherein said significance measure is based at least in part on the location of said heads within said document.

21. The system according to claim 13, wherein said simplex noun phrases comprise a user-specified pattern.

22. The system according to claim 13, wherein said user-specified pattern comprises a determiner preceded by an adjective preceded by a noun.

* * * * *